United States Patent
Kambara et al.

(10) Patent No.: US 12,039,508 B2
(45) Date of Patent: Jul. 16, 2024

(54) INFORMATION PROCESSING SYSTEM

(71) Applicant: SIGNPOST CORPORATION, Tokyo (JP)

(72) Inventors: Yasushi Kambara, Tokyo (JP); Hideki Kawabata, Tokyo (JP); Toshiya Namikawa, Tokyo (JP); Tomohiro Sasaki, Tokyo (JP)

(73) Assignee: SIGNPOST CORPORATION, Tokyo (JP)

( * ) Notice: Subject to any disclaimer, the term of this patent is extended or adjusted under 35 U.S.C. 154(b) by 398 days.

(21) Appl. No.: 17/332,207

(22) Filed: May 27, 2021

(65) Prior Publication Data

US 2021/0304176 A1 Sep. 30, 2021

Related U.S. Application Data

(63) Continuation of application No. 16/079,386, filed as application No. PCT/JP2017/008032 on Feb. 28, 2017, now Pat. No. 11,030,604.

(30) Foreign Application Priority Data

Feb. 29, 2016 (JP) ................................. 2016-037532

(51) Int. Cl.
*G06T 7/20* (2017.01)
*G06Q 20/20* (2012.01)
(Continued)

(52) U.S. Cl.
CPC .......... *G06Q 20/208* (2013.01); *G06Q 30/06* (2013.01); *G06T 5/40* (2013.01); *G06T 7/00* (2013.01);
(Continued)

(58) Field of Classification Search
CPC .................................. G06T 7/73; G06T 7/90
See application file for complete search history.

(56) References Cited

U.S. PATENT DOCUMENTS 6,236,736 B1  5/2001 Crabtree et al.
8,448,858 B1  5/2013 Kundu et al.
(Continued)

FOREIGN PATENT DOCUMENTS

JP  2000-123086 A  4/2000
JP  2001-076261 A  3/2001
(Continued)

OTHER PUBLICATIONS

Extended European Search Report issued in corresponding EP Patent Application No. EP20191318.3, mailed on Oct. 12, 2020.
(Continued)

*Primary Examiner* — Sam Bhattacharya
(74) *Attorney, Agent, or Firm* — MUNCY, GEISSLER, OLDS & LOWE, P.C.

(57) ABSTRACT

Provided is an information processing system that, when a shopper purchases a product displayed in a shop, enables the automation of the purchase of the product and reduces the time required for purchasing the product.
This information processing system comprises a moving object tracking means, a shelf product recognition means, and a purchase means. The moving object tracking means identifies moving objects, such as shoppers and baskets, that are moving through a shop, defines the region of the moving object, and picks up images while tracking the moving object. The shelf product recognition means constantly picks up images of the state of the shelves, compares images picked up before and after an object is taken from a shelf, defines the region from the picked up image of a recognized
(Continued)

|  | EMBODIMENT 1 | EMBODIMENT 2 | EMBODIMENT 3 | EMBODIMENT 4 |
|---|---|---|---|---|
| IMPLEMENTATION SHOP | CONVENIENCE STORE | BOOKSTORE | SUPERMARKET | SUPERMARKET |
| CHECKOUT LOCATION | CASH REGISTER TERMINAL | CASH REGISTER TERMINAL | CASH REGISTER COUNTER | CHECKOUT GATE |
| OVERVIEW | •AUTOMATIC CHECKOUT FOR PRODUCT ON CASH REGISTER TERMINA | •AUTOMATIC CHECKOUT FOR BOOK ON CASH REGISTER TERMINAL •PILING COUNTERMEASURE | •AUTOMATIC CHECKOUT FOR PRODUCT IN BASKET OR CART | •AUTOMATIC CHECKOUT FOR HAND-HELD PRODUCT, BASKET OR CART PRODUCT, MY BAG, PRODUCT IN CASH REGISTER BAG, AND THE LIKE |
| DETAILS | •RECOGNIZE PRODUCT PLACED ON CASH REGISTER TERMINAL BY CAMERA INSTALLED IN CASH REGISTER TERMINAL | •TRACK BOOK RECOGNIZED IN SHELF UNTIL IT IS PLACED ON CASH REGISTER TERMINAL •RECOGNIZE PRODUCTS PLACED OVERLAPPED ON CASH REGISTER TERMINAL BY CAMERA INSTALLED IN CASH REGISTER TERMINAL | •TRACK BASKETS AND RECOGNIZE PRODUCT IN BASKETS BY BASKET REGION DETECTION FUNCTION •AUTOMATIC CHECKOUT FOR PRODUCTS IN BASKETS PLACED ON CASH REGISTER COUNTER | •AUTOMATIC CHECKOUT FOR ALL PRODUCTS INCLUDED IN MOVING OBJECT REGION AT GATE WITHOUT BEING PLACED ON CASH REGISTER COUNTER. |
| REFERENCE DRAWING | FIGS. 2 TO 11 | FIGS. 3, 5, AND 6 FIGS. 12 TO 21 | FIGS. 5 AND 15 FIGS. 22 TO 30 | FIGS. 5 AND 24 FIGS. 31 TO 37 | product, and identifies the product from the defined image region. The purchase means purchases the identified product.

18 Claims, 36 Drawing Sheets

(51) Int. Cl.
| | | |
|---|---|---|
| G06Q 30/06 | (2023.01) | |
| G06T 5/40 | (2006.01) | |
| G06T 7/00 | (2017.01) | |
| G06T 7/60 | (2017.01) | |
| G06T 7/73 | (2017.01) | |
| G06T 7/90 | (2017.01) | |
| G07G 1/00 | (2006.01) | |
| G07G 1/12 | (2006.01) | |

(52) U.S. Cl.
CPC .................. *G06T 7/20* (2013.01); *G06T 7/60* (2013.01); *G06T 7/73* (2017.01); *G06T 7/90* (2017.01); *G07G 1/00* (2013.01); *G07G 1/12* (2013.01)

(56) References Cited

U.S. PATENT DOCUMENTS

| | | |
|---|---|---|
| 9,124,778 B1 | 9/2015 | Crabtree |
| 2010/0217678 A1 | 8/2010 | Goncalves |
| 2011/0099104 A1 | 4/2011 | Nybom |
| 2013/0168189 A1* | 7/2013 | Ribas .................... B66B 9/0869 |
| | | 187/200 |
| 2014/0052555 A1 | 2/2014 | MacIntosh |
| 2014/0337174 A1 | 11/2014 | Lin et al. |
| 2015/0029339 A1 | 1/2015 | Kobres et al. |
| 2015/0039458 A1 | 2/2015 | Reid |
| 2016/0019514 A1 | 1/2016 | Landers, Jr. et al. |
| 2019/0019173 A1 | 1/2019 | Kinno et al. |

FOREIGN PATENT DOCUMENTS

| | | |
|---|---|---|
| JP | 2012174154 A | 9/2012 |
| JP | 2012-243171 A | 12/2012 |
| JP | 2015-001879 A | 1/2015 |
| JP | 5704279 B1 | 4/2015 |
| WO | WO-2007/030168 A1 | 3/2007 |
| WO | WO2015/112446 A1 | 7/2015 |

OTHER PUBLICATIONS

Office Action mailed May 26, 2020 in Japanese Application No. JP2017037792.

Black et al., "Multi view image surveillance and tracking," Motion and Video Computing, 2002, Proceedings, Workshop on Dec. 5-6, 2002, Jan. 1, 2002, pp. 1690174, XP055687820.

Lee et al., "Monitoring Activities From Multiple Video Streams: Establishing a Common Coordinate Frame," IEEE Transactions on Pattern Analysis and Machine Intelligence, IEEE Computer Society, USA, vol. 22, No. 8, Aug. 1, 2000, pp. 7580767, XP000976483.

* cited by examiner

FIG. 1

| | EMBODIMENT 1 | EMBODIMENT 2 | EMBODIMENT 3 | EMBODIMENT 4 |
|---|---|---|---|---|
| IMPLEMENTATION SHOP | CONVENIENCE STORE | BOOKSTORE | SUPERMARKET | SUPERMARKET |
| CHECKOUT LOCATION | CASH REGISTER TERMINAL | CASH REGISTER TERMINAL | CASH REGISTER COUNTER | CHECKOUT GATE |
| OVERVIEW | • AUTOMATIC CHECKOUT FOR PRODUCT ON CASH REGISTER TERMINA | • AUTOMATIC CHECKOUT FOR BOOK ON CASH REGISTER TERMINAL<br>• PILING COUNTERMEASURE | • AUTOMATIC CHECKOUT FOR PRODUCT IN BASKET OR CART | • AUTOMATIC CHECKOUT FOR HAND-HELD PRODUCT, BASKET OR CART PRODUCT, MY BAG, PRODUCT IN CASH REGISTER BAG, AND THE LIKE |
| DETAILS | • RECOGNIZE PRODUCT PLACED ON CASH REGISTER TERMINAL BY CAMERA INSTALLED IN CASH REGISTER TERMINAL | • TRACK BOOK RECOGNIZED IN SHELF UNTIL IT IS PLACED ON CASH REGISTER TERMINAL<br>• RECOGNIZE PRODUCTS PLACED OVERLAPPED ON CASH REGISTER TERMINAL BY CAMERA INSTALLED IN CASH REGISTER TERMINAL | • TRACK BASKETS AND RECOGNIZE PRODUCT IN BASKETS BY BASKET REGION DETECTION FUNCTION<br>• AUTOMATIC CHECKOUT FOR PRODUCTS IN BASKETS PLACED ON CASH REGISTER COUNTER | • AUTOMATIC CHECKOUT FOR ALL PRODUCTS INCLUDED IN MOVING OBJECT REGION AT GATE WITHOUT BEING PLACED ON CASH REGISTER COUNTER. |
| REFERENCE DRAWING | FIGS. 2 TO 11 | FIGS. 3, 5, AND 6<br>FIGS. 12 TO 21 | FIGS. 5 AND 15<br>FIGS. 22 TO 30 | FIGS. 5 AND 24<br>FIGS. 31 TO 37 |

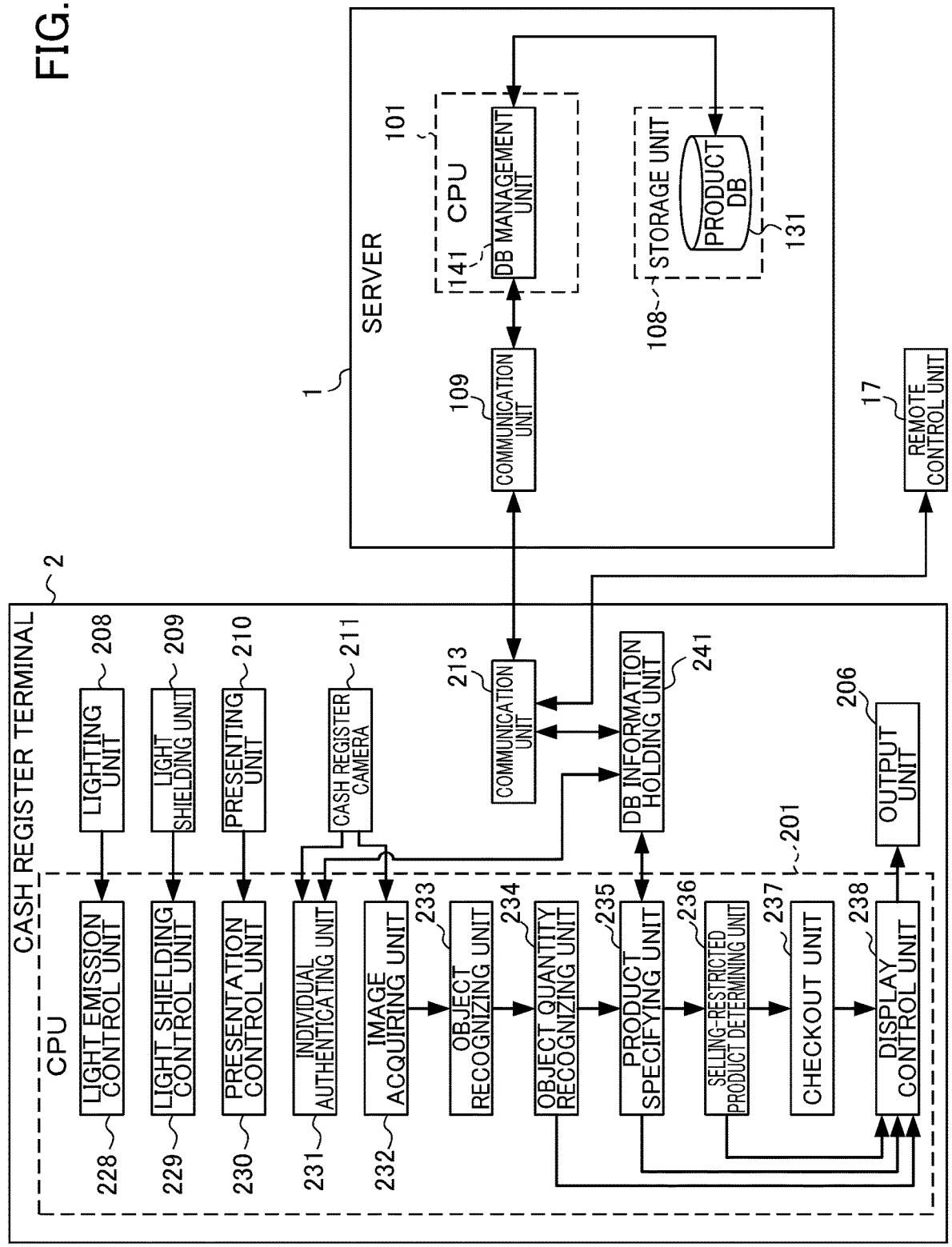

FIG. 9

| PRODUCT | CASH REGISTER COUNTER CAMERA | | | | | RECOGNITION RESULT (LOGICAL SUM) |
|---|---|---|---|---|---|---|
| | 1 | 2 | 3 | 4 | 5 | |
| X | 1 | 0 | 0 | 1 | 1 | 1 |
| Y | 0 | 1 | 0 | 1 | 1 | 1 |
| Z | 0 | 1 | 1 | 0 | 1 | 1 |
| Z' | 1 | 0 | 1 | 0 | 0 | 1 |

※Z AND Z' ARE SAME PRODUCT

INFORMATION PROCESSING SYSTEM

CROSS REFERENCE TO RELATED APPLICATIONS

This application is a Continuation of co-pending application Ser. No. 16/079,386, filed on Aug. 23, 2018, which is a 371 of international application PCT/JP2017/008032, filed on Feb. 28, 2017, for which priority is claimed under 35 U.S.C. § 120; and this application claims priority of Application No. 2016-037532 filed in Japan on Feb. 29, 2016 under 35 U.S.C. § 119, the entire contents of all of which are hereby incorporated by reference.

TECHNICAL FIELD

The present invention relates to an information processing system.

BACKGROUND ART

In the past, in shops such as convenience stores, supermarkets, shopping centers, and various types of mass merchandise outlets, purchasers pick up products from product shelves, puts them in shopping carts or shopping baskets, carries them to a cash register installed near an exit of a shop, and check out the products through a self cash register (for example, see Patent Document 1).

Patent Document 1: Japanese Unexamined Patent Application, Publication No. 2001-DISCLOSURE OF THE INVENTION

Problems to be Solved by the Invention

However, in a case in which the products in the shopping cart or the shopping basket are checked out through the cash register, since it is necessary to scan bar codes of the products even in the case of the self cash register, a cash register waiting line is unable to be solved, and the purchasers wait in front of the cash register for a long time. Further, when purchasers purchase products in shops, in a case in which there are many purchasers, there are cases in which the purchasers give up shopping. Therefore, if the above circumstances are considered, there is a demand for a system which is capable of implementing automation of payment for products and reducing a time taken for paying for products when purchasers purchase products displayed in shops. Further, in conventional shops, misbehaviors such as shoplifting by shoppers or cash register personnel also become a problem, and there is a demand for a system which is capable of preventing such misbehaviors.

The present invention was made in light of the foregoing, and it is an object of the present invention to make it possible to implement automation of payment for products and reduction of a time taken for paying for products when purchasers purchase products displayed in shops and prevent misbehavior such as shoplifting by shoppers or cash register personnel.

Means for Solving the Problems

In order to achieve the above object, an information processing system of one aspect of the present invention includes:
a moving object tracking means for discovering a moving object such as a person or baskets moving in a shop, defining a region of the moving object, and imaging the moving object while keeping tracking movement of the moving object;
a shelf product recognition means for constantly imaging a state of a shelf in the shop, comparing captured images before and after an object is taken out from the shelf, defining a region of a product of a recognition target from the images, and specifying a product from the defined image region; and
a checkout means for checking out the specified product.

Effects of the Invention

According to the present invention, it is possible to provide an information processing system which is capable of implementing automation of payment for products and reduction of a time taken for paying for products when purchasers purchase products displayed in shops and preventing misbehaviors by shoppers or cash register personnel.

BRIEF DESCRIPTION OF THE DRAWINGS

FIG. 1 is a diagram illustrating a list of main points of first to fourth embodiments of an information processing system according to the present invention.

FIG. 7 is a functional block diagram illustrating an example of functional configurations of the server of FIG. 5 and the cash register terminal of FIG. 6.

FIG. 9 is a diagram illustrating an example of a truth table for calculating the number of objects placed on a cash register terminal.

PREFERRED MODE FOR CARRYING OUT THE INVENTION

[Overview]

Figure 2:
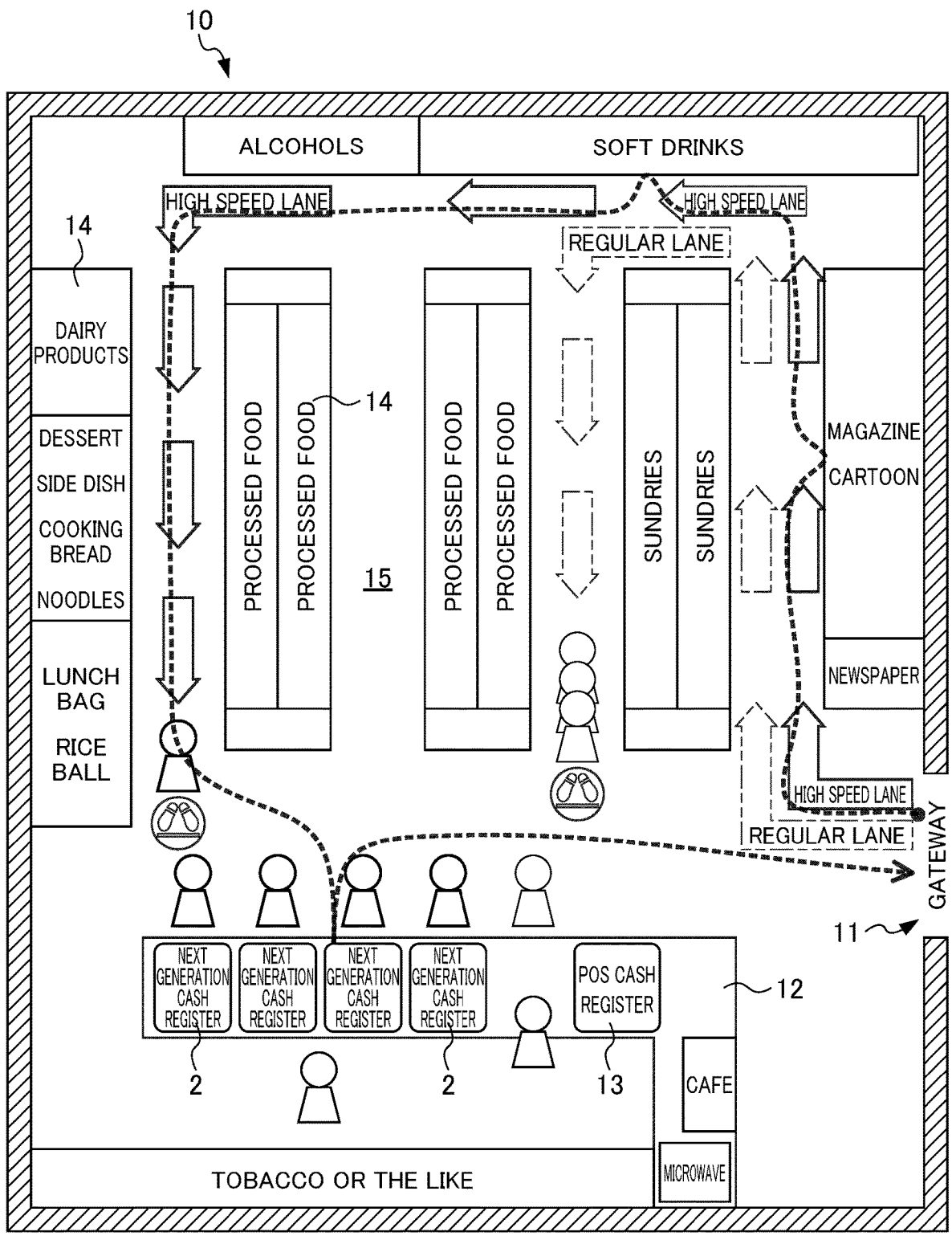
FIG. 2 is a diagram illustrating a layout example of a convenience store employing a product recognition system in a first embodiment.

An overview of embodiments of the information processing system of the present invention will be described below. The information processing system of the present invention is applied as a product recognition system that performs an automatic checkout for products. First to fourth embodiments illustrated in FIG. 1 will be described in a described order.

FIG. 1 is a table illustrating a list of main points of the first to fourth embodiments of the information processing system of the present invention. In an "implementation shop" field in FIG. 1, implementation shops of the first to fourth embodiments are described. For example, the first embodiment relates to an information processing system assumed to be mainly applied at a convenience store. Here, the implementation shops are merely examples, and respective application places of the first to fourth embodiments are not particularly limited. For example, the implementation shop of the first embodiment may be a retail shop such as a supermarket, a dining room, and a shop in which a checkout is performed. In a "checkout location" field in FIG. 1, locations in which shoppers check out are described in the first to fourth embodiments. The checkout locations in the first and second embodiments are a cash register terminal. The cash register terminal has a function of specifying an object as a product and checking out a product. The checkout location in the third embodiment is a cash register counter. The cash register counter has a function of checking out a product when an object already specified as a product is placed thereon. The checkout location in the fourth embodiment is a checkout gate. The checkout gate has a function of checking out a product when an object already specified as a product is not placed on a cash register counter.

In an "overview" field in FIG. 1, overviews of the first to fourth embodiments are described. For example, in summary, the information processing system of the first embodiment is an information processing system that performs an automatic checkout for a product placed on a cash register terminal. In a "details" field in FIG. 1, the details of each embodiment are described. In other words, for example, the information processing system of the first embodiment recognizes a hand-held product placed on a cash register terminal through a cash register camera installed in the cash register terminal and performs an automatic checkout for the product.

Here, a thing which is sold in a shop but not specified as a product yet is referred to as an "object". Further, a thing which is not a product, for example, a personal item carried by a shopper is also referred to as an "object". Then, an "object" which is specified as a product is referred to as a "product". Therefore, the "product" means what is sold at the shop front. Further, the product recognition systems of the first to fourth embodiments have one or more sensing devices that image an object. As the sensing device, in addition to an image sensor (a camera or the like), various devices such as a temperature sensor and a distance sensor can be employed.

An image captured by the image sensor such as the camera is hereinafter referred to as a "captured image". Further, a captured image including an object as a subject is hereinafter referred to as a "captured object image". On the other hand, a captured image including a product as a subject is hereinafter referred to as a "captured product image". Further, in this specification, in a case in which various kinds of image processing is applied to the captured product image and the captured object image, they are actually handled in the form of data, but for convenience of description, the data is omitted in the following description.

The product recognition system of the first embodiment recognizes the presence of an object on the basis of the captured object image including the object placed on the cash register terminal as the subject. Specifically, for example, in the first embodiment, the cash register terminal has one or more cash register cameras as an example of the sensing device. The cash register camera images a predetermined area of the cash register terminal. Specifically, the cash register camera images a predetermined area before an object is placed. Further, the cash register camera images a predetermined area after an object is placed on a predetermined area. In this regard, in the product recognition systems of the first embodiment, the cash register terminal recognizes the presence of an object by comparing a captured image before the object is placed on the predetermined area of the cash register terminal with a captured object image after the object is placed on the predetermined area of the cash register terminal. Further, the presence of an object may be recognized from the captured object imaging after the object is placed on a predetermined area of the cash register terminal using a segmentation technique in image recognition in which the captured image before the object is placed on the predetermined area of the cash register terminal is not compared with the captured object image after the object is placed on the predetermined area of the cash register terminal. In the first embodiment, the cash register terminal specifies a product to which each of the recognized objects belongs through an object recognition technique based on image recognition. In this case, for example, a technique of generating product candidates through deep learning, then performing a verification function, and specifying a product with a high degree of accuracy is employed. Further, in the first embodiment, the cash register terminal recognizes a quantity of products specified next. In the first embodiment, the products specified next are checked out.

The product recognition system of the second embodiment is applied to shops like bookstores. Specifically, the product recognition system of the second embodiment recognizes objects between shelves installed in a sales room in a book store or on a platform such as a wagon (a concept including "on platform" is hereinafter referred to as "the shelf") as the number of books, tracks a shopper until books are placed on the cash register terminal when the books are picked up, recognizes the number of placed books when the books are placed on the cash register terminal, specifies the books, recognizes the books as the products, and performs an automatic checkout for the books.

The product recognition system of the third embodiment is applied to a retail shop such as a supermarket. Specifically, the product recognition system of the third embodiment recognizes baskets (a shopping basket or cart) placed on a sales room of a retail shop such as a supermarket and tracks the baskets moving in the sales room. The product recognition system of the third embodiment recognizes and specifies an object as a product when the object is picked up from a shelf, reads a list of products put in the baskets when the baskets are placed on the cash register counter, and performs an automatic checkout for the products.

The product recognition system of the fourth embodiment is applied to a retail shop such as a supermarket. Specifically, in addition to the shopper and the shopping basket and cart placed in the supermarket, baskets and shoppers including my bags of the shoppers, cash register bags, and the like are recognized as moving objects and tracked. The product recognition system of the fourth embodiment can recognize and specify a product when an object is picked up from a shelf and perform an automatic checkout for the products although the product is not placed on the cash register terminal.

Hereinafter, the first to the fourth embodiments will be described with reference to the appended drawings.

First Embodiment

Figure 3:
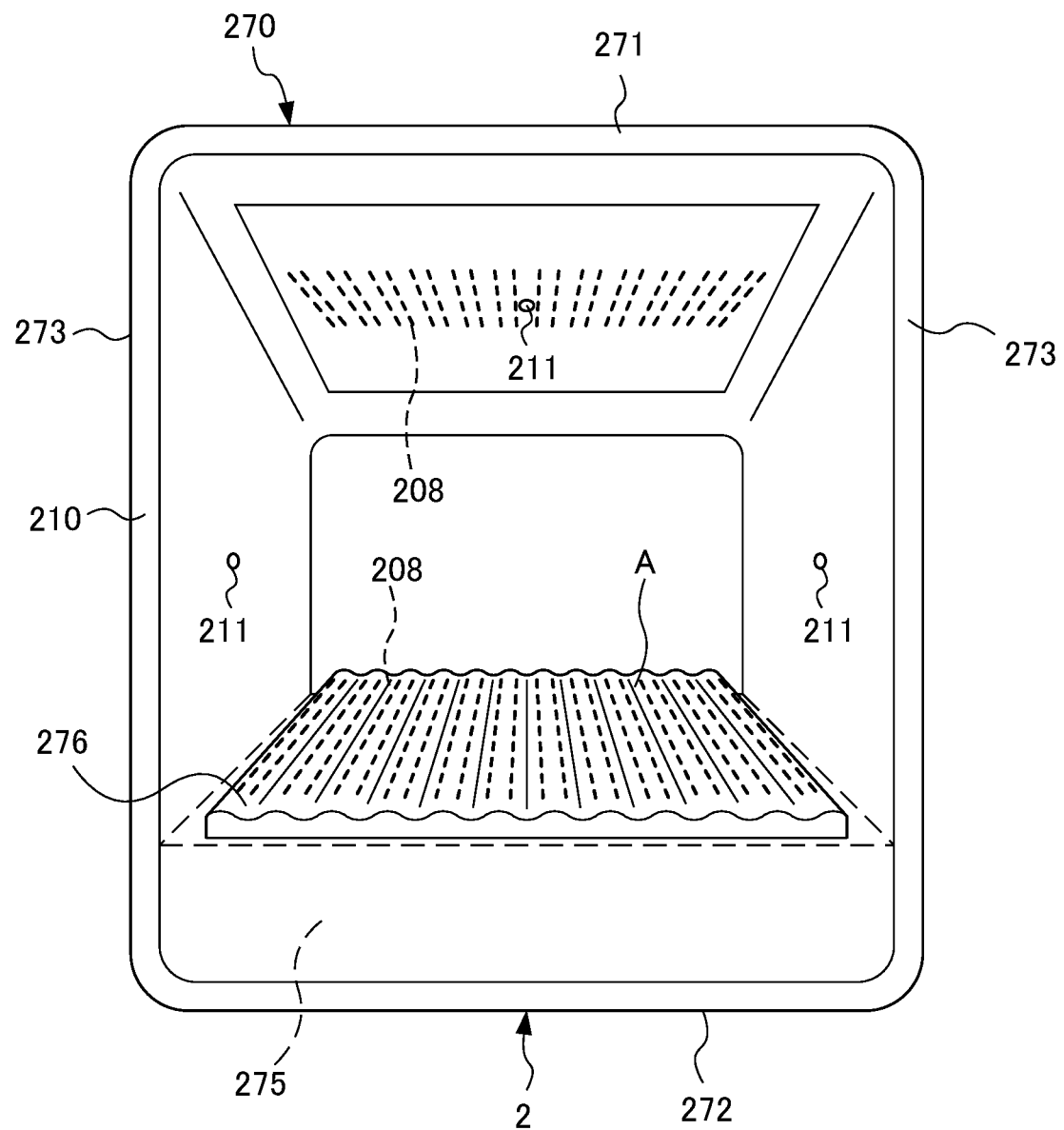
FIG. 3 is a schematic perspective view illustrating a configuration example of an external appearance of a cash register terminal employed in the first embodiment.

The information processing system of the first embodiment is a product recognition system including a cash register terminal 2 illustrated in FIG. 3 employed in a shop such as a convenience store illustrated in FIG. 2. The information processing system of the first embodiment can perform an automatic checkout when the product is placed on the cash register terminal.

FIG. 2 is a diagram illustrating a layout example in a case in which a shop employing the information processing system of the first embodiment is a convenience store. A cash register counter 12 is installed near a gateway 11 in a shop 10. An unattended cash register terminal 2 that performs an automatic checkout for products is installed on the cash register counter 12. A manned cash register 13 is installed next to this cash register terminal 2. A plurality of shelf racks 14 on which the products are displayed are installed in the shop 10, and a space between the shelf racks 14 facing each other is regarded as a passage 15 through which the shoppers move. The product in the shelf is picked up by the shopper moving through the passage 15 and placed on a predetermined area of the cash register terminal 2 (such as a predetermined area A of FIG. 3 to be described later). A plurality of products placed on the predetermined area are collectively specified and automatically checked out by the cash register terminal 2 using predetermined manipulation of the shopper on the cash register terminal 2 as a trigger. In the manned cash register 13, a clerk recognizes and checks out products one by one with a bar code as before.

A configuration example of an external appearance of the unattended cash register terminal 2 will be described with reference to FIG. 3. FIG. 3 is a schematic perspective view illustrating a configuration example of an external appearance of the cash register terminal 2. The cash register terminal 2 has a surrounding section 270 surrounding a predetermined area A on which an object is placed. The surrounding section 270 includes a top plate section 271, a bottom plate section 272, and a pair of side plate sections 273.

A cash register camera 211 that images the predetermined area A is fixed to each of the top plate section 271 and the pair of side plate sections 273. The cash register camera 211 images an object placed on the predetermined area A. Only three cash register cameras 211 are illustrated in FIG. 3, but there may be five cash register cameras 211, and the number of cash register cameras 211 is not limited as long as there are at least one or more cash register cameras 211. Although not illustrated, the cash register terminal 2 further includes a camera that images a face, hands, and the like of the shopper.

A housing section 275 is installed on the bottom plate section 272. A receipt output unit or a display unit (not illustrated in FIG. 3) (a receipt output unit R or a display unit D of an output unit 206 of FIG. 6 to be described later) is installed on the front of the housing section 275. A translucent plate 276 on which the object is placed is installed on the housing section 275. A board surface of the top surface of the plate 276 is defined as the predetermined area A. The board surface of the plate 276 is formed in a waveform shape. The waveform shape may be not only a sinusoidal waveform shape but also a rectangular waveform, and a pitch and an amplitude may be not only equal but also unequal. As described above, in the plate 276, the predetermined area A is formed by repeating forming a concave portion and a convex portion, so that at least a part of a columnar or spherical object is sandwiched between the convex portion and the convex portion and prevented from rolling.

A lighting unit 208 that illuminates the predetermined area A is installed in the plate 276 and in the top plate section 271 of the surrounding section 270. The lighting unit 208 may be installed in the side plate section 273 of the surrounding section 270. The lighting unit 208 emits various colors which are not limited such as blue and red in addition to white. When the lighting unit 208 emits light, a shadow of the object placed on the predetermined area A does not occur or decreases in the predetermined area A.

In the surrounding section 270, a color of a presenting unit 210 can be changed so that the state of the cash register terminal 2, for example, whether it is a normal standby state, in a checkout state, a state in which a clerk is manipulating, or a state in which an abnormal situation occurs can be visually recognized by color. At least the top plate section 271 and the side plate section 273 of the surrounding section 270 may be constituted by an instant dimming sheet so that switching between a transparent state in which it becomes transparent and an opaque state in which it becomes opaque is performed. In this case, visibility of the predetermined area A can be secured by causing the surrounding section 270 to enter the transparent state. By causing the surrounding section 270 to enter the opaque state, it is possible to acquire a captured object image while suppressing influence of external light at the time of photographing.

Figure 4:
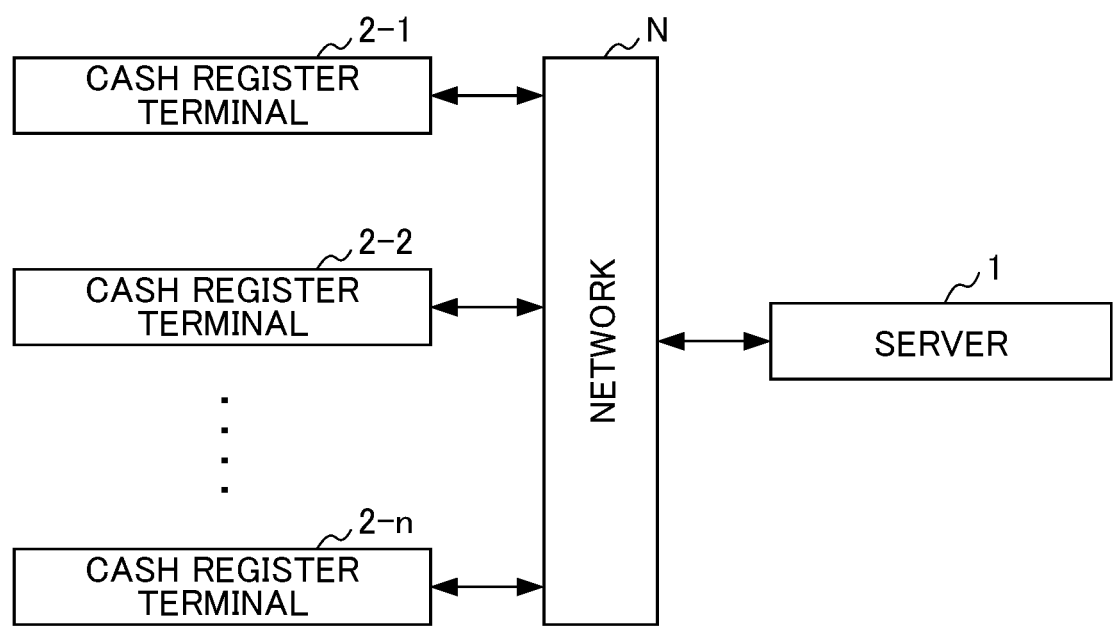
FIG. 4 is a configuration diagram illustrating a configuration of a product recognition system as a first embodiment of an information processing system of the present invention.

The cash register terminal 2 is incorporated into the product recognition system which is the first embodiment of the information processing system. FIG. 4 is a configuration diagram illustrating a configuration of the product recognition system which is the first embodiment of the information processing system of the present invention. The product recognition system of the first embodiment includes a server 1 and n cash register terminals 2-1 to 2-n (n is an arbitrary integer value of 1 or more). The server 1 and the n cash register terminals 2-1 to 2-n are connected to each other via a network N such as the Internet.

For the sake of convenience of description, only one server 1 is illustrated in FIG. 4, but in practice, there may be one or more servers 1. Hereinafter, in a case in which it is not necessary to distinguish the cash register terminals 2-1 to 2-n individually, they are collectively referred to as a "cash register terminal 2".

The server 1 executes each process to manage each operation of the cash register terminal 2. The cash register terminal 2 is placed on the cash register counter 12 illustrated in FIG. 2. The cash register terminal 2 specifies a quantity of objects placed on the predetermined area A of the cash register terminal 2 by the shopper, then specifies the product, and performs the automatic checkout.

Figure 5:
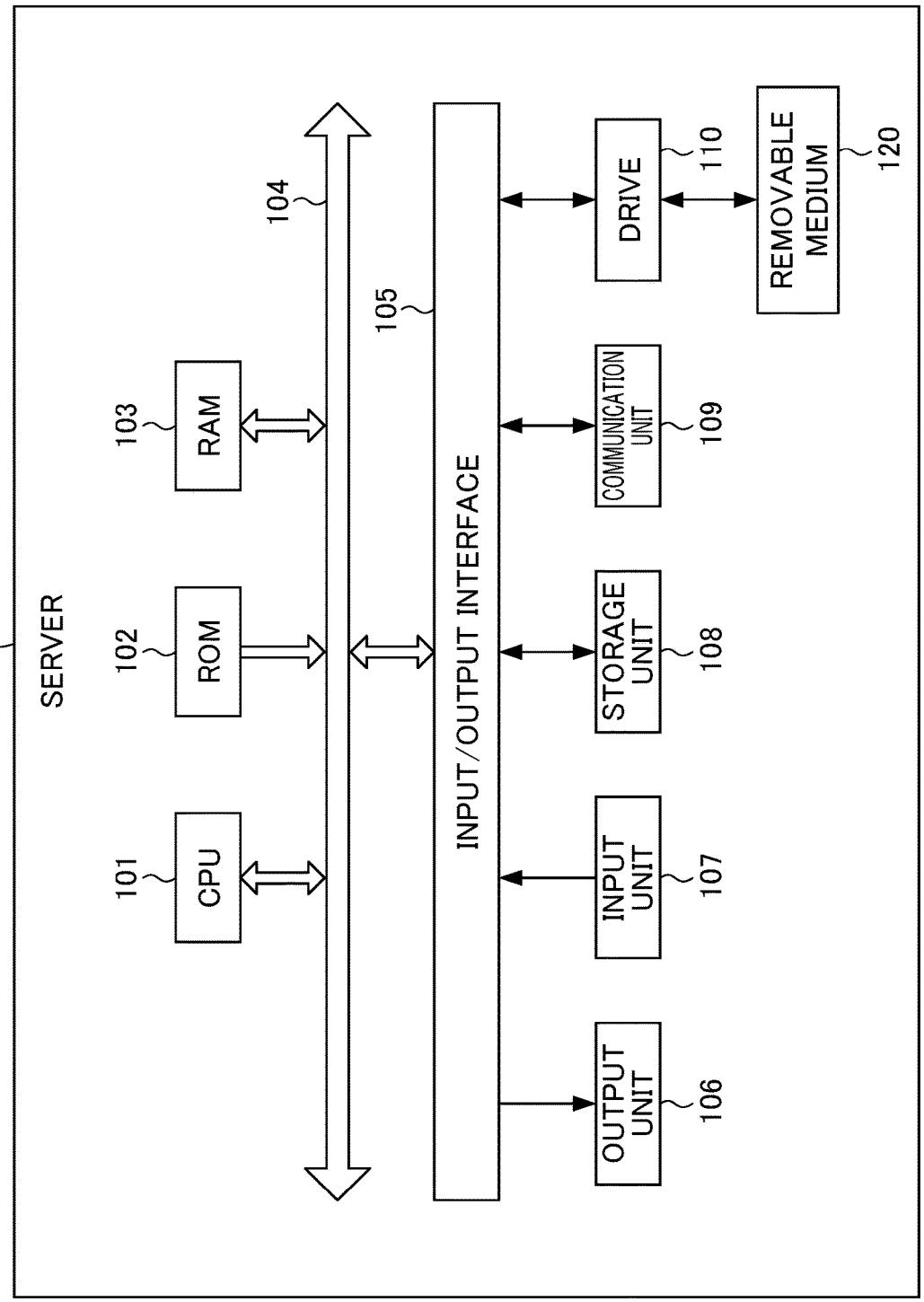
FIG. 5 is a block diagram illustrating a hardware configuration of a server in the product recognition system of FIG. 4.

FIG. 5 is a block diagram illustrating a hardware configuration of the server 1 in the information processing system of the first embodiment of FIG. 4. The server 1 includes a Central Processing Unit (CPU) 101, a read only memory (ROM) 102, a random access memory (RAM) 103, a bus 104, an input/output interface 105, an output unit 106, an input unit 107, a storage unit 108, a communication unit 109, and a drive 110.

The CPU 101 executes various kinds of processes in accordance with a program stored in the ROM 102 or a program loaded from the storage unit 108 onto the RAM 103. The RAM 103 stores data and the like necessary for the CPU 101 to execute various kinds of processes as appropriate.

The CPU 101, the ROM 102, and the RAM 103 are connected to one another via a bus 104. The input/output interface 105 is also connected to the bus 104. The output unit 106, the input unit 107, the storage unit 108, the communication unit 109, and the drive 110 are connected to the input/output interface 105.

The output unit 106 includes a display, a speaker, or the like, and outputs various kinds of information as an image and a voice. The input unit 107 includes a keyboard, a mouse, or the like, and receives various kinds of information.

The storage unit 108 is constituted by a hard disk, a dynamic random access memory (DRAM), or the like, and stores various kind of data. As illustrated in FIG. 4, the communication unit 109 communicates with the cash register terminal 2 via the network N including the Internet.

A removable medium 120 constituted by a magnetic disk, an optical disk, a magneto-optical disk, a semiconductor memory, or the like is appropriately loaded onto the drive 110. A program read from the removable medium 120 by the drive 110 is installed in the storage unit 108 as necessary. The removable medium 120 can also store various kinds of data stored in the storage unit 108, similarly to the storage unit 108.

Figure 6:
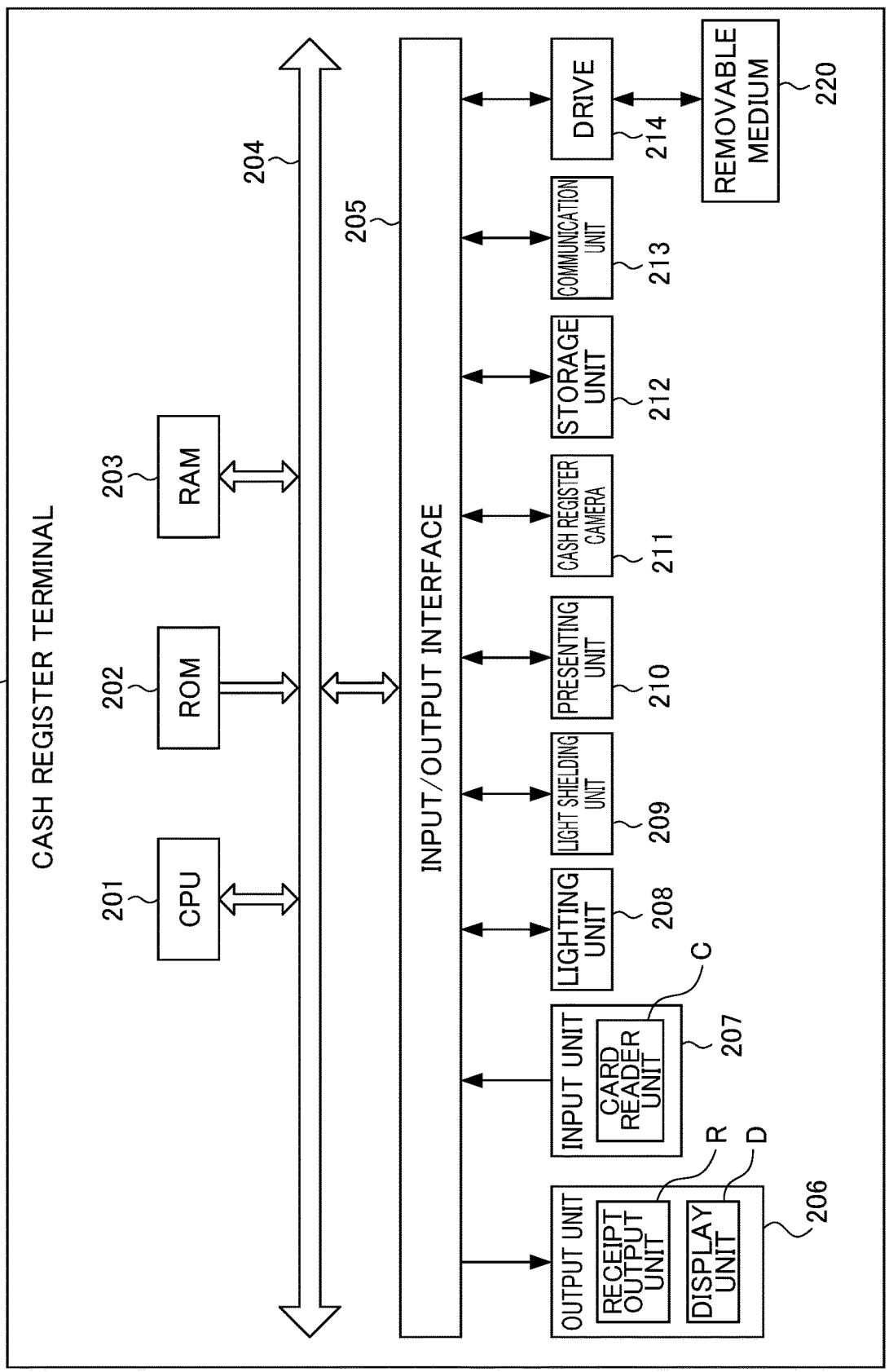
FIG. 6 is a configuration diagram illustrating a hardware configuration of a cash register terminal in the product recognition system of FIG. 4.

FIG. 6 is a block diagram illustrating a hardware configuration of the cash register terminal 2 in the information processing system of the first embodiment of FIG. 4. The cash register terminal 2 includes a CPU 201, a ROM 202, a RAM 203, a bus 204, an input/output interface 205, an output unit 206, an input unit 207, a lighting unit 208, a light shielding unit 209, a presenting unit 210, a cash register camera 211, a storage unit 212, a communication unit 213, and a drive 214. A removable medium 220 is appropriately mounted on the drive 214.

The CPU 201, the ROM 202, the RAM 203, the bus 204, the input/output interface 205, the storage unit 212, the communication unit 213, the drive 214, and the removable medium 220 of the cash register terminal 2 are configured similarly to those of the server 1.

The output unit 206 is installed in the housing section 275 illustrated in FIG. 3. The output unit 206 includes a display unit D that displays information related to a product, information related to a checkout, or the like and a receipt output unit R that outputs a receipt. The input unit 207 is installed in the housing section 275 illustrated in FIG. 3. The input unit 207 includes a touch panel (not illustrated) and a card reader unit C.

The light shielding unit 209 switches the surrounding section 270 illustrated in FIG. 3 between the transparent state and the opaque state in a case in which the surrounding section 270 includes an instant light control sheet. The presenting unit 210 performs switching so that the presenting unit 210 illustrated in FIG. 3 emits light in different colors so that it can be understood whether the state of the cash register terminal 2 is the normal standby state, in the checkout state, a state in which the clerk is manipulating, the state in which the abnormal situation occurs, or the like. The presenting unit 210 is installed not only on the front surface but also on the back surface. The cash register camera 211 captures an object placed on the predetermined area A and outputs one or more captured images obtained as a result as the captured object image.

FIG. 7 is a functional block diagram illustrating an example of a functional configuration of the server 1 of FIG. 5 and the cash register terminal 2 of FIG. 6. In the CPU 101 of the server 1, a DB management unit 141 functions. A product DB 131 is installed in one region of the storage unit 108 of the server 1. The product DB 131 is a database (DB) that stores information related to the product.

In the CPU 201 of the cash register terminal 2, as illustrated in FIG. 7, a light emission control unit 228, a light shielding control unit 229, a presentation control unit 230, an individual authenticating unit 231, an image acquiring unit 232, an object recognizing unit 233, an object quantity recognizing unit 234, a product specifying unit 235, a selling-restricted product determining unit 236, a checkout unit 237, and a display control unit 238 function. The cash register terminal 2 includes a DB information holding unit 241 that holds personal information and product information.

The light emission control unit 228 of the CPU 201 of the cash register terminal 2 executes control such that switching between a state in which the lighting unit 208 is caused to emit light at a timing at which an object is imaged and a state in which the lighting unit 208 is caused not to emit light at a timing at which an object is not imaged or control such that an emission color of the lighting unit 208 is switched depending on a situation in which an object or the like placed on the predetermined area A is recognized. The light shielding control unit 229 switches the surrounding section 270 between the opaque state and the transparent state in a case in which the surrounding section 270 includes an instant light control sheet. In other words, the light shielding control unit 229 executes control such that the light shielding unit 209 included in the surrounding section 270 is switched from one of the opaque state at the timing at which the object placed on the predetermined area A is imaged and the transparent state at the timing at which the object is not imaged to the other. The presentation control unit 230 executes control such that the presenting unit 210 changes the emission color presenting the state of the cash register terminal 2.

The individual authenticating unit 231 performs individual authentication on the shopper with reference to the personal information managed by the DB information holding unit 241 or the DB management unit 141 in the middle of the checkout process. Specifically, the individual authenticating unit 231 carries out an authentication process using an authentication technique such as various kinds of biometric authentication such as face authentication, card authentication, fingerprint authentication, vein authentication, iris authentication, or the like before product image recognition. The personal information managed by the DB management unit 141 includes information such as age, an allergy, halal, or the like. Therefore, the personal information acquired by the individual authenticating unit 231 is used by the selling-restricted product determining unit 236. The image acquiring unit 232 acquires the captured object image captured by the cash register camera 211 when the object is placed on the predetermined area A as illustrated in FIGS. 8A-8C.

Figure 8A:
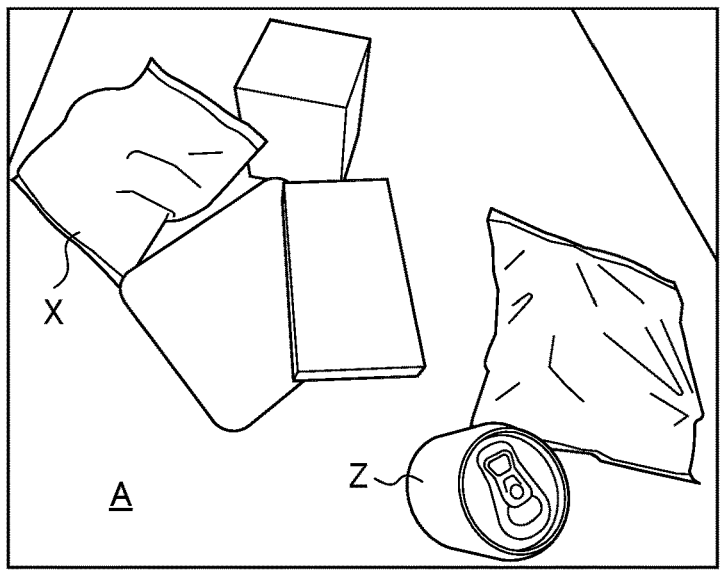
FIGS. 8A-8C illustrate an example of an imaging screen of an object placed on a cash register terminal.
Figure 8B:
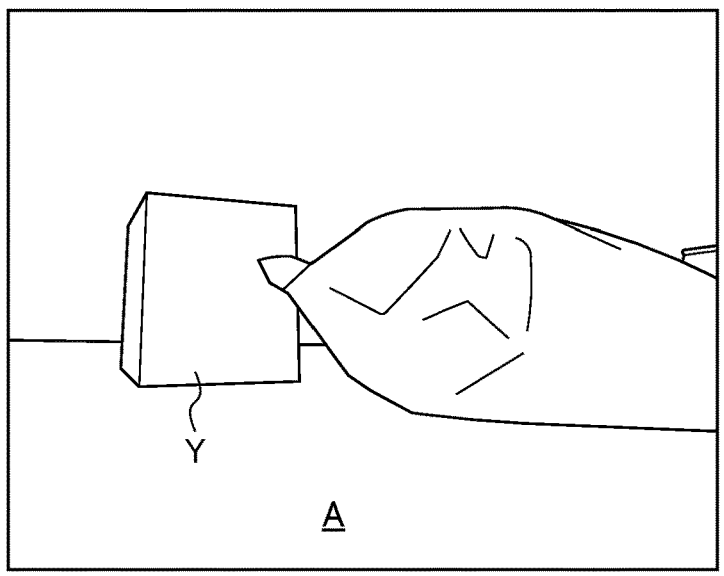
Figure 8C:
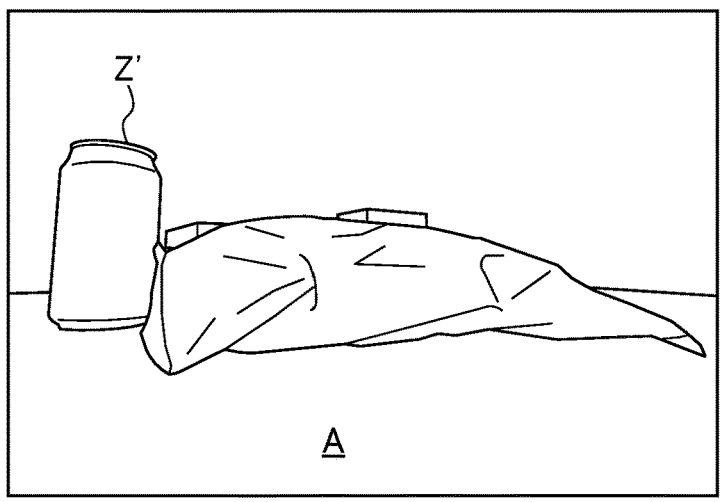

FIGS. 8A-8C illustrate an example of the imaging screen of the object placed on the cash register terminal 2. Here, FIGS. 8A-8C are diagrams illustrating an example of the captured object image obtained as a result of imaging the objects X, Y, Z, and Z' placed on the predetermined area A through each of the three cash register cameras 211. FIG. 8A illustrates an example of the captured object image obtained as a result of imaging the objects X, Y, Z, and Z' by the cash register camera 211 fixed to the top plate section 271 of the cash register terminal 2. The captured object image includes six objects. The captured object image includes all the objects X, Y, Z, and Z' which are placed on the predetermined area A and imaged since there are no objects X, Y, Z, and Z' which are shadows of objects. FIG. 8B illustrates an example of the captured object image obtained as a result of imaging the objects X, Y, Z, and Z' by the cash register camera 211 fixed to one side plate section 273 of the cash register terminal 2. The captured object image includes two objects. The captured object image is in a state in which the objects X, Y, Z, and Z' on the side of the cash register camera 211 hide the object on the back side. FIG. 8C illustrates a captured image obtained as a result of imaging the objects X, Y, Z, and Z' by the cash register camera 211 fixed to the other side plate section 273 of the cash register terminal 2. The captured object image includes two objects. The captured object image is in a state in which the objects X, Y, Z, and Z' on the side of the cash register camera 211 hide the object on the back side. One of the two objects Z included in the captured object image of each of FIG. 8B and FIG. 8C is the same object Z', but the other is a different object.

The object recognizing unit 233 recognizes the presence of the object placed on the predetermined area A from the captured object image acquired by the image acquiring unit 232 using a predetermined image recognition technique described above. In other words, the object recognizing unit 233 recognizes the presence of the object by comparing a background image before the object is placed on the predetermined area A of the cash register terminal 2 with the captured object image after the object is placed and defining (specifying) an object region for each object by a background difference process. The object recognizing unit 233 may recognize the presence of the object by defining the object region only from the captured object image without comparing a background image before the object is placed on the predetermined area A with the captured object image after the object is placed using a method other than the background difference process.

The object quantity recognizing unit 234 recognizes a quantity of objects placed on the predetermined area A by comparing an object recognition quantity with a checkout quantity. The object recognition quantity is a quantity of objects recognized by the object recognizing unit 233 from the captured object image captured by a plurality of cash register cameras 211 of the cash register terminal 2. The checkout quantity is a quantity of products of a checkout target. The object recognition quantity may differ depending on the cash register camera 211 as illustrated in FIGS. 8A-8C. In other words, in FIG. 8A, the six objects are imaged, but in FIGS. 8B and 8C, the two objects are imaged. In this case, the object quantity recognizing unit 234 recognizes the quantity of objects by obtaining a logical sum as illustrated in FIG. 9.

FIG. 9 is a diagram illustrating an example of a truth table for calculating the number of objects placed on the cash register terminal 2. In FIG. 9, when the first to fifth cash register cameras 211 installed in the cash register terminal 2 (FIG. 3) image the objects X, Y, Z, and Z' illustrated in FIGS. 8A-8C, a case in which the object is imaged is indicated by "1", and a case in which the object is not imaged is indicated by "0". Since the object Z and the object Z' are the same object but different in the imaging cash register camera 211, it indicates that the same object is imaged in different states. In FIG. 9, the first cash register camera 211 is indicated by "cash register counter camera 1", and similarly, the second to fifth cash register cameras 211 are indicated by "cash register counter camera 2" to "cash register counter camera 5". In the example of FIG. 9, the object X is imaged by the first, fourth, and fifth cash register cameras 211. The object Y is imaged by the second, fourth, and fifth cash register cameras 211. The object Z is imaged by the second, third, and fifth cash register cameras 211. The object Z' is imaged by the first and third cash register cameras 211.

In the example of FIG. 9, there is no product imaged by all the first to fifth cash register cameras 211. Further, since the object Z and the object Z' are the same product but different in the imaging cash register camera 211, the object Z and the object Z' are imaged as different objects. This is because an angle of the imaging cash register camera 211 is different. In this regard, the object quantity recognizing unit 234 certifies the quantity of products by a technique using a logical sum. In other words, even when objects are placed on the predetermined area A while overlapping each other or when an object is placed on the predetermined area A to be a shadow of another object, an object imaged by one of the cash register cameras 211 is recognized as being placed on the predetermined area A by using a logical sum.

As described above, in a case in which the object recognition quantity recognized from a plurality of captured object images using the truth table is not identical with the checkout quantity, the object quantity recognizing unit 234 outputs information indicating that the quantities are different to the display control unit 238.

Returning to FIG. 7, the product specifying unit 235 matches the object whose presence is recognized by the object recognizing unit 233 with the product information held in the DB information holding unit 241. In other words, the product specifying unit 235 first lists product candidates by an image processing technique such as specific object recognition, general object recognition, deep learning, or the like. The listed product candidates are referred to as a "product candidate list S". Thereafter, the product specifying unit 235 performs a verification function and specifies the product with a high degree of accuracy.

The verification function is a function of generating a "product candidate list P" by an algorithm different from the technique of listing the product candidates. Results of the product candidate lists S and P are matched, and in a case in which a predetermined threshold value is exceeded, the product is specified. For example, the technique of generating the "product candidate list" may be realized by a method of matching image information of an object obtained from the object whose presence is recognized with image information held in the DB information holding unit 241 or a memory. In other words, if feature information of both images is identical (the threshold value is exceeded), since the object whose presence is recognized by the object recognizing unit 233 is the product registered in the DB information holding unit 241, the product specifying unit 235 specifies the object as the product registered in the DB information holding unit 241.

Here, a specific example of outputting a result as product unspecifying when the product specifying unit 235 fails to specify the product by the image processing technique will be described. First, the product specifying unit 235 compares the product image stored in the DB information holding unit 241 with the captured object image captured in the predetermined area A, and calculates a feature point (a similar feature points) in which both images are similar and a feature quantity. Then, the product specifying unit 235 reads the feature point and the feature quantity of the image of the product included in the product candidate list from the product DB 131 of the server 1. Then, the product specifying unit 235 compares the feature quantity of each feature point of the product included in the read product candidate list with the feature quantity of each feature point of the recognized object, and matches the similar feature point of the product image stored in the DB information holding unit 241 with the similar feature point of the captured object image captured in the predetermined area A.

Then, the product specifying unit 235 compares a positional relation using corresponding point coordinates of each set of similar feature points, removes a set of similar feature points that does not properly correspond in a change by rotation or translation (which does not coincide in a positional relation), and calculates the number of remaining similar feature points. In a case in which the number of similar feature points is less than a threshold value, the product specifying unit 235 regards the case as product unspecifying.

In the method of regarding the case as product unspecifying, there are cases in which a product such as a lunch bag which is not a package product is recognized as an unspecified product. In the lunch bag, positions of side dishes may be slightly different, and in this case, it is likely to be regarded as an unspecified product. In this case, the product specifying unit 235 may detect various kinds of codes such as a multidimensional code including a bar code or letters such as a product name described in a label attached to a product, read the product name, the product code, or the like on the basis of the product information stored in the DB information holding unit 241 or the product DB 131 of the server 1, and specify the product.

Further, the product specifying unit 235 verifies a similar product or a relevant product (hereinafter referred to as a "group product") using the product information stored in the DB information holding unit 241 or the product DB 131 of the server 1. For example, for group products of series which are different in size, color, or the like, the product specifying unit 235 performs a threshold value comparison using features such as sizes, colors, or the like of the products. In a case in which a threshold value thereof is less than a predetermined threshold value, the product specifying unit 235 regards the case as product unspecifying.

On the basis of the determination information, the selling-restricted product determining unit 236 determines whether or not the product specified by the product specifying unit 235 corresponds to a selling-restricted product. Examples of the selling-restricted product include (A) products which are not allowed to be purchased by people under a certain age such as tobacco or alcohols, (B) expired/out-of-date products, (C) products which are prohibited to be taken due to physical constitution since allergic ingredients are included, and (D) religious restricted products such as products other than halal foods.

The checkout unit 237 calculates a total amount for all the products specified by the product specifying unit 235. At that time, in a case in which the selling-restricted product determining unit 236 determines that there is a selling-restricted product, it is necessary to release the restriction on all the selling-restricted products. In this regard, the checkout unit 237 reads a price of the product placed on the predetermined area A from the DB information holding unit 241 and causes the price to be displayed on the display unit D (FIG. 6).

In a case in which the object quantity recognizing unit 234 determines that the object recognition quantity does not coincide with the checkout quantity, the display control unit 238 performs control such that a warning is given to the shopper or the clerk by the output unit 206 to confirm the quantity of the product. In a case in which the selling-restricted product determining unit 236 certifies that the object is the selling-restricted product, the display control unit 238 performs control such that the output unit 206 gives a warning indicating that the object is the selling-restricted product to the shopper or the clerk. Further, in a case in which the total amount is calculated by the checkout unit 237, the output unit 206 is controlled so that the product name, the price, or the like of the product is displayed for the shopper and the clerk. The selling-restricted product determining unit 236 certifies that the object is the selling-restricted product, and a warning indicating that effect is presented from the presenting unit 210 or the output unit 206. The clerk who notices the presentation determines whether or not the selling-restricted product is permitted to be sold. In a case in which it is determined that selling-restricted product is permitted to be sold, the clerk releases the presentation. The present product recognition system has a remote control unit 17 that gives an instruction on the release. The remote control unit 17 is carried by the clerk who is away from the cash register terminal 2 or installed in a backyard of the shop. A signal from the remote control unit 17 is input to the communication unit 213 of the cash register terminal 2. A single remote control unit 17 is configured to be able to remotely control a plurality of cash register terminals 2.

The product recognition system applied as an information processing system of this specification has a product registration system that images an external appearance of a product sold in the shop 10 and registers the product together with the product information such as the price of the product. The product registration may be performed within the shop 10 or may be performed outside the shop such as in a product manufacturer, wholesaler, or the like, and the place is not limited. The product registration system includes a registration image generating unit (not illustrated), a product master registering unit, a captured image acquiring unit, and a recognizing unit.

The registration image generating unit generates an image of the product which can be placed on the predetermined area A of the cash register terminal 2 as a product registration image. The product master registering unit registers the product registration image generated by the registration image generating unit and a product identifier uniquely assigned to the product included as a subject in the product registration image in association with each other. The captured image acquiring unit acquires a captured image of the object placed on the predetermined area A of the cash register terminal 2 as the captured object image. The product specifying unit 235 specifies a product to which the object whose presence is recognized belongs on the basis of the captured object image and the product registration image. The object recognizing unit 233 recognizes the presence of the object placed on the predetermined area A on the basis of the acquired captured object image. The product recognition system matches the captured object image of the object whose presence is recognized with the image of the product held in the DB information holding unit 241 or the storage unit 108 of the server 1 as described above, and a product to which the object belongs is specified by the product specifying unit 235.

In the shop 10 with such a product recognition system, it is possible to perform master registration with a product identifier uniquely assigned to the product by generating the product registration image and assigning the product identifier to the product included in the product registration image. Further, the product recognition system equipped with this product registration system can manage the product to which a bar code seal is unable to be attached.

Figure 10:
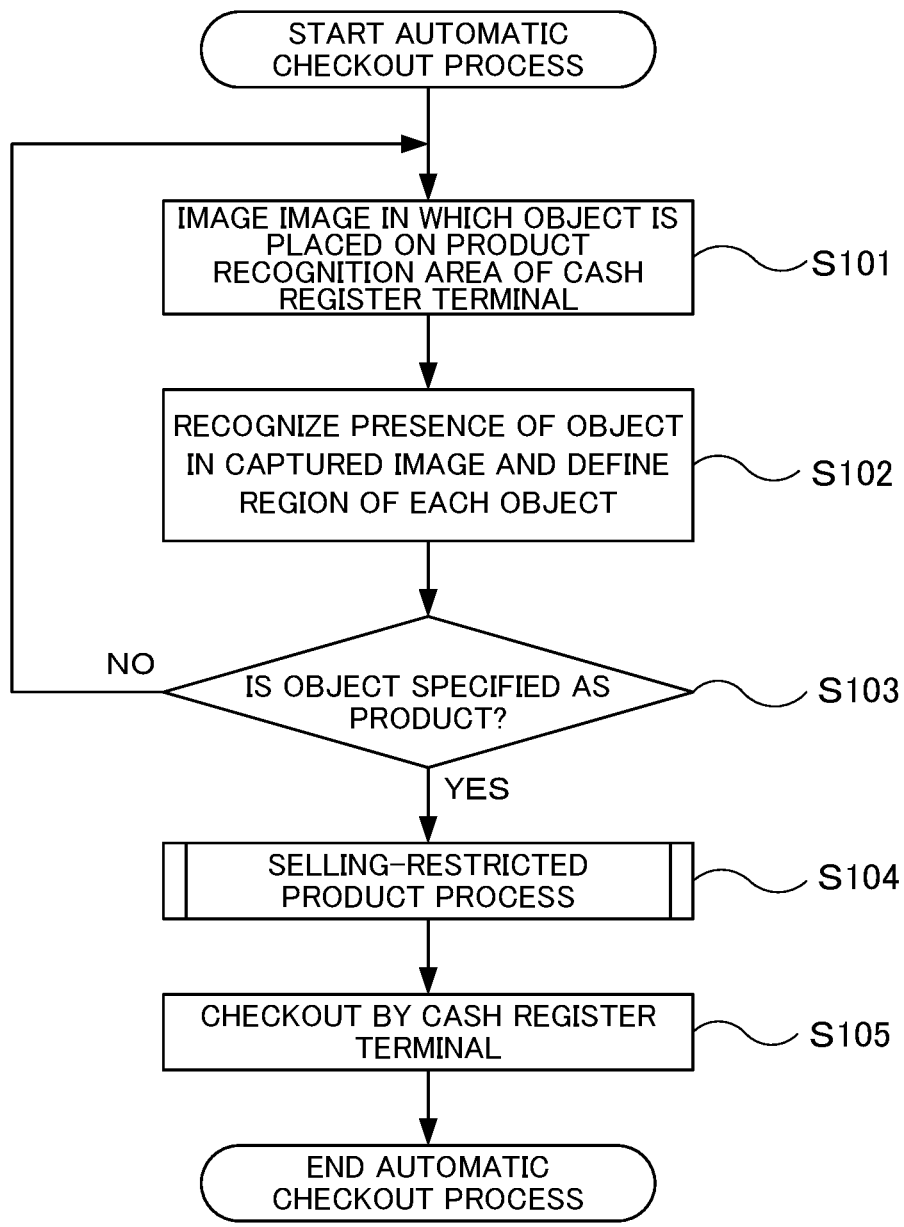
FIG. 10 is a flowchart for describing an automatic checkout process executed by the server and the cash register terminal of FIG. 7.

Here, a product checkout method in the product recognition system of the first embodiment will be described with reference to FIG. 10. FIG. 10 is a flowchart for describing a product checkout process executed by the server and the cash register terminal of FIG. 7. Prior to the automatic checkout process of product, an image of the predetermined area A which is imaged in advance in a state in which no object is placed on the predetermined area A of the cash register terminal 2 is stored in the image acquiring unit 232. The image of the predetermined area A which is imaged in advance is updated at a predetermined timing. The image may be shared even when the shopper is changed without being updated each time the shopper uses the cash register terminal 2. Then, when the shopper pushes a manipulation button of the cash register terminal, the automatic checkout process is started.

In step S101, the cash register camera 211 of the cash register terminal 2 captures an image after the object is placed on the predetermined area A of the cash register terminal 2. The image is input to the image acquiring unit 232 as the captured object image illustrated in FIGS. 8A-8C. The captured object image is illuminated in the cash register terminal 2 by the lighting unit 208 so that the shadow of object does not occur or is reduced. The captured object image may be input to the display control unit 238 and output from the output unit 206. Further, the cash register camera 211 of the cash register terminal 2 images the shopper so that the individual authenticating unit 231 performs individual authentication for the shopper.

In step S102, the object recognizing unit 233 of the cash register terminal 2 recognizes the presence of the object placed on the predetermined area A from the captured object image acquired by the image acquiring unit 232 using the above-described predetermined image recognition technique. In other words, the object recognizing unit 233 compares the background image before the object is placed on the predetermined area A of the cash register terminal 2 with the captured object image after the object is placed, defines (specifies) the object region for each object by the background difference process, and recognizes the presence of the object.

In step S103, the product specifying unit 235 of the cash register terminal 2 determines whether or not a product to which the object placed on the predetermined area A of the cash register terminal 2 belongs is specified. When the product specifying unit 235 fails to specify the product (NO in step S103), the presenting unit 210 of the cash register terminal 2 provides notification of an error state by a color, a sound, or the like. When the error state is caused by the product unspecifying, the object is placed again, a predetermined manipulation is performed in the cash register terminal 2, the process returns to step S101, and the object is imaged again. The placing again may be performed by the clerk who found the error state or may be performed by the shopper.

The error state occurs, for example, when the system processing of the cash register terminal 2 becomes abnormal, when the feature portion of the object is unable to be imaged, when the objects overlap or shadow, when the selling-restricted product is placed on cash register terminal 2, or when a product or a personal item is left on the cash register terminal 2. When the objects overlap or shadow, it is possible to specify the product to which the object belongs by placing the object again and imaging the object. When the product specifying unit 235 specifies the product in step S103 (YES in step S103), the product specifying unit 235 specifies the product together with the product name and the price held in the DB information holding unit 241 or the storage unit of the server 1 and the information indicating the selling-restricted product or the like. Accordingly, the process proceeds to step S104. The specified product information may be output to the display control unit 238.

In step S104, the selling-restricted product determining unit 236 executes the selling-restricted product process. The selling-restricted product process is a process of determining whether or not the specified product is the selling-restricted product. Specifically, for example, the selling-restricted product determining unit 236 determines whether the specified product is an age limit product, a non-halal product, a product including allergic ingredients, an expired/out-of-date product, or the like. The selling-restricted product process will be described later in detail with reference to FIG. 11. As the individual authentication is performed in advance at an arbitrary timing before step S104 (including step S101 or before), the selling-restricted product determining unit 236 can execute the selling-restricted product process for each shopper.

In step S105, the checkout unit 237 checks out the product placed on the predetermined area A. Specifically, the checkout unit 237 individually acquires the prices of the products specified in step S103, adds the prices, and checks out all the products placed on the predetermined area A. The product information such as the product names and the prices of the checked-out products is output from the display control unit 238 to the output unit 206, and displayed on the display unit D of the output unit 206, and a receipt is printed from receipt output unit R and output. Further, since the cash register terminal 2 is connected to the server 1 via the communication unit 213, the cash register terminal 2 can be used as a point of sale (POS). In other words, purchase information and age/sex estimation information of the checked products are shared with a POS system by the cash register terminal 2. When the quantity of the objects specified by the object quantity recognizing unit 234, the quantity of the products specified by product specifying unit 235, and the checkout quantity are different in S105, the presenting unit 210 of the cash register terminal 2 may present information indicating that effect. The cash register terminal 2 can cancel the checkout process by providing a cancellation function.

Figure 11:
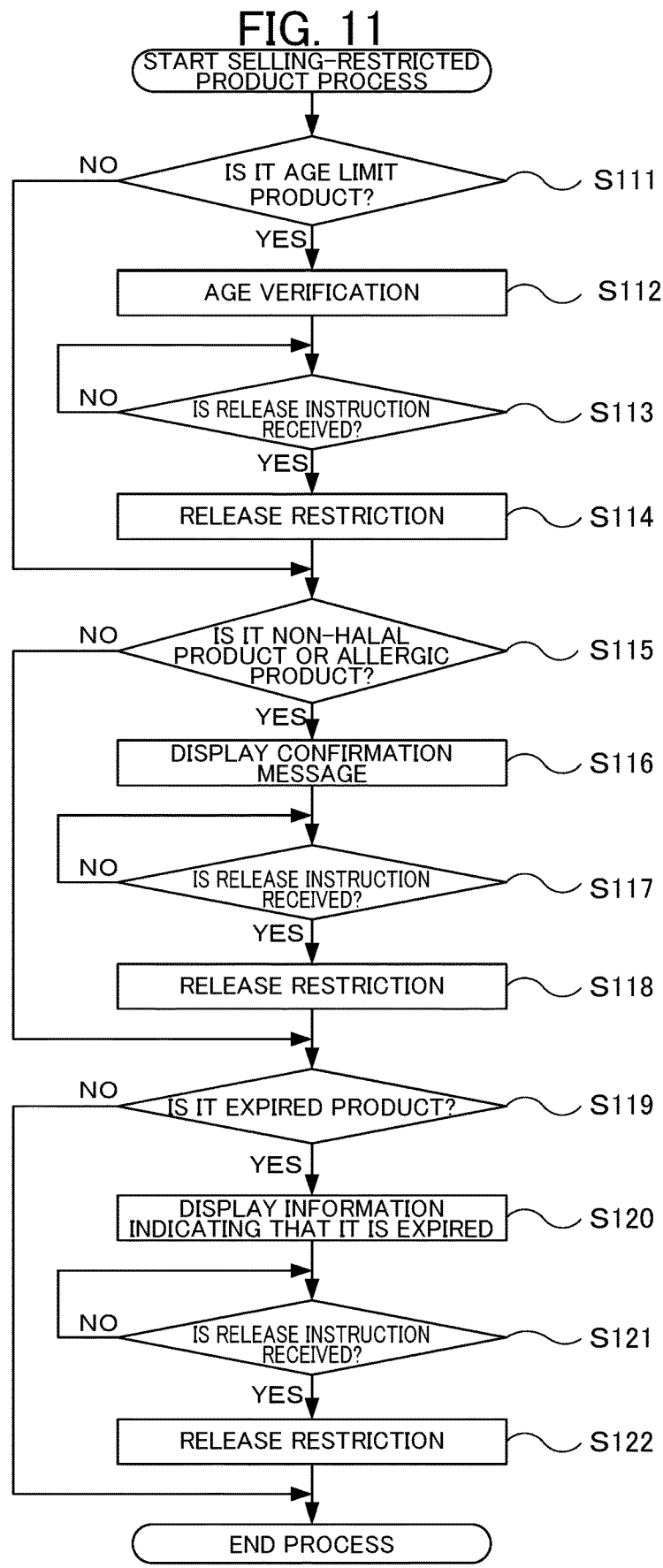
FIG. 11 is a flowchart for describing a process of a selling-restricted product in an automatic checkout process executed by the server and the cash register terminal of FIG. 7.

Then, the selling-restricted product process in step S104 will be described in detail with reference to FIG. 11. FIG. 11 is a flowchart for describing the selling-restricted product process executed by the server and the cash register terminal of FIG. 7.

In step S111, the selling-restricted product determining unit 236 determines whether or not the product specified by the product specifying unit 235 is a product requiring age verification such as alcoholic beverages.

When it is determined in step S111 that the product specified by the product specifying unit 235 is a product requiring age verification, that is, when a determination result is YES, the process proceeds to step S112. In step S112, the display control unit 238 causes the display unit D of the cash register terminal 2 to display an age verification screen. Here, personal information of the shopper is acquired, and when it is unnecessary to verify an age, step S112 is here skipped, and the process proceeds to step S114. In step S113, the selling-restricted product determining unit 236 determines whether or not an instruction to release the selling restriction is received.

When it is determined in step S113 that the instruction to release the selling restriction is not received, the process returns to step S113. In other words, the determination process of step S112 is repeated until the instruction to release the selling restriction is received. If it is determined in step S113 that the release instruction to release the selling restriction is received, that is, when a determination result is YES, the process proceeds to step S114. In step S114, the selling-restricted product determining unit 236 releases the selling restriction. Then, when step S114 ends or when it is determined in step S111 that it is not the age limit product (when a determination result is NO), the process proceeds to step S115.

In step S115, the selling-restricted product determining unit 236 determines whether or not the product specified by the product specifying unit 235 is a product other than a halal (permitted) food or whether or not it is an allergic product. When the selling-restricted product determining unit 236 determines that it is a product (a non-permitted product) other than the halal product or an allergic product, the process proceeds to step S116.

In step S116, the display control unit 238 causes the display unit D of the cash register to display that it is the product other than the halal product or that it is the allergic product. Here, the personal information of the shopper is acquired, and when it is not necessary to determine whether or not it is a non-halal product or an allergic product, step S116 is here skipped, and the processing proceeds to step S118.

In step S117, the selling-restricted product determining unit 236 determines whether or not an instruction to release the selling restriction is received. When it is determined that the instruction to release the selling restriction is not received, the process returns to step S117. In other words, the determination process of step 117 is repeated until the product is neither the product other than the halal product nor the allergic product, and so the instruction to release the selling restriction is received. When it is determined that an instruction to release the selling restriction is received, the process proceeds to step S118.

In step S118, the selling-restricted product determining unit 236 releases the selling restriction. Then, when step S118 ends or when it is neither a product other than the halal product nor an allergic product in step S115 (when a determination result is NO), the process proceeds to step S119.

In step S119, the selling-restricted product determining unit 236 determines whether or not the product specified by the product specifying unit 235 is an expired product. When the selling-restricted product determining unit 236 determines that the expired product is included, YES is determined in step S119, and the process proceeds to step S120.

In step S120, the display control unit 238 causes the display unit D of the cash register terminal 2 to display that the expired product is likely to be included. When it is determined in step S121 that the instruction to release the selling restriction is not received, NO is determined, and the process of step S121 is repeated. In other words, the determination process of step S121 is repeated until the instruction to release the restriction of the expired product is received.

When it is determined in step S121 that the instruction to release the selling restriction is received, YES is determined, and the process proceeds to step S122. In step 122, the selling-restricted product determining unit 236 releases the selling restriction. If the selling-restricted product determining unit 236 determines that the expired product is not included, NO is determined in step S119, and the process ends.

Accordingly, the selling restriction process ends. Then, the process proceeds to the checkout process in the cash register terminal in step 130. As described above, the information processing system can recognize and automatically check out the product placed on the cash register terminal.

The first embodiment is not limited to the above-described example, and variations, improvements, or the like within the scope in which the purpose of the present invention can be achieved are included in the present invention. For example, the external configuration of the cash register terminal 2 illustrated in FIG. 3 is an example, and the present invention is not limited to this external appearance. Any other component may be added as long as the cash register terminal 2 may include at least the predetermined area A, the imaging unit such the cash register camera 211, and the output unit 206. Further, in the product recognition system of the first embodiment, a conveyance mechanism (for example, a belt conveyor) for conveying one or more goods from an upstream side to a downstream side may be installed. A predetermined area having an imaging unit is arranged on the upstream side. A checkout area is arranged on the downstream side. In the predetermined area, a quantity of objects imaged by the imaging unit is counted. In the product recognition system, when the counted quantity of objects is different from the quantity of products checked out in the checkout area, it is detected as an error.

Second Embodiment

Figure 12:
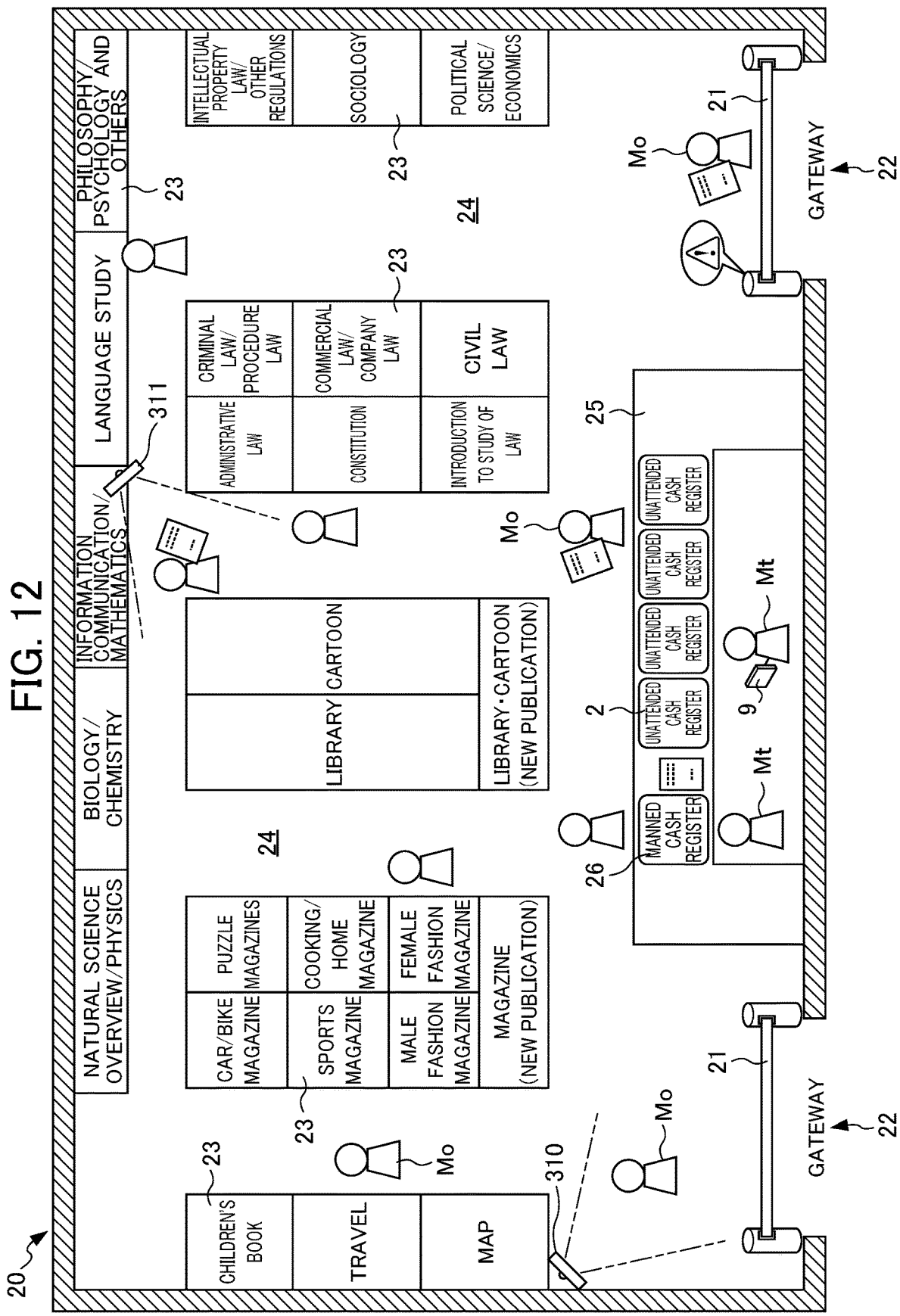
FIG. 12 is a diagram illustrating a layout example of a bookstore employing a product recognition system in a second embodiment.
Figure 13:
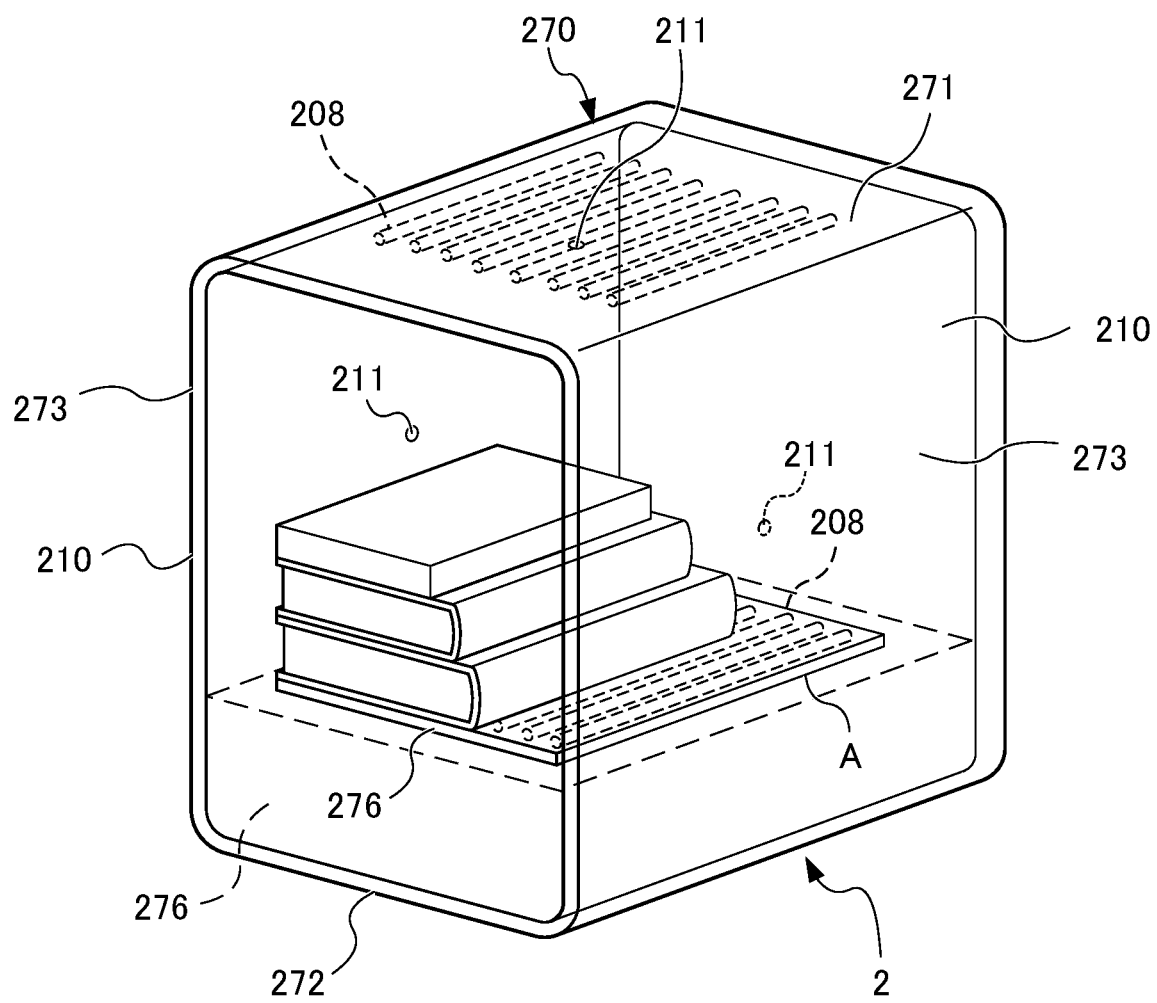
FIG. 13 is a schematic perspective view illustrating an example in which a book is automatically checked out through a cash register terminal employed in the second embodiment.

The information processing system of the second embodiment is a product recognition system including a cash register terminal 2 as illustrated in FIGS. 3 and 13 in a shop 20 such as a bookstore as illustrated in FIG. 12. In the information processing system of the second embodiment, a book which is the product is placed on the cash register counter so that the automatic checkout can be performed. FIG. 12 is a diagram illustrating a layout example of a bookstore employing the information processing system of the second embodiment.

A gateway 22 with a gate 21 is installed in the shop 20 such as a book store. Depending on the size of the shop 20, the number of gateways 22 is not limited to two as illustrated in FIG. 12, and one gateway or three or more gateways may be installed. In addition to a type including an opening/closing member as illustrated in FIG. 12, the gate 21 may be a type including a function for providing notification of the occurrence of an abnormal situation by a sound or a light such as a speaker or a lamp (not illustrated), so that misbehaviors can be coped with. Then, the shop 20 installs a plurality of shelf racks 23 on which the books are displayed. The shelf rack 23 includes a plurality of shelves arranged at intervals in a vertical direction, and the books are displayed thereon. A space between the shelf rack 23 and the shelf rack 23 facing each other in the horizontal direction is defined as a passage 24.

A plurality of ceiling cameras 310 (only one camera is illustrated in FIG. 12) are installed on a ceiling above the passage 24. The ceiling camera 310 constantly images the inside state of the shop without dead angle, and the shoppers who are in the shop. Further, a plurality of shelf cameras 311 (one only camera is illustrated in FIG. 12) which constantly image the inside of the shelf racks 23 may be installed in each shelf rack 23. A plurality of shelf cameras 311 are arranged to image the inside state of the shelf without dead angle and image the shopper standing in front of the shelf rack 43.

Further, a cash register counter 25 is installed near the gateway 22 in the shop 20. A plurality of unattended cash register terminals 2 that perform an automatic checkout are installed on the cash register counter 25. A manned cash register 26 is installed next to this cash register terminal 2. Further, a shopping basket (not illustrated) in which books are put may be placed near the gateway 22 or in the passage 24. A clerk Mt is working in the passage 24, the cash register counter 25, or the like. The clerk Mt carries an information terminal 9. The information terminal 9 is also installed in the backyard of the shop 20 or a general headquarter outside the shop 20.

The information processing system images a behavior of a shopper picking up or returning one or more books from or to the shelf of the shelf rack 23 through the ceiling camera 310, detects the number of books picked up by shopper, acquires information such as the prices of the books placed on the unattended cash register terminal 2 illustrated in FIG. 13, and performs the automatic checkout. In the second embodiment, the shopper is described as a "moving object Mo". FIG. 13 is a schematic perspective view illustrating a schematic configuration of the cash register terminal 2 employed in the second embodiment and illustrates a state in which a book is checked out (not numbered).

The unattended cash register terminal 2 of the second embodiment employs an external appearance configuration similar to that of the cash register terminal 2 of the first embodiment illustrated in FIG. 3. Therefore, the cash register terminal 2 includes a surrounding section 270 surrounding a predetermined area A on which the book is placed. The surrounding section 270 includes a top plate section 271, a bottom plate section 272, and a pair of side plate sections 273. This surrounding section 270 is configured similarly to the surrounding section 270 of the first embodiment illustrated in FIG. 3.

Therefore, cash register cameras 211 that image the predetermined area A are fixed to the top plate section 271 and a pair of side plate sections 273. At least one cash register camera 211 images at least a spine of a book placed on the predetermined area A as illustrated in FIG. 13. In FIG. 13, the books are placed against one side plate section 273 so that the spine faces the other side plate section 273, but the spine may face the cash register camera 211 installed in the top plate section 271, and a way in which the books are placed is not limited.

Figure 14:
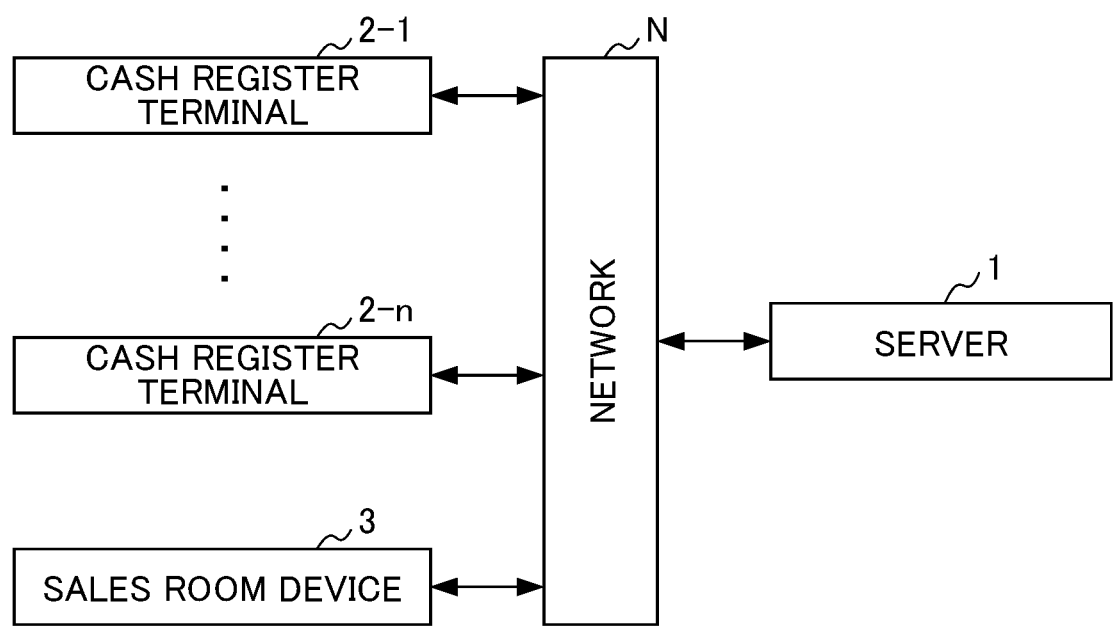
FIG. 14 is a configuration diagram illustrating a configuration of a product recognition system as the second embodiment of the information processing system of the present invention.

The cash register terminal 2 is incorporated into the product recognition system as one aspect of the information processing system. FIG. 14 is a configuration diagram illustrating a configuration of the product recognition system which is the second embodiment of the information processing system of the present invention. The product recognition system includes a server 1, cash register terminals 2-1 to 2-*n*, and a sales room device 3. The sales room device 3 has a function of recognizing the number of books from the captured image of the book imaged by the ceiling camera 310. The server 1 is installed in the backyard of the shop 20 or outside the shop to manage the cash register terminals 2-1 to 2-*n* and the sales room device 3. Further, the sales room device 3 controls the ceiling camera 310 installed in the shop 20 in order to discover and track the moving object Mo in the shop 20 illustrated in FIG. 12. The server 1, the cash register terminals 2-1 to 2-*n*, and the sales room device 3 are connected to one another via a network N such as an Internet line.

For the sake of convenience of description, only one server 1 is illustrated in FIG. 14, but in practice, there may be one or more servers 1. Hereinafter, in a case in which it is not necessary to distinguish the cash register terminals 2-1 to 2-*n* individually, they are collectively referred to as a "cash register terminal 2".

The server 1 executes each process to manage the operations of the cash register terminal 2 and the sales room device 3. The server 1 includes a CPU 101, a ROM 102, a RAM 103, a bus 104, an input/output interface 105, an output unit 106, an input unit 107, a storage unit 108, a communication unit 109, and a drive 110. These components are configured similarly to the server 1 described in the first embodiment illustrated in FIG. 5.

Figure 15:
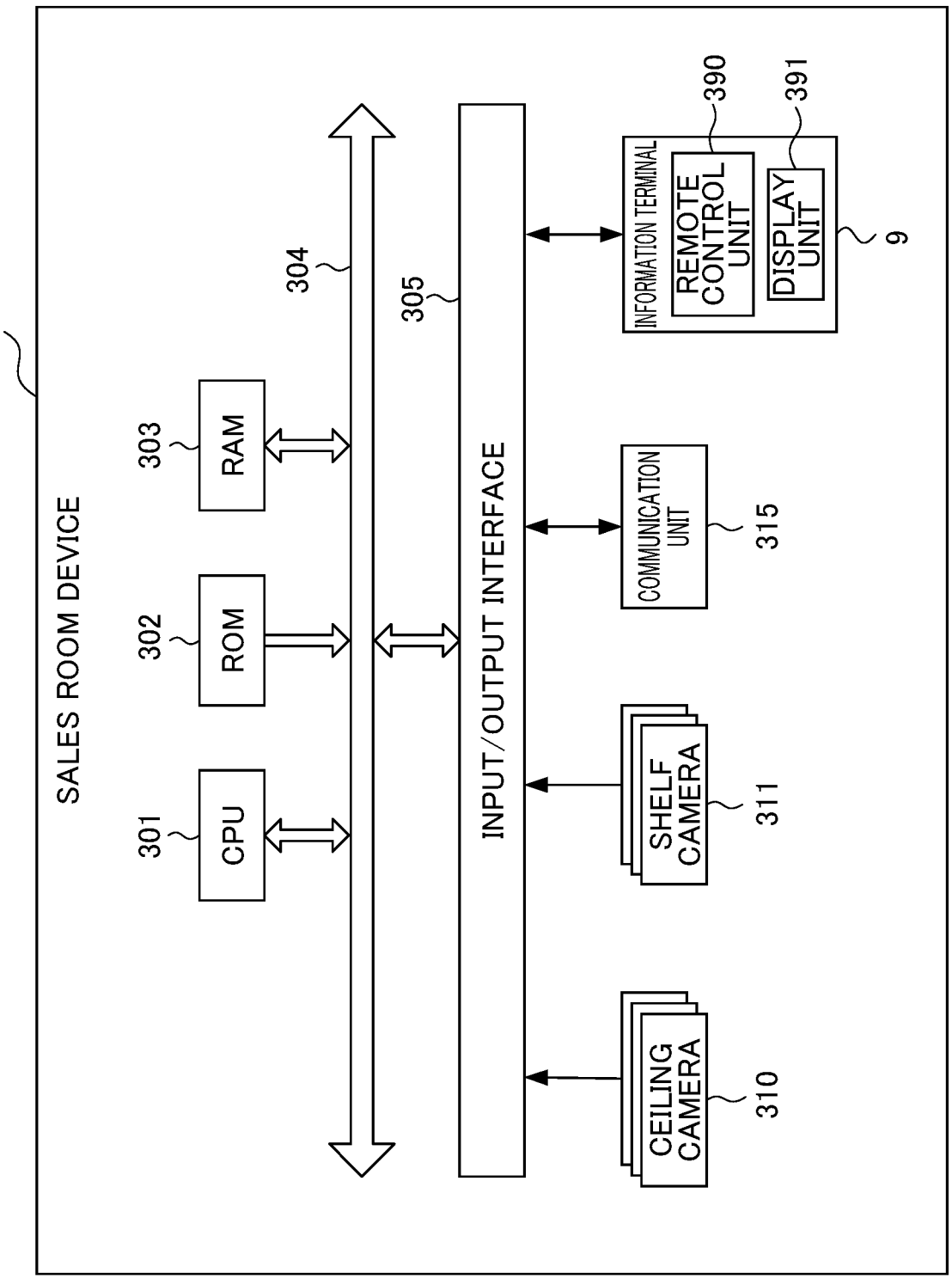
FIG. 15 is a block diagram illustrating a hardware configuration of a sales room device in the product recognition system of FIG. 14.

The sales room device 3 is connected to the server 1 via the network N. FIG. 15 is a block diagram illustrating a hardware configuration of the sales room device 3 in the product recognition system of FIG. 14.

The sales room device 3 includes a CPU 301, a ROM 302, a RAM 303, a bus 304, an input/output interface 305, a ceiling camera 310, a shelf camera 311, a communication unit 315, and an information terminal 9.

The CPU 301, the ROM 302, the RAM 303, the bus 304, the input/output interface 305, and the communication unit 315 of the sales room device are configured similarly to those of the server 1 illustrated in FIG. 5.

The ceiling camera 310 is connected with the network by a universal serial bus (USB) cable. As the shelf camera 311, a camera capable of performing imaging with a wide angle such as a fisheye camera may be employed. Further, the shelf camera 311 is connected with the network via a USB cable.

The information terminal 9 is an information device including a remote control unit 390, a display unit 391, and the like, such as a smartphone or a tablet. The remote control unit 390 has a function of solving the error state or the like such as a system processing abnormality through remote control. The display unit includes a screen on which the error state, the moving object Mo, and the like are displayed. Further, the information terminal 9 includes a sound generating unit (not illustrated) that provides notification of the error state. The error state in the shop occurs, for example, when the ceiling camera 310 is unable to recognize the number of books picked up from the shelf or when a non-checked out book is taken outside the shop. Further, the error state in the cash register terminal occurs, for example, when the cash register terminal 2 is unable to specify the book or is unable to recognize the number of books, when the age limit product is about to be checked out, or when a book is left on the cash register terminal 2. Further, the server 1 includes an error display unit 151 that displays such an error and an error releasing unit 152 that releases the error state.

The cash register terminal 2 is connected to the sales room device 3 via the network N. The cash register terminal 2 has a configuration similar to that of the cash register terminal of the first embodiment illustrated in FIG. 6. Therefore, the cash register terminal 2 of the second embodiment includes a CPU 201, a ROM 202, a RAM 203, a bus 204, an input/output interface 205, an output unit 206, an input unit 207, a lighting unit 208, a light shielding unit 209, a presenting unit 210, a cash register camera 211, a storage unit 212, a communication unit 213, and a drive 214.

The cash register camera 211 images the book placed on the predetermined area A and outputs the captured image obtained as a result to the image acquiring unit 232 in the CPU 201 as the captured object image. In a case in which the cash register camera 211 is capable of performing imaging with a wide angle as in a fisheye camera or specialized to image only the spine of the book, only one cash register camera 211 may be installed.

Figure 16:
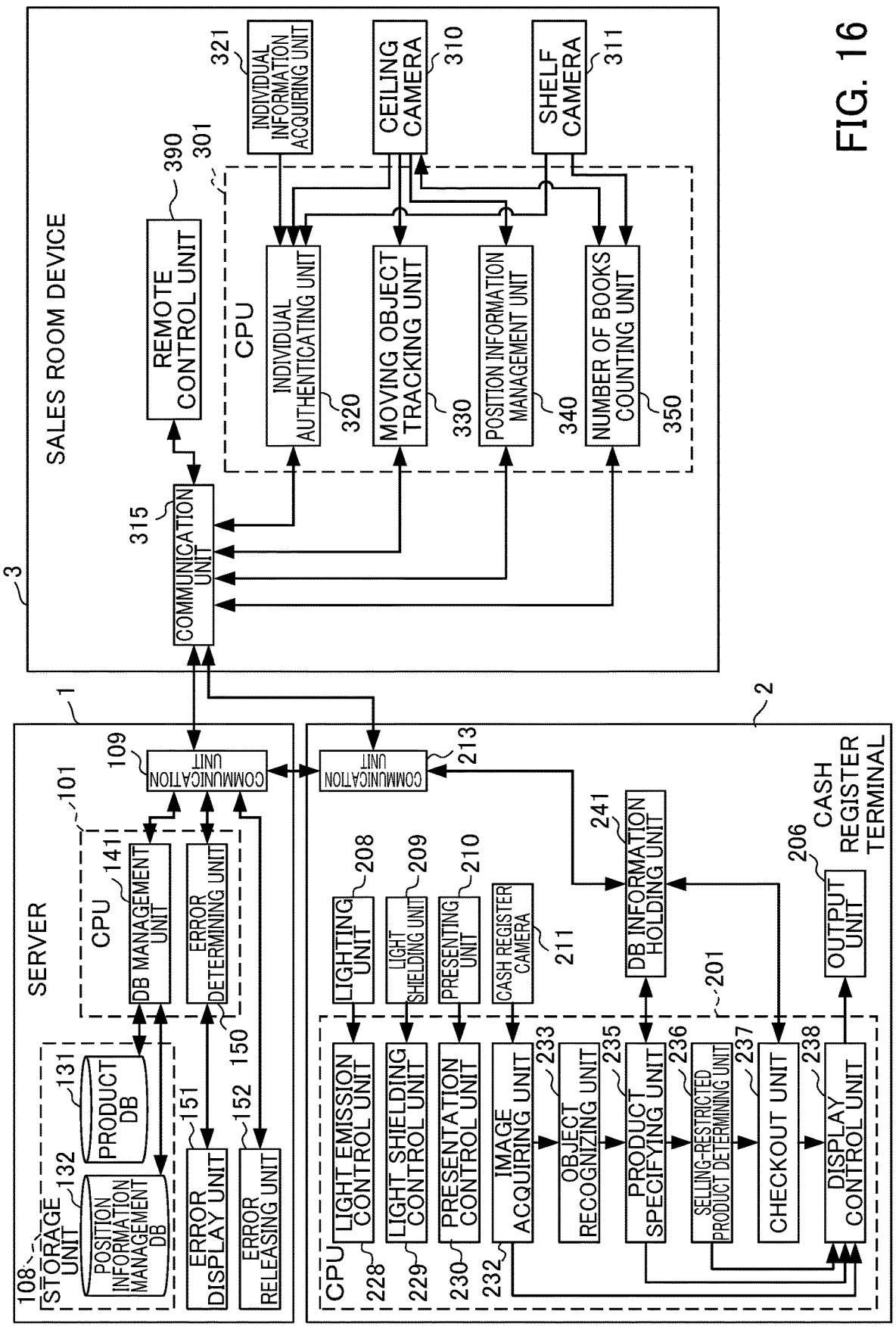
FIG. 16 is a functional block diagram illustrating an example of functional configurations of the server of FIG. 5, the cash register terminal of FIG. 6, and the sales room device of FIG. 15.

FIG. 16 is a functional block diagram illustrating an example of a functional configuration of the server 1 of FIG. 5, the cash register terminal 2 of FIG. 6, and the sales room device 3 of FIG. 15. The CPU 101 of the server 1 includes an error determining unit 150. A product DB 131 and a position information management DB 132 are installed in one region of the storage unit 108 of the server 1. The product DB 131 is a DB that stores information such as a book title, price, an author name, a publisher, and the like related to a book. The position information management DB 132 manages the position of the moving object Mo.

In the CPU 201 of the cash register terminal 2, as illustrated in FIG. 16, a light emission control unit 228, a light shielding control unit 229, a presentation control unit 230, an image acquiring unit 232, an object recognizing unit 233, a product specifying unit 235, a selling-restricted product determining unit 236, a checkout unit 237, and a display control unit 238 function.

The light emission control unit 228 performs control such that switching between a state in which the lighting unit 208 is caused to emit light at a timing at which the book is imaged and a state in which the light emission control unit 228 is caused not to emit light at a timing at which the book is not imaged or control such that an emission color is switched depending on a situation in which the book placed on the predetermined area A is recognized. The light shielding control unit 229 executes control such that the light shielding unit 209 included in the surrounding section 270 is switched between an opaque state at a timing at which the book placed on the predetermined area A is imaged and a transparent state at a timing at which the book is not imaged. The presentation control unit 230 executes control such that the presenting unit 210 changes the emission color presenting the state of the cash register terminal 2.

The image acquiring unit 232 acquires data of the object image captured by the cash register camera 211 when the object is placed on the predetermined area A. The object recognizing unit 233 recognizes the presence of the object placed on the predetermined area A by using the above-described predetermined image recognition technique.

The product specifying unit 235 lists the product candidates for the object whose presence is recognized by the object recognizing unit 233 through an image processing technique such as specific object recognition, general object recognition, character recognition, and deep learning. The listed product candidates are referred to as a "product candidate list S". Thereafter, the product specifying unit 235 performs the verification function and specifies the product with a high degree of accuracy. The verification function lists a "product candidate list P" by an algorithm different from the technique of listing the product candidates. Results of the product candidate lists S and P are matched, and in a case in which a predetermined threshold value is exceeded, the product is specified. For example, the technique of generating the "product candidate list" may be realized by a method of matching image information of an object obtained from the object whose presence is recognized with image information held in the DB information holding unit 241 or a memory. In other words, if feature information of both images is identical (the threshold value is exceeded), since the object whose presence is recognized by the object recognizing unit 233 is the product registered in the DB information holding unit 241, the product specifying unit 235 specifies the object as the product registered in the DB information holding unit 241.

On the basis of the determination information, the selling-restricted product determining unit 236 determines and presents whether or not the product specified by the product specifying unit 235 corresponds to a selling-restricted product. The selling-restricted product is, for example, a book which is restricted to be sold to the shoppers under a certain age. In a case in which the clerk sells books, the clerk who sees the shopper can check the age of the shopper and determine whether or not to sell the book. However, in the present system in which face-to-face selling is not performed, and the automatic checkout is employed, it is necessary for the clerk to be able to check the age of the shopper. The cash register terminal 2 which has specified the selling-restricted product presents that it is the selling-restricted product and suspends the checkout process. The clerk who has been informed of the error state through the error display unit 151 checks the age of the shopper, manipulates the cash register terminal 2, and releases the restricted state. Accordingly, the checkout process is restarted. Further, the cash register terminal 2 includes the cash register camera 211 that images the face, the hands, or the like of the shopper, and may estimate the age of the shopper and not sell the selling-restricted product to the shopper who is determined not to reach a predetermined age.

To this end, the selling-restricted product determining unit 236 specifies the selling-restricted product such as an age limit book from the information of DB management unit 141 of the server 1. The selling-restricted product determining unit 236 may impose the selling restriction on the basis of the information of the shopper obtained in the individual authentication. If it is determined that the book is the selling-restricted product, the display unit D presents information indicating that the book is the selling-restricted product.

The checkout unit 237 calculates a total amount of books which are specified by the product specifying unit 235 and determined to be sold by the selling-restricted product determining unit 236. For example, the checkout unit 237 reads the prices of the books placed on the predetermined area A from the DB information holding unit 241, adds the prices, causes the total amount to be displayed on the display unit D (FIG. 6), and checks out the total amount.

The display control unit 238 performs control such that the titles, the prices, and the like of the books which are imaged by the cash register camera 211 of the cash register terminal 2 and checked out by the checkout unit 237 are displayed for the purchaser and the clerk.

In the CPU 301 of the sales room device 3, as illustrated in FIG. 16, an individual authenticating unit 320, a moving object tracking unit 330, a position information management unit 340, a number of books counting unit 350, a basket product recognizing unit 370, and a selling-restricted product determining unit 380 function.

The individual authenticating unit 320 has a personal information acquiring unit 321. The individual authenticating unit 320 performs individual authentication of who the shopper registered in the DB management unit 141 of the server 1 is from the personal information of the shopper acquired by the personal information acquiring unit 321. The individual authenticating unit 320 and the personal information acquiring unit 321 may be installed in the cash register terminal 2 similarly to the first embodiment.

Here, the personal information includes biometric information such as a fingerprint, a vein, or an iris and information related to privacy such as financial-related information such as a credit card number or a bank account number in addition to information identifying an individual such as a name, a sex, a date of birth, an address, a phone number, and the like. The personal information acquiring unit 321 is installed, for example, in the gate 21 installed in the gateway 22. This personal information acquiring unit 321 employs a scanning device which is touched by a portable information terminal such as an IC card of shopper, a smart phone, or a tablet, a scanning device that reads biometric information such as a fingerprint, a vein, an iris, or the like.

In a case in which individual authentication is unable to be performed when the shopper enters the shop, the individual authentication may be performed from the image of the shopper captured by the ceiling camera 310 during shopping. The acquired personal information is used for selling restriction (including release) and purchase analysis.

Figure 17:
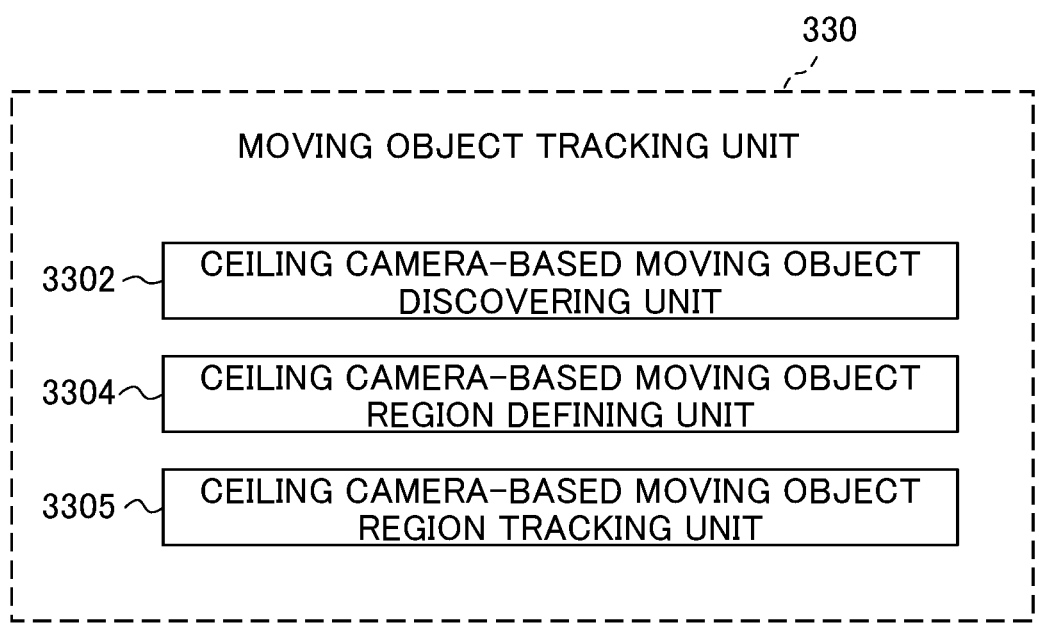
FIG. 17 is a functional block diagram illustrating a detailed functional configuration example of a moving object tracking unit installed in the sales room device of FIG. 16.

FIG. 17 is a functional block diagram illustrating a detailed functional configuration example of the moving object tracking unit 330 installed in the sales room device 3 of FIG. 16. As illustrated in FIG. 17, the moving object tracking unit 330 includes a ceiling camera-based moving object discovering unit 3302, a ceiling camera-based moving object region defining unit 3304, and a ceiling camera-based moving object region tracking unit 3305 in order to discover the moving object Mo from the image captured by the ceiling camera 310 and track the moving object Mo which is moving.

The moving object tracking unit 330 using the ceiling camera is connected with the ceiling camera 310 via a USB cable, the network N, or the like. Therefore, the ceiling camera 310 is cooperated with other ceiling cameras 310, a personal computer, and the like.

The ceiling camera-based moving object discovering unit 3302 estimates the state of the moving object Mo using a state space model (such as a Bayesian filter or the like) on the basis of the captured image captured by the ceiling camera 310, discovers the moving object Mo, and numbers an ID which can be uniquely identified.

Meanwhile, in a video from the ceiling camera 310, since a region around the moving object Mo which does not face the ceiling camera 310 is imaged with an angle (in an oblique direction), the position information of the moving object Mo is unlikely to be able to be acquired accurately. Therefore, it is considered to correct the captured image by calibration and image the moving object Mo in a confronting state. Here, even when such correction is performed, the position information may not be able to be acquired with a high degree of accuracy. In this regard, the ceiling camera 310 may acquire the position information with a high degree of accuracy by acquiring height information of the moving object Mo using a distance sensor or the like.

The ceiling camera-based moving object region defining unit 3304 updates the position information of the region of the moving object Mo after movement. Since the moving object Mo continues to move, the moving region changes within the range imaged by one ceiling camera 310, and also moves within ranges imaged by other ceiling cameras 310. A moving object region is defined every time the moving object Mo moves, and the position information of each moving object region of the position information management DB 132 which manages the position information, the memory, or the like is updated.

The moving object region tracking unit 3305 estimates the position of the moving object region and keeps tracking the moving object region of the moving object Mo.

Figure 18:
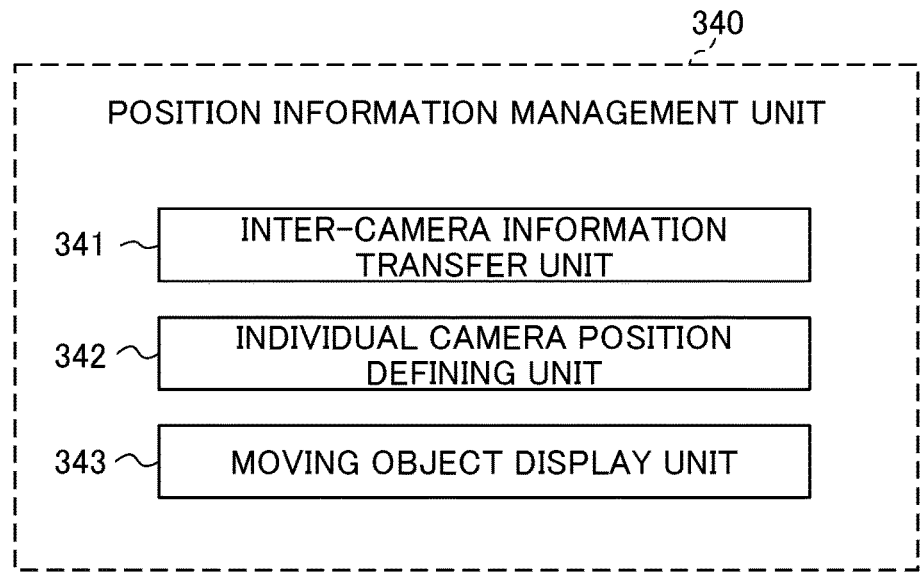
FIG. 18 is a functional block diagram illustrating a detailed functional configuration example of a position information management unit installed in the sales room device of FIG. 16.

FIG. 18 is a functional block diagram illustrating a detailed functional configuration example of the position information management unit 340 installed in the sales room device 3 in FIG. 16. The position information management unit 340 includes an inter-camera information transfer unit 341, an individual camera position defining unit 342, and a moving object display unit 343. The inter-camera information transfer unit 341 causes the image information captured by each ceiling camera 310 and the image information captured by the other ceiling camera 310 to be shared, and thus it is possible to keep tracking the moving object region even when the moving object Mo from the captured image of the ceiling camera 310 is captured by another ceiling camera 310.

The inter-camera information transfer unit 341 exchanges information with the ceiling camera 310 on the storage unit 108 including the product DB 131 through the server 1 which controls the information captured by the ceiling camera 310 in general. As another example, in view of the fact that the number of ceiling cameras 310 is large, the inter-camera information transfer unit 341 exchanges the image captured by each ceiling camera 310 between the ceiling cameras 310 in, for example, a P2P manner without going through the server 1.

The individual camera position defining unit 342 defines position information indicating a position at which each ceiling camera 310 is imaging in the shop. In other words, the individual camera position defining unit 342 detects a position at which the moving object imaged by another ceiling camera 310 is positioned in the shop through the inter-camera information transfer unit 341. The individual camera position defining unit 342 synthesizes the captured images of the respective ceiling cameras 310 and generates a single shop map. Further, this individual camera position defining unit 342 replaces coordinates of each ceiling camera 310 and the shelf camera 311 with coordinates on the shop map. Further, the individual camera position defining unit 342 corrects the captured image captured by each ceiling camera 310 to the captured image confronting the floor surface in the shop in terms of calculation through perspective transformation.

The ceiling camera 310 includes a distance sensor and acquires the height information, and thus the position information management unit 340 can correctly correct a distorted captured image and accurately recognize the moving object Mo. The moving object display unit 343 displays the position information being obtained by the individual camera position defining unit 342 for the moving object Mo in the shop 30. The moving object display unit 343 may be employed as the information terminal 9 carried by the clerk Mt, the screen in the backyard of the shop, or the like.

Figure 19:
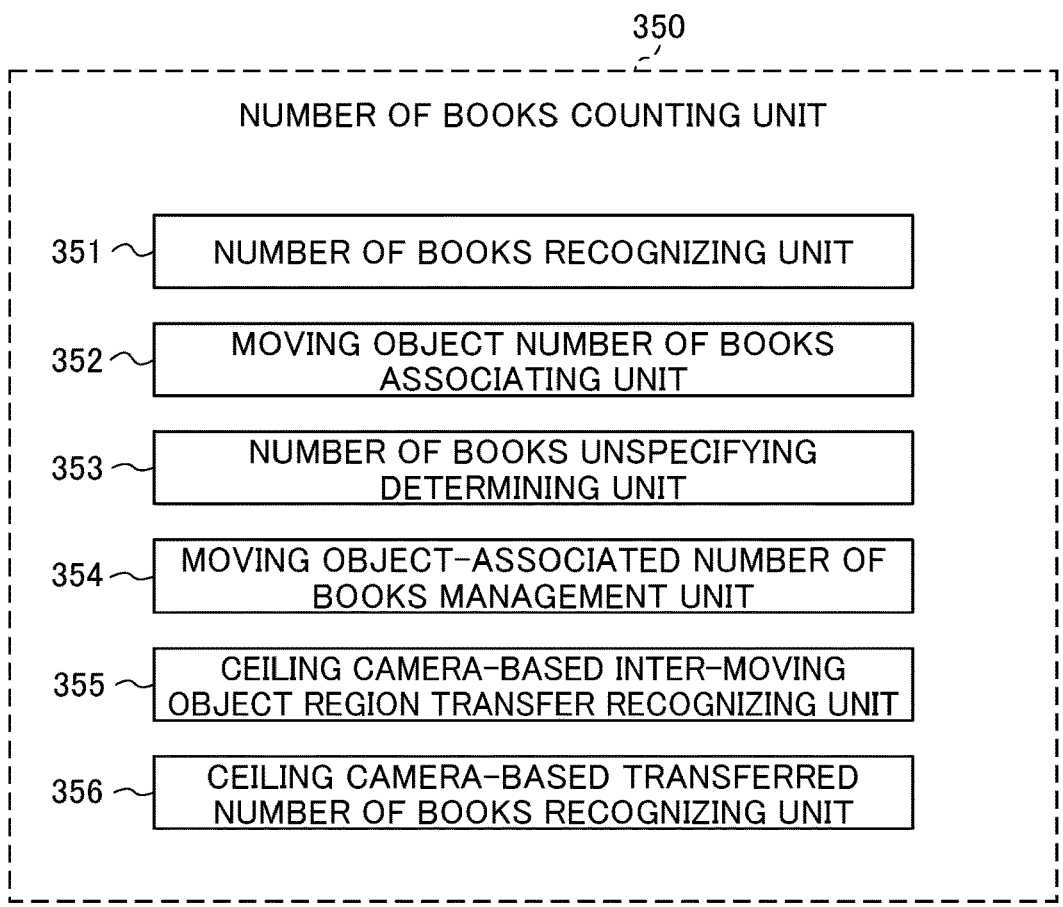
FIG. 19 is a functional block diagram illustrating a detailed functional configuration example of a number of books counting unit installed in the sales room device of FIG. 16.

FIG. 19 is a functional block diagram illustrating a detailed functional configuration example of the number of books counting unit 350 installed in the sales room device 3 of FIG. 16. The number of books counting unit 350 includes a number of books recognizing unit 351, a person-number of books associating unit 352, a number of books unspecifying determining unit 353, a person-associated number of books management unit 354, a ceiling camera-based inter-moving object region transfer recognizing unit 355, and a ceiling camera-based transferred number of books recognizing unit 356.

The number of books recognizing unit 351 recognizes the number of books picked up from the shelf and the number of books returned to the shelf by the moving object Mo from the captured image captured by the ceiling camera 310. An "object entry detection line" or the like is set in the captured image, and the number of books recognizing unit 351 detects the moving object region entering/leaving the shelf, and defines regions of an object picked from the shelf and an object returned to the shelf by the moving object Mo from the captured image when it is detected. The number of object regions is recognized as the number of books. In a case in which the ceiling camera 310 has a zooming function, the ceiling cameras may execute zooming in consideration of the distance between the ceiling camera 310 and the moving object Mo, and then the number of books recognizing unit 351 may recognize the number of books.

Further, the number of books recognizing unit 351 may recognize the number of books which are picked up from the shelf and the number of books returned to the shelf by the moving object Mo through the shelf camera 311 or may recognize the number of books which are picked up from the shelf and the number of books returned to the shelf by the shopper through a combination of the ceiling camera 310 and the shelf camera 311. At this time, the shelf camera 311 may be a camera that can perform imaging with a wide range.

The person-number of books associating unit 352 associates the number of books recognized by the number of books recognizing unit 351 with the person who picks up the books. When the number of books is unable to be recognized, the number of books unspecifying determining unit 353 associates the moving object Mo with information indicating that number of books is unable to be recognized.

The person-associated number of books management unit 354 keeps constantly managing the number of books count list with the ID of the moving object Mo using the position information management DB 132 or the like. When the book is picked up from the shelf, the number of acquired books is added. Conversely, when the book is returned to the shelf, the number of returned books is subtracted.

In a case in which the book is transferred between the moving object regions, the ceiling camera-based inter-moving object region transfer recognizing unit 355 transfers the number of books information associated with each moving object Mo to the moving object Mo who has transferred. The ceiling camera-based inter-moving object region transfer recognizing unit 355 may recognize the transfer by analyzing a motion of a person using the object recognition technique such as the deep learning, may recognize the hand in the moving object region at the time of transfer, or may recognize overlapping between the moving object regions (which may include the hand). The ceiling camera-based inter-moving object region transfer recognizing unit 355 may use the shelf camera 311 instead of the ceiling camera 310. At this time, the shelf camera 311 may be a camera that can perform imaging with a wide range.

The ceiling camera-based transferred number of books recognizing unit 356 recognizes the number of books when the book is transferred between the moving object regions. For example, the ceiling camera-based transferred number of books recognizing unit 356 recognizes the number of books from the captured image at a time point at which the transfer is recognized. The ceiling camera-based transferred number of books recognizing unit 356 may include a ceiling camera having a zooming function and recognize the number of books by zooming up a position at which the transfer is estimated to be performed. The ceiling camera-based transferred number of books recognizing unit 356 may recognize the number of books by using the shelf camera 311 which can perform imaging with a wide range instead of the ceiling camera 310. Further, the ceiling camera-based transferred number of books recognizing unit 356 associates each moving object Mo specified by the ceiling camera-based inter-moving object region transfer recognizing unit 355 with the number of books recognized here and updates a number of books list.

Figure 20:
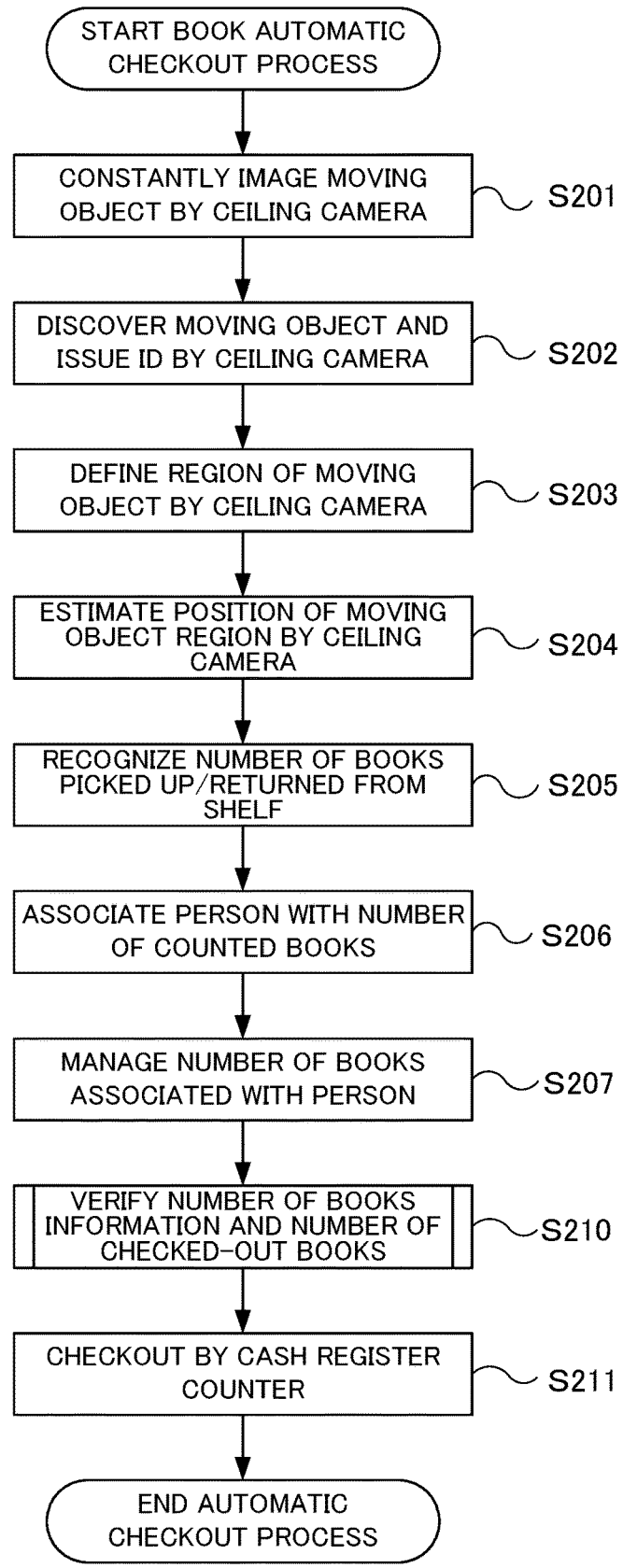
FIG. 20 is a flowchart for describing an automatic checkout process executed by the server, the cash register terminal, and the sales room device of FIG. 16.

Then, a book checkout method in the product recognition system of the second embodiment will be described with main reference to FIG. 20 together with FIG. 12. FIG. 20 is a flowchart for describing the book checkout process in the second embodiment.

In step S201, if the shopper (moving object Mo) enters the shop from the gateway 22 of the shop (FIG. 12), the ceiling camera 310 installed near the gateway 22 starts imaging the shopper. If the shopper goes through the passage 24, the ceiling camera 310 on the back side images the shopper. As described above, a plurality of ceiling cameras 310 constantly image the shopper. The gate 21 may be installed near the gateway 22. In a case in which the gate 21 is installed in the gateway 22, the gate 21 is always closed, but the gate 21 is opened at a timing at which the shopper enters the shop and closed after the shopper enters the shop. The individual authenticating unit 320 may perform the individual authentication on the shopper and acquire the personal information of the shopper before step S201.

In step S202, the ceiling camera-based moving object discovering unit 3302 extracts only the region of the shopper (the moving object region) imaged in step S201, defines the moving object Mo, assigns an ID to the moving object Mo, and registers the ID and the position information in the shop associated with the ID in the RAM 303 of the position information management DB 132 or the sales room device 3.

In step S203, when the ceiling camera-based moving object region defining unit 3304 moves within the range imaged by the ceiling camera 310, the position of the region of the moving object Mo after the movement is defined again. The position information is managed by the position information management DB 132, the memory, or the like which manages the position of the person and updated each time the region is defined. The defined position is recognized even at the position being imaged by another ceiling camera 310.

In step S204, the ceiling camera-based moving object region tracking unit 3305 estimates the position of the moving object region as the shopper moves along the passage 24 for the book desired to be purchased, and keeps tracking the moving object Mo. In step S201, the moving object Mo is constantly captured, and in step S202, an ID is assigned to the moving object Mo. In step S203, the position information of the region of the moving object Mo after the movement is updated, and further, the position information is exchanged by the inter-camera information transfer unit 341. Thus, even when the moving object Mo moves along the passage 24 and is imaged by the different ceiling camera 310, the ceiling camera-based moving object region tracking unit 3305 can keep tracking the moving object Mo.

In step S205, the number of books recognizing unit 351 recognizes number of books picked up from the shelf and the number of books returned to the shelf by the moving object Mo to which the ID is assigned. Further, when the number of picked-up books is unable to be counted in step S205, the number of books unspecifying determining unit (not illustrated) outputs an error.

In step S206, the person-number of books associating unit 362 associates the number of books recognized (counted) in step S205 with the moving object Mo. Therefore, the number of books recognizing unit 351 recognizes the number of books picked up by the uniquely specified shopper.

In step S207, the person-associated number of books management unit 363 keeps managing the number of books associated with the person using the DB management unit 141 of the server 1. Therefore, even when the book picked up from the shelf by the shopper is returned to the shelf, the person-associated number of books management unit 363 recognizes the number of books possessed by shopper.

After the books are picked up, the shopper goes to the cash register terminal 2 and places the books on the predetermined area A of the cash register terminal 2. As illustrated in FIG. 13, the books are placed so that the spine is imaged by at least one or more cameras 211 of the cash register terminal 2. Then, the shopper pushes a button or the like which is the input unit 207 installed in the cash register terminal 2. The cash register terminal 2 specifies the product using the pushing of the button or the like as a trigger. The specifying of the product is carried out by specifying the book title from the cover, the spine, or the like of the book using a character recognition technique, or an image recognition technique.

In step S210, the product specifying unit 235 of the cash register terminal 2 verifies whether or not the number of books information associated with the moving object Mo recognized in step S207 coincides with the number of books information of the books placed on the predetermined area A of the cash register terminal 2. A specific flow of the verification will be described later with reference to FIG. 21. When the number of books information associated with the moving object Mo does not coincide with the number of books information of the books placed on the predetermined area A of the cash register terminal 2, an error is displayed on the error display unit 151, and the checkout is unable to be performed. Further, if the shopper tries to leave the shop in this state, the error display unit 151 installed near the gateway 22 causes a warning to be issued by a sound, a light, or the like. In a case in which the gate 21 is installed, the closed state is maintained. In step S210, the selling-restricted product determining unit 236 may determine whether or not the book placed on the cash register terminal 2 corresponds to the presence or absence of restriction. In a case in which the personal information is acquired in advance at an arbitrary timing before step S207 (including step S201 or before), when the selling-restricted product determining unit 236 determines that the shopper who is unable to purchase a restricted book tries to purchase it, the error is displayed on the error display unit 151.

In step S211, the checkout unit 237 of the cash register terminal 2 checks out the total amount of the books placed on the predetermined area A. In other words, as described above in the first embodiment, information such as the prices of the books is obtained by the product specifying unit 235, and the total amount is calculated. The shopper pays with a credit card, an electronic money, or the like, the checkout is completed. If the checkout is completed, the DB management unit 141 updates the number of books count list associated with the person to the "checked-out" state.

Further, when the shopper is about to take out the book which is not checked out near the gateway 22, that is, when the number of books count list associated with the moving object Mo indicates the "non-checked-out" state, a taking-out detecting unit detects it, and the error display unit 151 near the gateway 22 or the presenting unit 210 of the cash register terminal 2 present it by a sound, a light, or the like. Further, in a case in which the gate 21 is installed, the gate 21 maintains the closed state, and the shopper is unable to leave the shop. In addition to maintaining the gate 21 in the closed state, the error display unit 151 or the like may issue a warning by a sound, a light, or the like. Accordingly, the shoplifting can be prevented. The error display unit 151 or the presenting unit 210 of the cash register terminal 2 may emit light of different colors in accordance with the error state.

Figure 21:
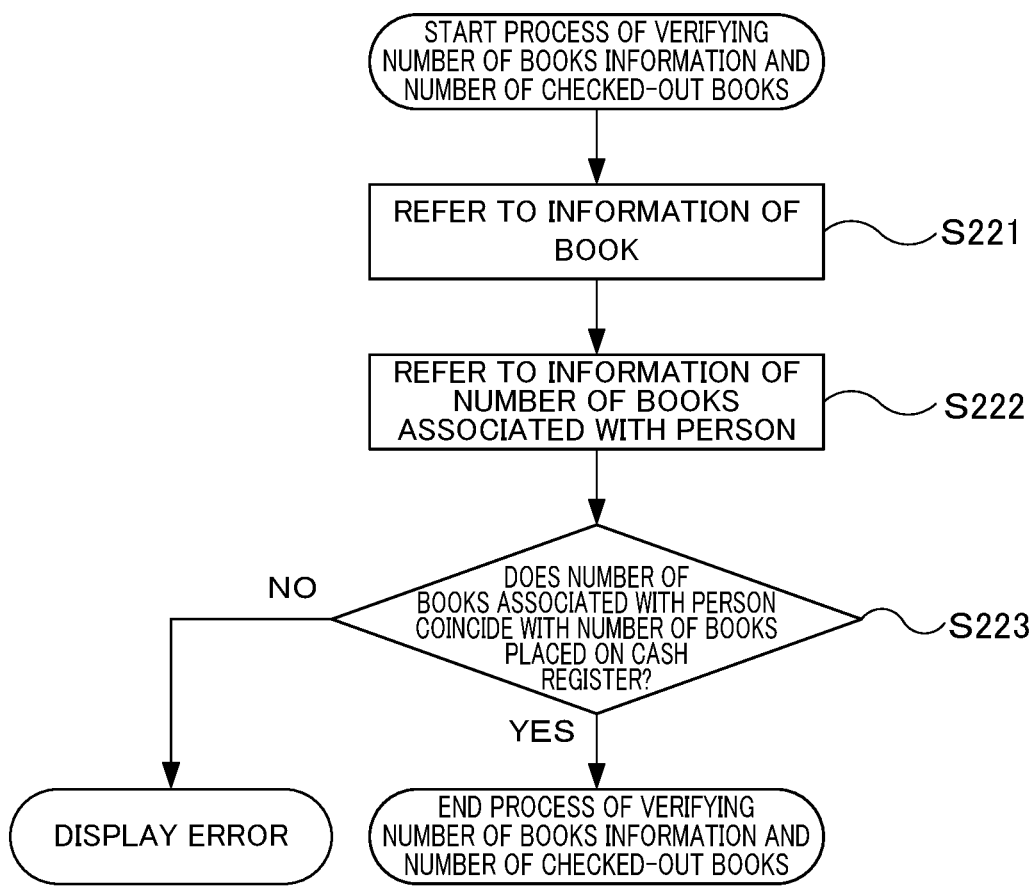
FIG. 21 is a flowchart for verifying number of books information of a product and the number of checked-out books in step S210 of FIG. 20.

FIG. 21 is a flowchart for describing the verification of the number of books information of the book and the number of books checked out in step S210 of FIG. 20. In step S221, if a reading start button of the input unit 207 of the cash register terminal 2 is pushed, the image acquiring unit 232 of the cash register terminal 2 acquires the captured object image placed on the predetermined area A of the cash register terminal 2, then the product specifying unit 235 specifies a product to which the object whose presence is recognized belongs, and also recognizes the number of books of the product. In step S222, the person-number of books associating unit 362 of the number of books counting unit 350 of the sales room device 3 make an inquiry about the information of the number of books placed on the cash register terminal 2 from the ID of the moving object Mo.

In step S223, the product specifying unit 235 determines whether or not the number of books placed on the cash register terminal 2 coincides with the number of books counted by the person-associated number of books management unit. When they coincide (YES), the checkout can be performed. When the number of books placed on the cash register terminal 2 does not coincide with the number of books counted by the person-associated number of books management unit (NO), the error display unit 151 of the cash register terminal 2 displays an error and issues a warning. Further, if the shopper tries to leave the shop in this state, the error display unit 151 near the gateway 22 issues a warning by a sound, a light, or the like. In a case in which the gate 21 is installed, the gate 21 maintains the closed state, and the shopper is unable to leave the shop. Accordingly, the shoplifting can be prevented.

Third Embodiment

Figure 22:
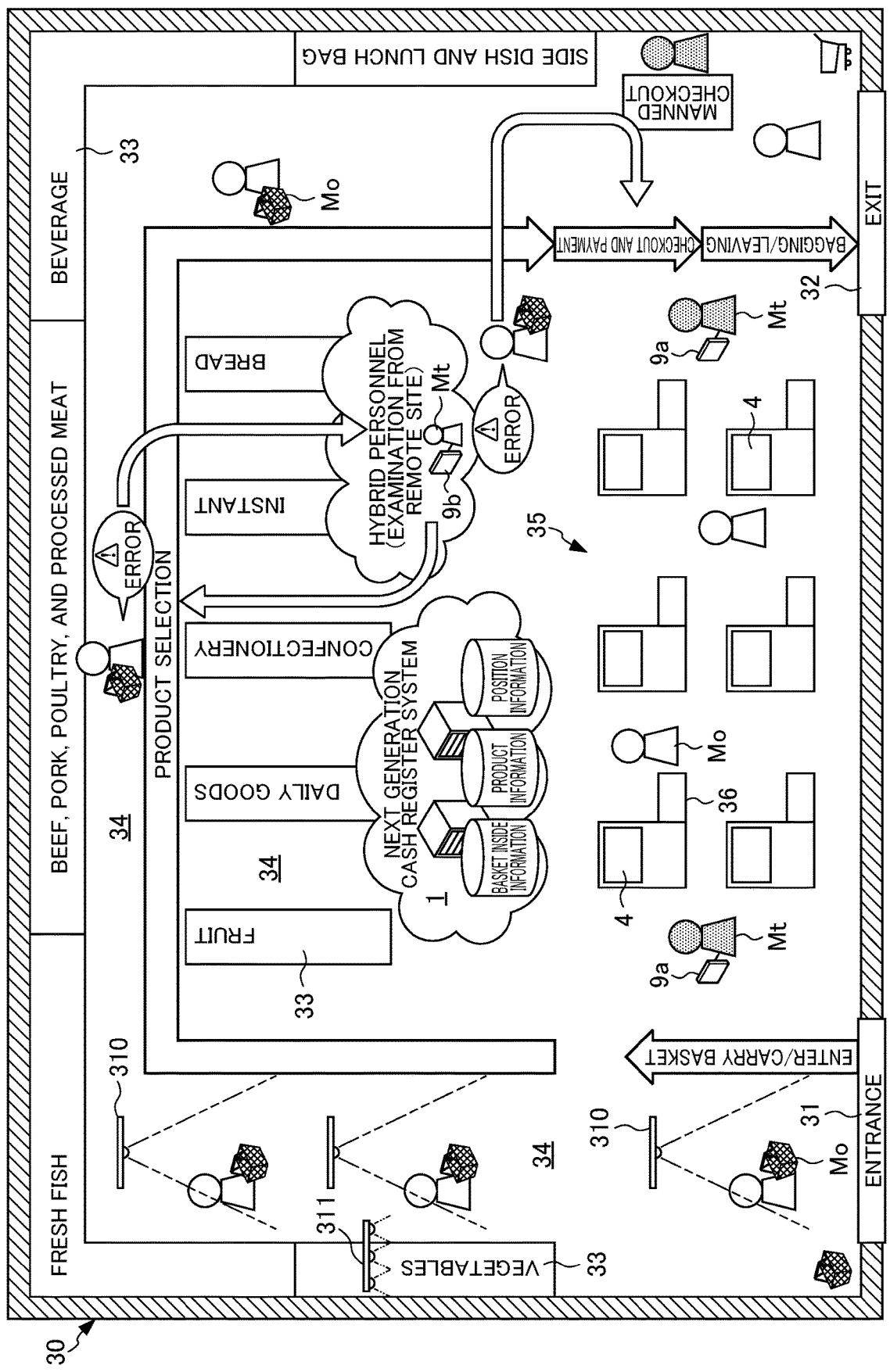
FIG. 22 is a diagram illustrating a layout example of a supermarket employing a product recognition system in a third embodiment.

FIG. 22 is a diagram illustrating a layout example of a supermarket employing the product recognition system of the third embodiment. The product recognition system of the third embodiment is a system applied to a shop 30 such as supermarket illustrated in FIG. 22.

In the shop 30, a sales room is installed from an entrance 31 to an exit 32. A plurality of shelf racks 33 on which the products are displayed are installed in the sales room. A space between the two shelf racks 33 facing each other is defined as a passage 34.

At the entrance 31, there are baskets (not numbered) such as shopping baskets or shopping carts. A checkout area 35 is installed in front of the exit 32. A plurality of cash register counters 36 are installed in the checkout area 35. The cash register counter 36 has n checkout devices 4. In the third embodiment, the cash register terminal 2 employed in the first and the second embodiments is not installed. Further, in the third embodiment, unlike the second embodiment in which the shopper is dealt as the moving object Mo, baskets detected (discovered, tracked, or the like) on the system are dealt as the moving object Mo.

The shopper enters the shop from the entrance 31, carries the baskets, and goes along the passage 34. The shopper picks up the product in the shelf, puts the product in the baskets, and goes along the passage 34. If the shopper picks up all the products desired to be purchased, the shopper goes to the checkout area 35 and checks out them through a checkout device 4. The clerk Mt is looking around in the passage 34, the checkout area 35, and the like. The clerk Mt carries an information terminal 9*a*. The information terminal 9*a* is a portable information processing terminal such as a smartphone and has a screen or the like for displaying the state inside the shop. In FIG. 22, a form of the outside of the shop 30 or the backyard of the shop 30 other than the inside of the shop 30 is illustrated in a line drawing drawn in a cloud shape. The server 1 (FIG. 5) is installed outside the shop 30. In the management center outside the shop 30, the backyard of the shop 30, or the like, the clerk Mt monitors the inside of the shop 30 through a screen of a large monitor (not illustrated) or a screen of the information terminal 9*b*. Hereinafter, in a case in which there is not necessary to distinguish the information terminal 9*a* and the information terminal 9*b*, they are referred to collectively as an "information terminal 9".

A plurality of ceiling cameras 310 are installed apart from each other in the passages 34, the shelf rack 33, and the ceiling above arbitrary positions in the shop 30. The ceiling camera 310 images the passage 34, the shelf rack 33, and a predetermined region thereunder. In other words, in a case in which the moving object Mo enters, the ceiling camera 310 images the predetermined region including the moving object Mo as the subject.

The shelf camera 311 is installed at each of a plurality of positions of each shelf in each shelf rack 33 as an example of the sensing device. The shelf camera 311 images the inside of the shelf, the product in the shelf, and other predetermined regions. Further, the shelf camera 311 images the hand, the object in the shelf, and the like as the captured object image when the hand or the like of the shopper enters a predetermined region in the shelf or when the object is picked up from the shelf. A basket camera 312 (not illustrated in FIG. 22) may be attached to each of the baskets as an example of the sensing device. In this case, one or more basket cameras 312 of the sales room device 3 are installed in the baskets, and constantly images the object in the baskets. The basket camera 312 is installed so that the inside of baskets can be imaged without dead angle. The basket camera 312 captures an image of a part having features such as at least the front of the object put in the baskets.

Further, the basket camera 312 is cooperated with the ceiling camera 310 or the shelf camera 311 via the network N. With this cooperation, the sales room device 3 can share both captured images, that is, the captured image captured by the basket camera 312 and the captured images of the object imaged by the ceiling camera 310 or the shelf camera 311. With the sharing, it is possible to improve the accuracy of specifying the product from the object imaged in the captured image.

The product recognition system of the third embodiment has a function of keeping tracking the moving object Mo even when the moving object Mo imaged by the ceiling camera 310 moves. The information processing system of the third embodiment has a function of specifying the product to which the object picked up from the shelf rack 33 belongs from the captured image captured by the shelf camera 311. The product recognition system of the third embodiment may have a function of specifying the product to which the object put in the baskets belongs from the captured image captured by the basket camera 312. The product recognition system of the third embodiment has a function of specifying the product to which the object in the shelf belongs and performing the automatic checkout for the product through the checkout device 4. At the time of automatic checkout, the checkout device 4 can read the information related to the product associated with the moving object Mo and perform the automatic checkout. The checkout device 4 includes functions necessary for completing shopping such as a function of displaying the total price of purchased products, numbers, the details, a function of displaying determination of the selling-restricted product, and a payment function.

Figure 23:
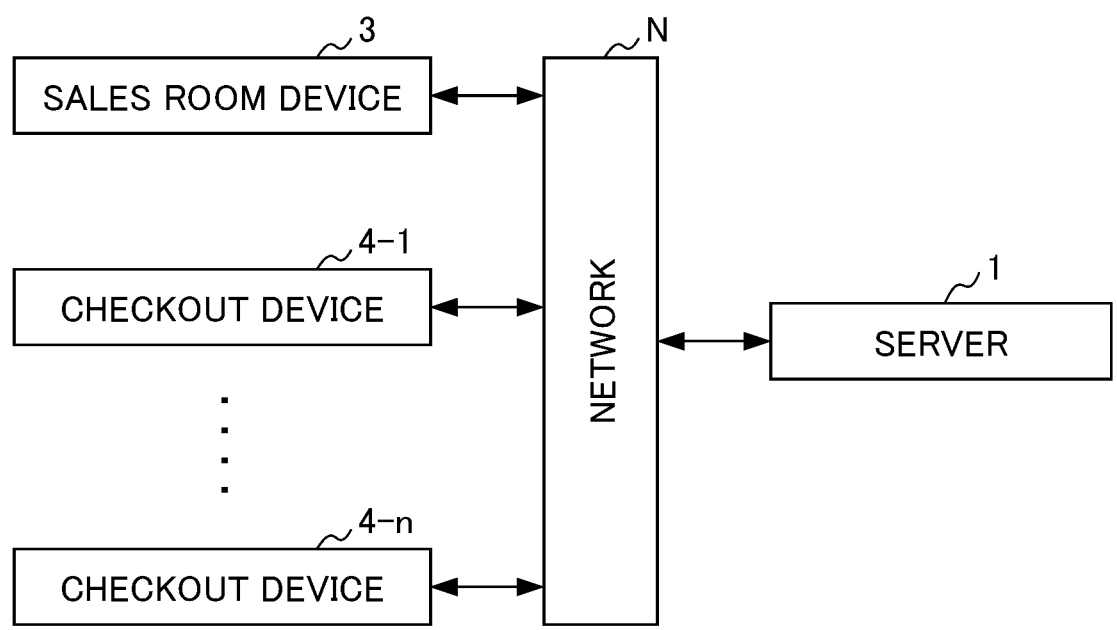
FIG. 23 is a configuration diagram illustrating a configuration of a product recognition system as the third embodiment.
Figure 24:
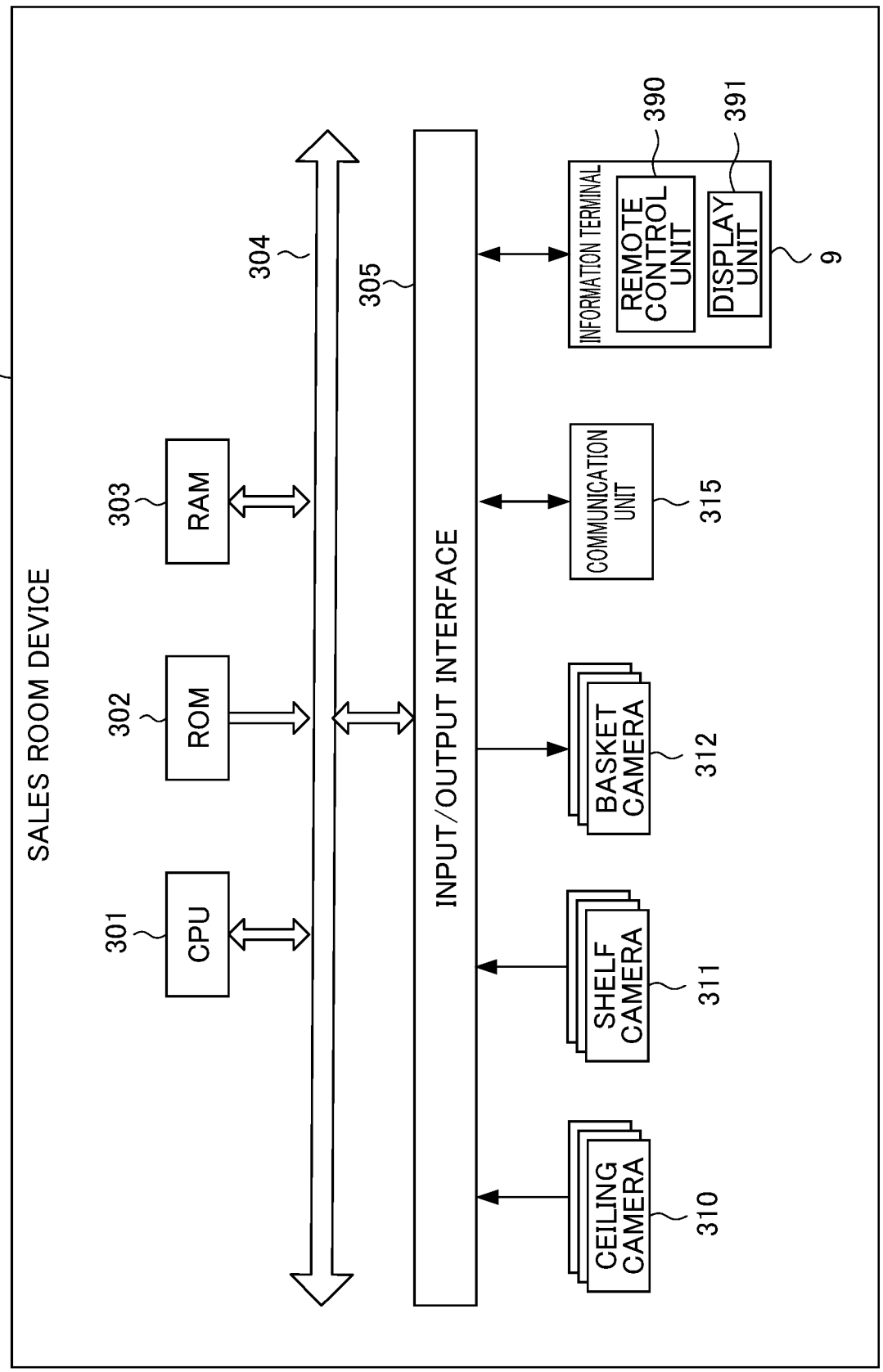
FIG. 24 is a block diagram illustrating a hardware configuration of a sales room device in the product recognition system of FIG. 23.

The ceiling camera 310, the shelf camera 311, and the basket camera 312 are incorporated into the sales room device 3 illustrated in FIGS. 23 and 24. The sales room device 3 has a function of specifying the product from the captured image captured by the ceiling camera 310, the shelf camera 311, or the like and a function for discovering and tracking the moving object Mo. The sales room device 3 is incorporated into the product recognition system illustrated in FIG. 23.

FIG. 23 is a configuration diagram illustrating a configuration of the product recognition system of the third embodiment. The product recognition system of the third embodiment includes a server 1, a sales room device 3, and a checkout device 4. In the third embodiment, in order for the sales room device 3 to specify the product to which the object belongs, the checkout device 4 is installed instead of the cash register terminal 2 described above in the first and the second embodiment. In FIG. 23, only one server 1 and one sales room device 3 are illustrated, but in practice, there may be one or more serves or devices. Hereinafter, when it is not necessary to distinguish the checkout devices 4 individually, they are referred to collectively as a "checkout device 4". The server 1 and the sales room device 3 are connected to one another via a network N such as the Internet. The server 1 is configured similarly to the server 1 (FIG. 5) of the first embodiment.

FIG. 24 is a block diagram illustrating a hardware configuration of the sales room device 3 in the product recognition system of FIG. 23. The sales room device 3 includes a CPU 301, a ROM 302, a RAM 303, a bus 304, an input/output interface 305, a ceiling camera 310, a shelf camera 311, a basket camera 312, a communication unit 315, and an information terminal 9.

The CPU 301, the ROM 302, the RAM 303, the bus 304, the input/output interface 305, and the communication unit 315 of the sales room device 3 are configured similarly to those of the server 1 illustrated in FIG. 5. The ceiling camera 310, the shelf camera 311, the communication unit 315, and the information terminal 9 of the sales room device 3 are configured similarly to those of the sales room device 3 (FIG. 15) described above in the second embodiment.

Figure 25:
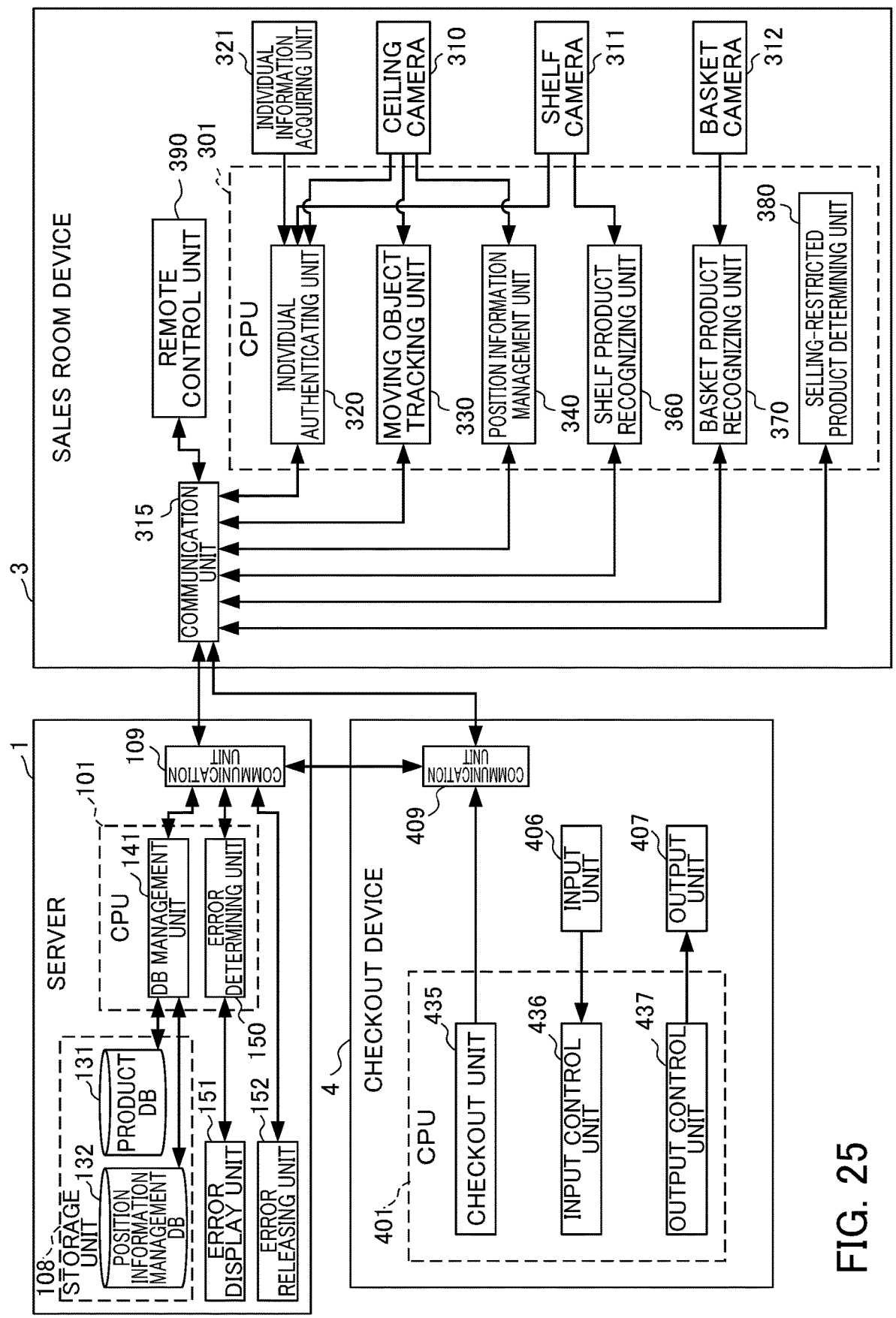
FIG. 25 is a functional block diagram illustrating an example of functional configurations of the server, the checkout device in FIG. 5, and the sales room device of FIG. 24.

FIG. 25 is a functional block diagram illustrating an example of functional configurations of the server 1 of FIG. 5 and the sales room device 3 and the checkout device 4 of FIG. 24.

The server 1 includes a CPU 101, a storage unit 108, a communication unit 109, an error display unit 151, and an error releasing unit 152. These components are configured similarly to those in the second embodiment illustrated in FIG. 16.

In the CPU 301 of the sales room device 3, as illustrated in FIG. 25, an individual authenticating unit 320, a moving object tracking unit 330, a position information management unit 340, a shelf product recognizing unit 360, a basket product recognizing unit 370, and a selling-restricted product determining unit 380 function.

The individual authenticating unit 320 includes a personal information acquiring unit 321. The individual authenticating unit 320 and the personal information acquiring unit 321 are configured similarly to those in the second embodiment illustrated in FIG. 16.

Figure 26:
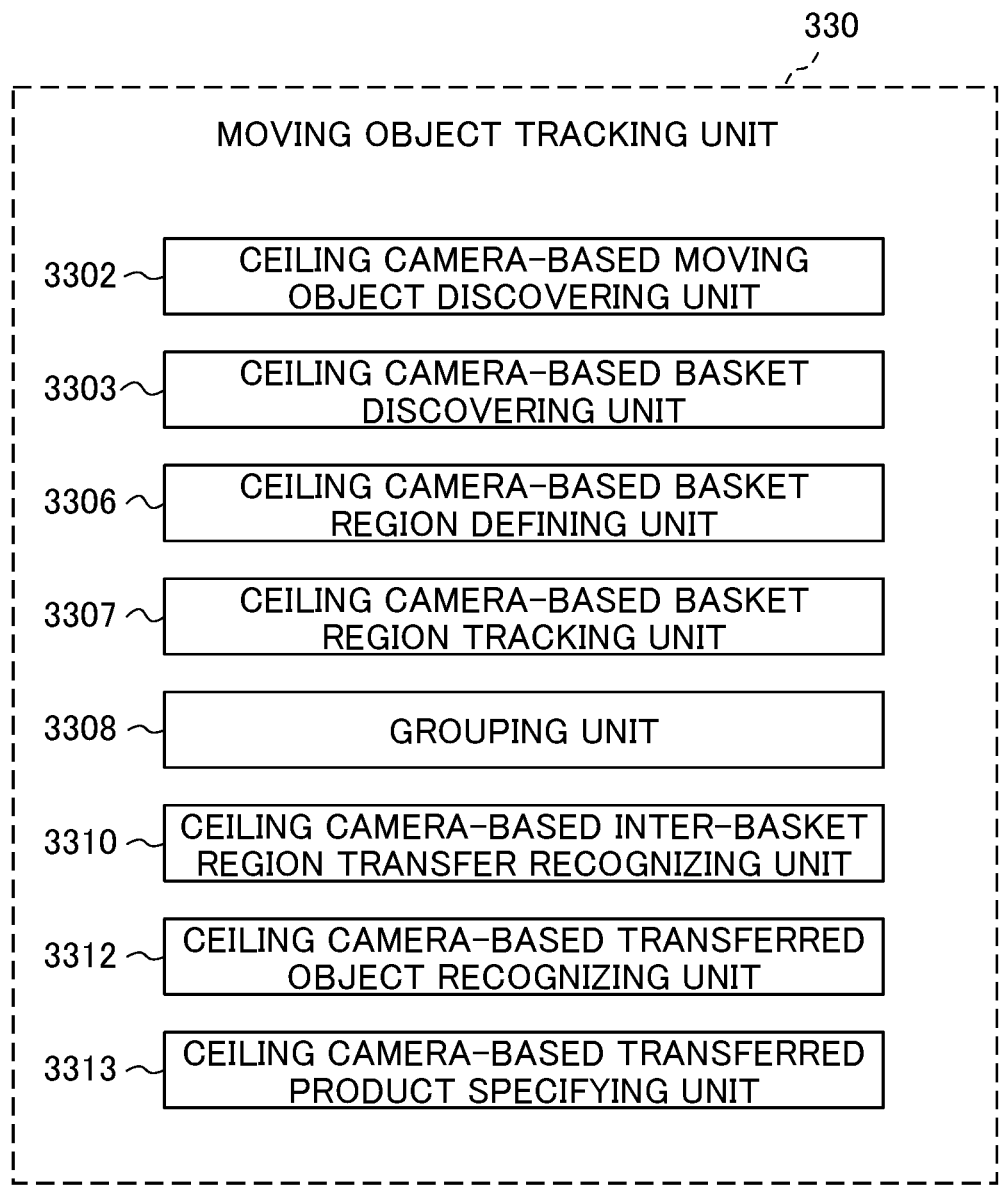
FIG. 26 is a functional block diagram illustrating a detailed functional configuration example of a moving object tracking unit installed in the sales room device of FIG. 25.

FIG. 26 is a functional block diagram illustrating a detailed functional configuration example of the moving object tracking unit 330 installed in the sales room device 3 of FIG. 25. As illustrated in FIG. 26, the moving object tracking unit 330 includes a ceiling camera-based moving object discovering unit 3302, a ceiling camera-based basket discovering unit 3303, a ceiling camera-based basket region defining unit 3306, a ceiling camera-based basket region tracking unit 3307, a grouping unit 3308, a ceiling camera-based inter-basket region transfer recognizing unit 3310, a ceiling camera-based transferred object recognizing unit 3312, and a ceiling camera-based transferred product specifying unit 3313. Here, the moving object tracking unit 330 of the third embodiment deals the baskets detected (discovered, tracked, or the like) on the system as the moving object Mo unlike the second embodiment in which the shopper is dealt as the moving object.

The moving object tracking unit 330 is connected with the ceiling camera 310 via a USB cable, a network N or the like. Therefore, the ceiling camera 310 is cooperated with other ceiling cameras 310, a personal computer, and the like.

The ceiling camera-based moving object discovering unit 3302 discovers objects (the shopper, the basket, the cart, or the like) moving in the shop using a state space model (Bayesian filter or the like) on the basis of the captured image captured by the ceiling camera 310.

The ceiling camera-based basket discovering unit 3303 discovers the baskets (moving object Mo) from the object moving in the shop 30 discovered by the moving object discovering unit 3302, and assigns an individual ID to the moving object Mo. The ID of the moving object Mo continues to be used till a predetermined timing, for example, until the shopper leaves the shop or the checkout is completed. As a technique of discovering the moving object Mo from the object moving in the shop 30, for example, one or more markers holding individually identifiable information are attached to each basket, and the ceiling camera-based basket discovering unit 3303 discovers the moving object Mo using the marker as a mark. The marker is not limited as long as the moving object Mo can be specified, and for example, a two-dimensional code or a characteristic shape may be sued. As another technique of discovering the moving object Mo from the object moving in the shop 30, the ceiling camera-based basket discovering unit 3303 may use basket-specific information such as color information or shape information of baskets. At this time, the ceiling camera-based basket discovering unit 3303 can discover the moving object Mo because the color or the shape of the baskets can be distinguished from the floor surface or the like.

As a technique of discovering the moving object Mo from the object moving in the shop 30, thermography or the like may be used by lowering the temperature of the baskets. At this time, the ceiling camera-based basket discovering unit 3303 discovers the moving object Mo whose temperature has been lowered using a temperature difference with regions other than the baskets. As a technique of discovering the moving object Mo from the object moving in the shop 30, thermography or the like may be used by causing harmless gas to be discharged from the baskets. At this time, the ceiling camera-based basket discovering unit 3303 detects a temperature change associated with the harmless gas discharged from the baskets through thermography or the like and discovers the moving object Mo.

As a technique of discovering the moving object Mo from the object moving in the shop 30, a sound may be output from the baskets regardless of whether or not it is an audible sound. At this time, the ceiling camera-based basket discovering unit 3303 detects the moving object Mo by detecting the sound output from the baskets. As a technique of discovering the moving object Mo from the object moving in the shop 30, the baskets may be coated with visible paint, and a sensor that can recognize the visible paint may be used. At this time, the ceiling camera-based basket discovering unit 3303 discovers the moving object Mo by recognizing the invisible paint with which the baskets are coated through the sensor. As a technique for discovering the moving object Mo from the object moving within the shop 30, the ceiling camera 310 may irradiate the baskets with visible light or infrared light. At this time, the ceiling camera-based basket discovering unit 3303 discovers the moving object Mo by receiving reflected light of the visible light or the infrared light with which the baskets are irradiated.

The ceiling camera-based basket region defining unit 3306 defines a certain range in the captured image among areas around the moving object Mo discovered by the ceiling camera-based basket discovering unit 3303 as the region of the moving object Mo. To define the region of moving object Mo, for example, in a case in which the marker is attached to the baskets as described above, a certain range from an attachment position at which the marker is attached is defined as the region of the moving object Mo. In a case in which a plurality of markers are attached to the baskets, even when the ceiling camera 310 fails to image all of the markers, the ceiling camera-based basket region defining unit 3306 may define the region of moving object Mo from one or more markers since each marker holds its own position information in the region of the moving object Mo.

The ceiling camera-based basket region defining unit 3306 may also use a technique of complementing the technique of defining the basket region. As a complementary technique, in a case in which the temperature of the baskets is lowered as described above, a low temperature region is defined as the region of the moving object Mo through thermography and image recognition. As another complementary technique, in a case in which the harmless gas is discharged from the baskets as described above, the temperature change associated with the discharged gas is detected through the thermography or the like, and the region whose temperature has been changed is defined as the region of the moving object Mo using the image recognition technique as well.

As still another complementary technique, in a case in which the edges of the baskets are coated with the invisible paint as described above, the ceiling camera-based basket region defining unit 3306 estimates the edges of the baskets from the coating position of the paint, and defines the region closed by the edges as the region of the moving object Mo. As still another complementary technique, in a case in which the ceiling camera 310 emits the visible light, the infrared rays, or the like as described above, the ceiling camera-based basket region defining unit 3306 defines the region of the moving object Mo from a reflection measurement result.

The ceiling camera-based basket region tracking unit 3307 estimates (defines) the position of the region of the moving object Mo. The ceiling camera-based basket region tracking unit 3307 keeps tracking the moving object Mo with the same ID and detecting the position information from a time point at which the moving object Mo is discovered to a predetermined time point at which the shopper leaves the shop or completes the checkout.

To this end, for example, the ceiling camera-based basket region tracking unit 3307 continuously keeps track of the basket region in the captured image by cooperating with a plurality of ceiling cameras 310. In order to cause a plurality of ceiling cameras 310 to cooperate with one another, the ceiling camera-based basket region tracking unit 3307 causes the captured image captured by a certain ceiling camera 310 to be handed over to the captured image captured by an adjacent ceiling camera. The ceiling camera-based basket region tracking unit 3307 stores the position information of the moving object Mo being tracked in the position information management DB 132 or the storage unit 108 of the server 1.

As another technique for tracking the moving object Mo through the ceiling camera-based basket region tracking unit 3307, a marker having information specifying the moving object Mo is attached to respective baskets, and the ceiling camera 310 images the moving object Mo including the marker. The ceiling camera-based basket region tracking unit 3307 extracts the marker from the captured image, discovers the moving object Mo, and obtains the position information. The ceiling camera-based basket region tracking unit 3307 can track the moving object Mo even when the moving object Mo moves by discovering the marker from the captured image and acquiring the position information of the moving object Mo.

As another technique for tracking the moving object Mo, the ceiling camera-based basket region tracking unit 3307 tracks the moving object Mo by using an object tracking technique in an image such as a Bayesian filter, fast Fourier transform, tracking-learning-detection (TLD), or the like. Alternatively, the ceiling camera-based basket region tracking unit 3307 tracks the moving object Mo while estimating that the moving object Mo from the same feature data is acquired is the same the moving object Mo on the basis of the feature data such as the color or the shape of the baskets. At this time, the ceiling camera-based basket region tracking unit 3307 keeps collecting the feature data of tracking target.

In any event, in the video from the ceiling camera 310, since the moving object Mo which does not face the ceiling camera 310 is imaged with an angle (in an oblique direction), the position information is unable to be acquired accurately. Therefore, it is considered to correct the captured image by calibration and image the moving object Mo in a confronting state. Here, even when such correction is performed, the position information of the moving object Mo may not be able to be acquired with a high degree of accuracy. In this regard, the ceiling camera-based basket region tracking unit 3307 may acquire the position information with a high degree of accuracy by acquiring height information of the moving object Mo using a distance sensor or the like. As described above, the ceiling camera-based basket region tracking unit 3307 may keep tracking the moving object Mo.

The grouping unit 3308 may associate a plurality of baskets (moving objects Mo). With this association, the checkout device 4 installed in the checkout area 35 can check out the product list of each moving object Mo collectively.

The ceiling camera-based inter-basket region transfer recognizing unit 3310 recognizes that the object is transferred (moved in and out) between the moving objects Mo by the ceiling camera 310 or the like. The ceiling camera-based inter-basket region transfer recognizing unit 3310 may recognize the overlap of the regions of the moving object Mo and recognize the transfer. The ceiling camera-based inter-basket region transfer recognizing unit 3310 specifies the moving object Mo to which the object is transferred and reads the product list associated with the ID of each moving object Mo.

The ceiling camera-based transferred object recognizing unit 3312 defines the region of the object from the captured image at a time point at which the transfer is recognized. A zoomable camera may be used as the ceiling camera 310, and the ceiling camera-based transferred object recognizing unit 3312 may zoom up a position at which the transfer is estimated to be performed and define the region of the object.

The ceiling camera-based transferred product specifying unit 3313 specifies the product in the read product list associated with the moving object Mo to which the transferred object belongs from the image after the object region is defined, associates the moving object Mo specified by the ceiling camera-based inter-basket region transfer recognizing unit 3310 with the product specified by the transfer, and updates the list of the products associated with each moving object Mo. The ceiling camera-based transferred object recognizing unit 3312 and the ceiling camera-based transferred product specifying unit 3313 may be realized by the shelf camera 311 or the like capable of performing imaging with a wide range instead of the ceiling camera 310.

The position information management unit 340 is configured similarly to the position information management unit 340 described above in the second embodiment. In other words, as illustrated in FIG. 18, the position information management unit 340 includes an inter-camera information transfer unit 341, an individual camera position defining unit 342, and a moving object display unit 343.

Figure 27:
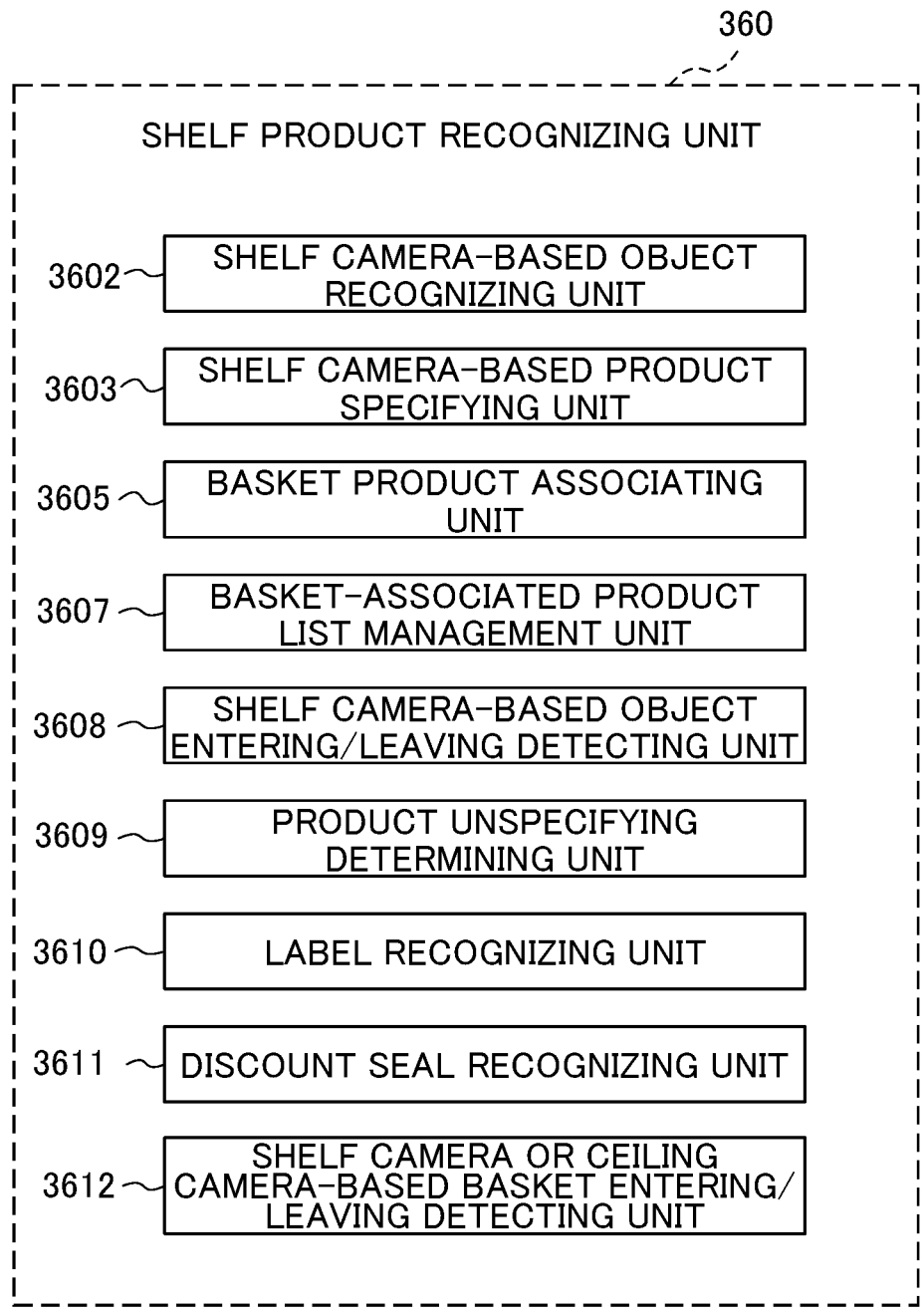
FIG. 27 is a functional block diagram illustrating a detailed functional configuration example of a shelf product recognizing unit installed in the sales room device of FIG. 25.

FIG. 27 is a functional block diagram illustrating a detailed functional configuration of the shelf product recognizing unit 360 installed in the sales room device 3 of FIG. 25. The shelf product recognizing unit 360 includes a shelf camera-based object recognizing unit 3602, a shelf camera-based product specifying unit 3603, a basket product associating unit 3605, a basket-associated product list management unit 3607, a shelf camera-based object entering/leaving detecting unit 3608, a product unspecifying determining unit 3609, a label recognizing unit 3610, a discount seal recognizing unit 3611, and a shelf camera or ceiling camera-based basket entering/leaving detecting unit 3612. The shelf product recognizing unit 360 is cooperated with the shelf camera 311, another camera, a personal computer, or the like via the USB cable or a network.

The shelf camera-based object recognizing unit 3602 compares images before and after an image in which the object is picked up from the shelf or the object is placed on (returned to) the shelf, and defines the image region serving as a product specifying target (region definition). In other words, the shelf camera-based object recognizing unit 3602 compares the captured object images before and after the change, that is, compares the captured object image before the object is picked up from the shelf or placed on the shelf with the captured object image after the object is picked up from the shelf or placed on the shelf, and specifies the changed image region. The shelf camera-based object recognizing unit 3602 checks a change in each of RGB data when the image region is specified.

Further, the shelf camera-based object recognizing unit 3602 may specify the region of the object only from a single captured object image using a method different from the comparison of the images before and after the change, that is, the captured object image before the object is picked up from the shelf or placed on the shelf and the captured object image after the object is picked up from the shelf or placed on the shelf using the object entering/leaving detecting unit as a trigger. Since the color data of the object is the same, in order to prevent determination indicating that there is no change although there is a change such as entrance and exit, the shelf camera-based object recognizing unit 3602 may define the region by using the shadow of the object. Information related to the recognized object region is handed over to the shelf camera-based product specifying unit 3603.

The shelf camera-based product specifying unit 3603 specifies the product to which the object in the shelf recognized by the shelf camera-based object recognizing unit 3602 belongs. The shelf camera-based product specifying unit 3603 lists the product candidates through an image processing technique such as specific object recognition, general object recognition, deep learning, or the like. The listed product candidates are referred to as a "product candidate list S". Thereafter, the shelf camera-based product specifying unit 3603 specifies the product with a high degree of accuracy using the verification function.

The verification function lists a "product candidate list P" by an algorithm different from the technique of listing the product candidates. Results of the product candidate lists S and P are matched, and in a case in which a predetermined threshold value is exceeded, the product is specified. For example, the technique of generating the "product candidate list" may be realized by a method of matching image information of an object obtained from the object whose presence is recognized with image information held in the product DB 131 or a memory. In other words, if feature information of both images is identical (the threshold value is exceeded), since the object whose presence is recognized by the shelf camera-based object recognizing unit 3602 is the product registered in the product DB 131, the shelf camera-based product specifying unit 3603 specifies the object as the product registered in the product DB 131. The product candidates are generated through the deep learning, and then the product is specified with a high degree of accuracy by performing the verification function.

The shelf camera-based product specifying unit 3603 may not specify the product in one frame of the captured image captured by the shelf camera 311 but specify the product over a plurality of captured images using the captured image captured by the ceiling camera 310 as well. At this time, the shelf camera-based product specifying unit 3603 causes the product candidates to have a percentage, adds a percentage on the basis of information such as a purchase history, a time, a place, or a person's preference, and specifies the product when a certain threshold value is exceeded.

The basket product associating unit 3605 associates the product information of the product specified by the shelf camera-based product specifying unit 3603 with the moving object Mo. As a premise, if there is only one moving object Mo in a predetermined area imaged by one shelf camera 311, it is possible to specify the ID of the basket moving object Mo and associate the moving object Mo with the product information. At this time, the basket product associating unit 356 specifies the ID of the moving object Mo by using the position information attached to the marker or the like attached to the moving object Mo.

As another premise, if there are a plurality of moving objects Mo in a predetermined area imaged by one shelf camera 311, the moving object Mo in which the object picked up from the shelf is put as a result of detecting the object entering/leaving the moving object Mo through the shelf camera or ceiling camera-based basket entering/leaving detecting unit to be described later is specified, and the moving object Mo is associated with the product information. As still another premise, if there is no moving object Mo in a predetermined area imaged by one shelf camera 311, at least one or more shelf cameras 311 or at least one or more basket cameras 312 detect the entering/leaving to/from the moving object Mo, specify the moving object Mo, and then associate the specified moving object Mo with the product information.

The basket-associated product list management unit 3607 keeps managing the product list which associates the moving object Mo with the specified products until the checkout is completed. In other words, the basket-associated product list management unit 3607 keeps constantly managing the list of products associated with the ID of the moving object Mo by using the position information management DB 132 or the like. When the object is picked up from the shelf, the basket-associated product list management unit 3607 adds the number of acquired products. Conversely, when the product is returned to the shelf, the basket-associated product list management unit 3607 subtracts the number of returned products.

The shelf camera-based object entering/leaving detecting unit 3608 can use the detection of the object entering the shelf as a trigger for activating the shelf camera-based object recognizing unit 3602. For example, the shelf camera-based object entering/leaving detecting unit 3608 detects the entrance of the object to the shelf from a change in image data in an "entering detection region" set in the captured image of each shelf camera 311. Further, the shelf camera-based object entering/leaving detecting unit also detects that the object leaves the region by tracking the entering object in the image.

In order to track the object, the shelf camera-based object entering/leaving detecting unit 3608 throws a particle filter to the entering detection region in the shelf. In order to be able to trace a plurality of moving objects Mo at the same time, for example, when a plurality of shoppers stretch out their hands at the same time, after a first object enters, the particles are thrown to the "entering detection region" again, and it prepares for entering of a next object. Here, on the premise that a plurality of objects do not enter the same region, the shelf camera-based object entering/leaving detecting unit 3608 does not throw the particles to the entering detection region for the region in which the object already exists.

In the predetermined region, the shelf camera-based object entering/leaving detecting unit 3608 determines that "object enters" when a proportion occupied by the particles having a certain likelihood is equal to or larger than a threshold value, and determines that "object leaves" when a proportion occupied by the particles having a certain likelihood is less than the threshold value. The shelf camera-based object entering/leaving detecting unit detects entering/leaving each time the product enters so that the number of regions of the object estimated is as small as possible at one time. The images before and after the change are stored in the storage unit 108 of the server 1 so that they can be used in the estimated region.

In addition to the above example, the shelf camera-based object entering/leaving detecting unit 3608 may detect the entering/leaving of the object from spectrum (wavelength) data obtained from the captured image of the object. Further, the shelf camera-based object entering/leaving detecting unit may detect the entering/leaving of the object by using a method such as a weight/pressure sensor, an infrared sensor, an ethylene gas sensor, or the like.

The product unspecifying determining unit 3609 associates information indicating that the product is unable to be specified by the shelf camera-based product specifying unit 3603 with the moving object Mo which picks up the object from the shelf.

Here, a case in which the product is unable to be specified by the verification function in the shelf camera-based product specifying unit 3603 will be described. First, the shelf camera-based product specifying unit 3603 specifies the number of similar feature points between the image in which the object is picked up from the shelf and the image in which the object is placed on the shelf. For example, the sizes of the objects imaged in both images are specified and then compared, a color difference is specified, colors are compared, and it is decided whether or not the objects are similar. If the number of feature points is small, it is possible to prevent the checkout from being erroneously performed without specifying the product.

The label recognizing unit 3610 recognizes an attached label depending on the product specified by the shelf camera-based product specifying unit 3603. The label recognizing unit 3610 reads the multidimensional code including the characters written in the label, the bar code, or the like by using the technique of image recognition or character recognition, and complements the product specifying.

The discount seal recognizing unit 3611 recognizes an attached discount seal depending on the product specified by the shelf camera-based product specifying unit 3603. The discount seal recognizing unit 3611 specifies a discount amount or a discount rate of the discount seal attached to the product using the technique of image recognition or character recognition. The discount seal recognizing unit 3611 is executed during the process of the product specifying unit.

The shelf camera or ceiling camera-based basket entering/leaving detecting unit 3612 detects whether there is the moving object Mo in a predetermined area of the shelf camera or the ceiling camera from the marker or the like attached to the baskets through at least either the shelf camera 311 or the ceiling camera 310 or detects entering/leaving the moving object Mo when there is no moving object Mo. The shelf camera or ceiling camera-based basket entering/leaving detecting unit 3612 may further detect entering of the moving object Mo to the region defined by the marker or the like. At this time, the entering of the moving object Mo to the region is detected by comparing the position information of the product being tracked with the position information of the entering detection line (such as the edge of the basket) for detecting the entering of the moving object Mo to the region.

Figure 28:
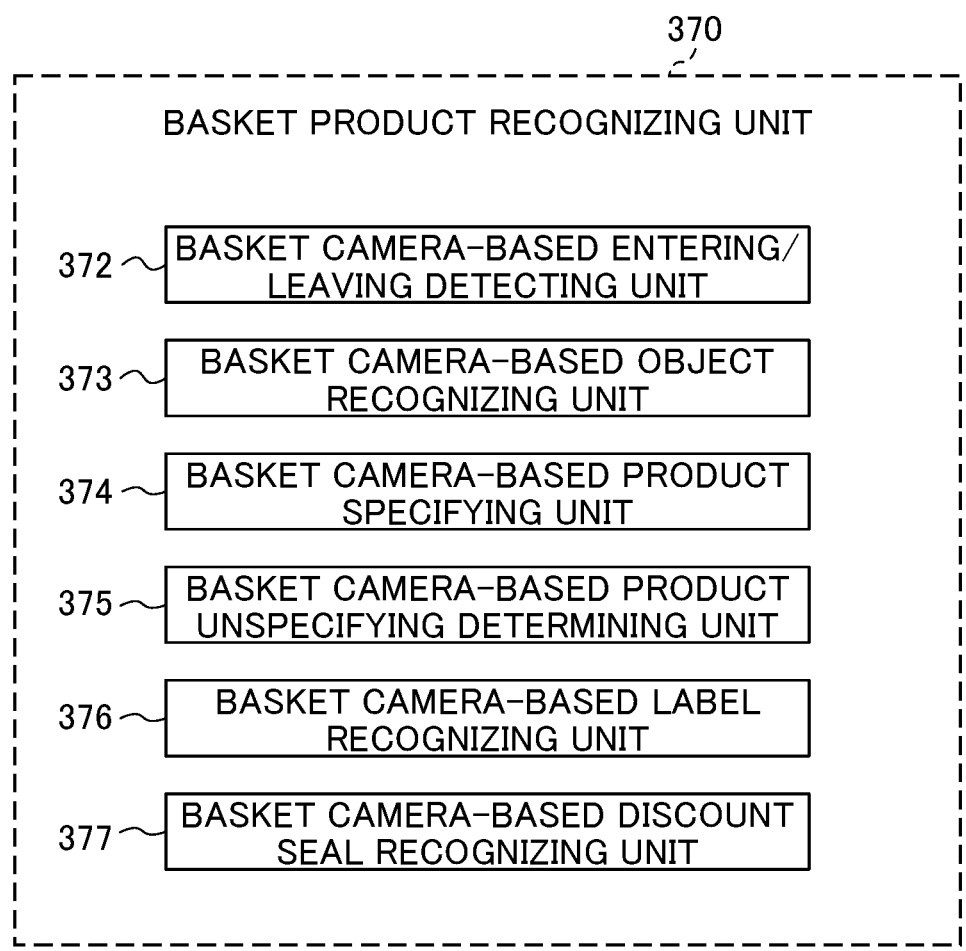
FIG. 28 is a functional block diagram illustrating a detailed functional configuration example of a basket product recognizing unit installed in the sales room device of FIG. 25.

The information processing system of the third embodiment may further include a basket product recognizing unit 370. FIG. 28 is a functional block diagram illustrating a detailed functional configuration example of the basket product recognizing unit 370 installed in the sales room device 3 of FIG. 25. The basket product recognizing unit 370 includes a basket camera-based basket entering/leaving detecting unit 372, a basket camera-based object recognizing unit 373, a basket camera-based product specifying unit 374, a basket product unspecifying determining unit 375, a basket product label recognizing unit 376, and a basket product discount seal recognizing unit 377.

When an object such as the hand of the shopper enters the baskets (the moving object Mo), the basket camera-based basket entering/leaving detecting unit 372 can use detection of the entering as a trigger for activating the basket camera-based object recognizing unit 373. The basket camera-based basket entering/leaving detecting unit 372 detects the entering of the object to the baskets from a change of an image in the "entering detection region" set in the captured image of each basket camera 312.

The basket camera-based basket entering/leaving detecting unit 372 tracks the object entering a frame of the captured image within the frame and detects that the moving object Mo leaves the frame. The basket camera-based basket entering/leaving detecting unit 372 tracks the object using the particle filter. In order to track a plurality of moving objects Mo at the same time, the basket camera-based basket entering/leaving detecting unit 372 throws the particles to the "entering detection region" again after the first object enters, and prepares for entering of a next object. The basket camera-based basket entering/leaving detecting unit 372 determines that "object enters" when a proportion occupied by the particles having a certain likelihood is equal to or larger than a threshold value, and determines that "object leaves" when a proportion occupied by the particles having a certain likelihood is less than the threshold value. The basket entering/leaving detecting unit by basket camera detects entering/leaving each time the object enters or leaves so that the number of regions of the object estimated is as small as possible at one time.

The basket camera-based object recognizing unit 373 compares the image when the object such as the hand of the shopper enters the baskets (the moving object Mo) with the image after the object leaves the baskets (the moving object Mo), and defines the image region in order to specify the object which is picked up from the shelf and put in the baskets (the moving object Mo) (or the object which is returned from the baskets (the moving object Mo) to the shelf) as the product. The basket camera-based object recognizing unit 373 checks the change in the region using RGB data. The basket camera-based object recognizing unit 373 may recognize the object using spectrum (wavelength) data obtained from the captured image of the object, a weight sensor, a pressure sensor, an infrared sensor, a methylene gas sensor, or the like.

The basket camera-based product specifying unit 374 specifies the product to which the object put in the baskets belongs. The basket camera-based product specifying unit 374 lists the product candidates for the object recognized by the basket camera-based object recognizing unit 373 through the image processing technique such as specific object recognition, general object recognition, deep learning, or the like. The listed product candidates are referred to as a "product candidate list S". Thereafter, the basket camera-based product specifying unit 374 performs the verification function and specifies the product with a high degree of accuracy.

The verification function lists a "product candidate list P" by an algorithm different from the technique of listing the product candidates. The basket camera-based product specifying unit 374 matches the product candidate lists S and P, and specifies the product when a predetermined threshold value is exceeded. A technique for listing the product candidates may be implemented by, for example, a method of matching the information of the captured object image obtained from the object whose presence is recognized with the image information held in the product DB 131 or the storage unit 108. In other words, if the feature information of both images coincides, that is, if the threshold value is exceeded, the object whose presence is recognized by the basket camera-based object recognizing unit 373 is specified as the product registered in the product DB 131. The basket camera-based product specifying unit 374 may specify the product from the captured image over a plurality of frames without specifying the product in one frame of the captured image. At this time, the basket camera-based product specifying unit 374 causes the product candidates to have a percentage, adds a percentage on the basis of information such as a purchase history, a time, a place, or a person's preference, and specifies the product when a certain threshold value is exceeded.

The basket product unspecifying determining unit 375 associates information indicating that the object put in the basket is unable to be recognized as the product by the basket camera-based product specifying unit 374 with the ID of the moving object Mo. The basket product label recognizing unit 376 recognizes an attached label depending on the product which is put in the basket and specified by the basket camera-based product specifying unit 374. The basket product label recognizing unit reads the multidimensional code including the characters written in the label, the bar code, or the like by using the technique of image recognition or character recognition, and complements the product specifying. The basket product discount seal recognizing unit 377 specifies a discount amount or a discount rate of the discount seal attached to the product specified by the basket camera-based product specifying unit 374 using the technique of image recognition or character recognition. The basket product discount seal recognizing unit specifies the discount amount or the like while the basket camera-based product specifying unit is performing the process.

The information processing system further includes a selling-restricted product determining unit 380 and a remote control unit 390. The selling-restricted product determining unit 380 determines whether or not the specified product is the selling-restricted product as described above in the first embodiment. If the selling-restricted product is detected, the selling-restricted product determining unit causes the information to be displayed on the error display unit 151. The remote control unit 390 is installed in an information terminal 38 or the server 1, and has a function of releasing the error state, for example, when notification of the error state is provided.

The checkout device 4 installed in the checkout area 35 calculates the total amount of all the products put in one or more baskets, and performs the checkout or the payment. The checkout device performs the checkout on the basis of the moving object Mo being continuously tracked and the product information associated with the moving object Mo. To this end, as illustrated in FIG. 25, the checkout device 4 includes a CPU 401, an input unit 406, an output unit 407, and a communication unit 409. In the CPU 401, a checkout unit 435, an input control unit 436, and an output control unit 437 function.

The input unit 406 includes a unit of reading a credit card or an electronic money. The output unit 407 has, for example, a function of outputting a screen for displaying a checkout product or a receipt. The checkout unit 435 determines a checkout amount and a checkout target item. The input control unit 436 receives a signal from the input unit 406 and activates the CPU 401. The output control unit 437 outputs an operation result of the checkout unit 435 to the output unit 407. The checkout device 4 compares a position relation of the position information of the moving object Mo and the checkout area 35 which is decided in advance, and performs the checkout when the position information of the moving object Mo is within the checkout area 35, or when the moving object Mo is placed on the checkout device 4.

Alternatively, the checkout device 4 may include a button for giving an instruction to start the checkout and perform the checkout, for example, when the button is pushed, or the checkout device 4 may include a weight sensor (not illustrated) and perform the checkout, for example, when a change in weight when the moving object Mo is placed is recognized. In the checkout device 4, the payment can be made using a gift card, a voucher, a virtual currency, or the like in addition to a cash. In the checkout device 4, the error state may occur. Examples of the error state include (A) a system processing abnormality, (B) a case in which an object of product unspecifying is associated with the moving object Mo, and (C) a case in which the selling-restricted product is associated with the moving object Mo (naturally not limited thereto).

The system employed by the present embodiment takes various countermeasures in accordance with each error state. In the case of (A), information indicating the system processing abnormality is presented to the checkout device 4, an information terminal 38a, an information terminal 38b, and the server 1. Accordingly, it is possible for the clerk to resolve the error state. The error state may be solved by the remote control unit 390. In the case of (B), information indicating that the object of product unspecifying is associated with the moving object Mo is presented to the checkout device 4, the information terminal 38a, the information terminal 38b, and the server 1. Accordingly, it is possible for the clerk to resolve the error state. The error state may be solved by the remote control unit 390. In the case of (C), information indicating that the selling-restricted product is associated with the moving object Mo is presented to the checkout device 4, the information terminal 38a, the information terminal 38b, and the server 1. Accordingly, the error state can be solved, for example, such that the clerk can check the age of the shopper when the product is the selling-restricted product due to the age limit, the clerk can take a countermeasure of exchanging the product when the product is the selling-restricted product because it is the expired or out-out date product, and the shopper can check when the product is the selling-restricted product since it is an allergic or non-halal food. The error state may be solved by the remote control unit 390.

Figure 29:
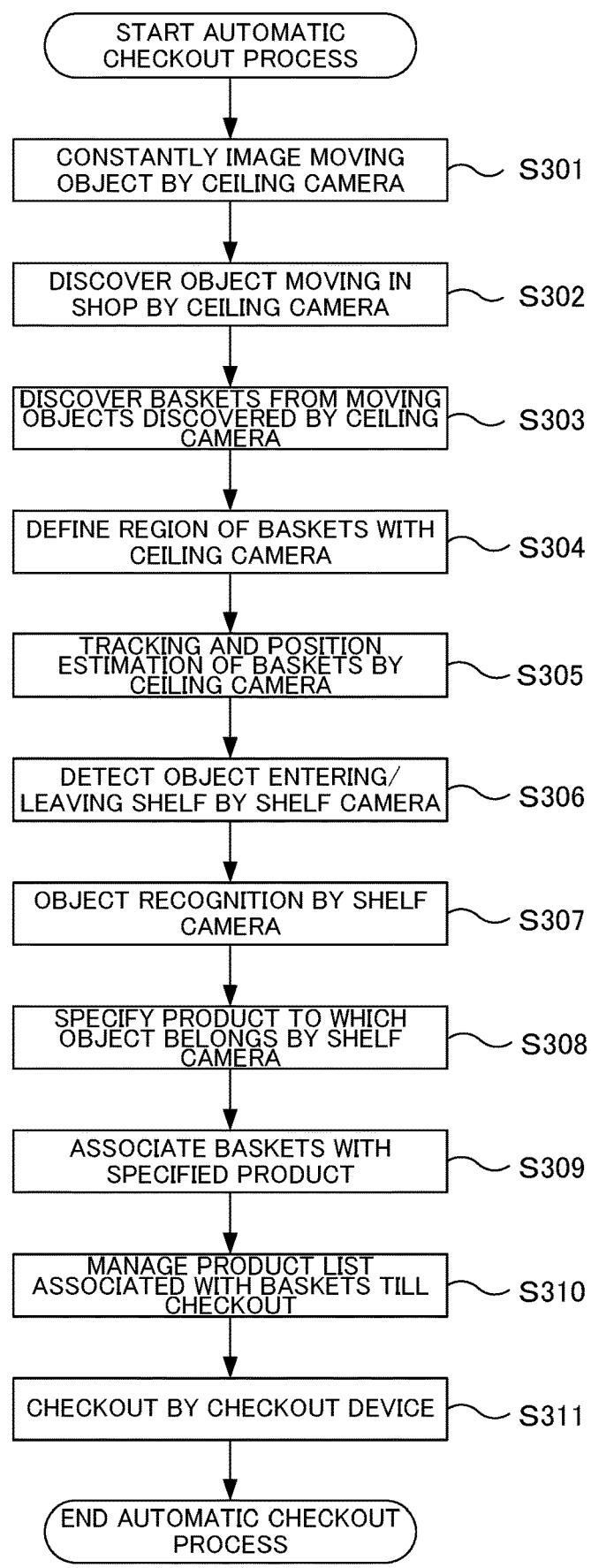
FIG. 29 is a flowchart for describing a basic flow of an automatic checkout process executed by the server, the sales room device, and the checkout device of FIG. 25.

Here, a method of specifying the product from the object and checking out the product through the product recognition system of the third embodiment will be described with reference to FIG. 29. FIG. 29 is a flowchart for describing a basic flow of the automatic checkout process executed by the server 1, the sales room device 3, and the checkout device 4 of FIG. 25.

In step S301, the shopper (the moving object) enters the shop from the entrance 31 of the shop 30 (FIG. 22), and the ceiling camera 310 installed near the entrance 31 starts imaging the shopper. If the shopper enters the passage 34 with the basket or the card, the inner ceiling camera 310 starts imaging the shopper. As described above, a plurality of ceiling cameras 310 constantly image the entire shop 30 including the shoppers, the baskets, and the carts. Before step S301, the individual authenticating unit 320 may perform the individual authentication on the shopper and acquire the personal information of the shopper.

In step S302, the ceiling camera-based moving object discovering unit 3302 discovers the moving object (not numbered) in the captured image using the state space model (the Bayesian filter) or the like. Since not only the object moving in the shop 30 but also a stationary object is imaged in the captured image, the ceiling camera-based moving object discovering unit 3302 discovers only the object moving in the shop 30 from which the stationary object is removed.

In step S303, the ceiling camera-based basket discovering unit 3303 discovers the baskets (the moving object Mo in the third embodiment) from among the objects discovered by the ceiling camera-based moving object discovering unit 3302, and assigns the individual ID. The ID continues to be used till a predetermined timing, for example, until the shopper leaves the shop or the checkout is completed.

In step S304, the ceiling camera-based basket region defining unit 3306 defines the position of the region of the moving object Mo discovered by the ceiling camera-based basket discovering unit 3303. Further, when the moving object Mo moves within the range being imaged by the ceiling camera 310, the position of the region of the moving object Mo after the movement is defined again. The position information is managed by the position information management DB 132, the memory, or the like in association with the ID of the moving object Mo and updated each time the region is defined. This defined position is also recognized at a position being imaged by another ceiling camera 310.

In step S305, the ceiling camera-based basket region tracking unit 3307 estimates a position to which the moving object Mo moves within the captured image being captured by the certain ceiling camera 310. Further, the ceiling camera-based basket region defining unit 3306 defines the region of the moving object Mo for the position to which the moving object Mo is estimated to have moved, and updates the position information of the moving object Mo stored in the position information management DB 132 or the memory.

In step S306, the shelf camera-based object entering/leaving detecting unit 3608 detects that the object such as the hand of the shopper enters or leaves the shelf. The shelf camera-based object recognizing unit 352 is activated using the detection as a trigger. The object entering the shelf is detected depending on whether or not the image data in the entering detection region set in each shelf camera 311 is changed. The shelf camera-based object entering/leaving detecting unit 3608 keeps tracking the object that has entered the shelf and detects that the object leaves the shelf.

In step S307, the shelf camera-based object recognizing unit 3602 compares the captured image before the object enters the shelf with the captured image after the moving object Mo leaves the shelf and recognizes the object picked up from the shelf.

In step S308, the shelf camera-based product specifying unit 3603 specifies the product to which the detected moving object Mo belongs. The shelf camera-based product specifying unit 3603 lists the product candidates for the object detected by the object recognizing unit 3602 by the image processing technique such as specific object recognition, general object recognition, deep learning, or the like. The listed product candidates are referred to as a "product candidate list S". Thereafter, the shelf camera-based product specifying unit 3603 performs the verification function and specifies the product with a high degree of accuracy.

The verification function lists a "product candidate list P" by an algorithm different from the technique of listing the product candidates. The shelf camera-based product specifying unit 3603 matches the product candidate lists S and P, and specifies the product when a predetermined threshold value is exceeded. A technique for listing the product candidates may be implemented by, for example, a method of matching the information of the captured object image obtained from the object whose presence is recognized with the image information held in the product DB 131 or the storage unit 108. In other words, if the feature information of both images coincides, that is, if the threshold value is exceeded, the object whose presence is recognized by the shelf camera-based object recognizing unit 3602 is specified as the product held in the product 131. The product unspecifying determining unit 3609 transmits the error information to the server 1 when the product is unable to be specified. This error information is displayed on the error display unit 151 or the information terminal 38.

In step S309, the basket product associating unit 356 associates the product specified by the shelf camera-based product specifying unit 3603 with the ID of the moving object Mo. In other words, the baskets (the moving object Mo) carried by the shopper who has picked up the specified product are specified. Further, in a case in which the product is unable to be specified by the product unspecifying determining unit 3609 when the product or the object is packed up from the shelf or returned to the shelf, information (error information) of the product unspecifying is associated with ID of the moving object Mo.

In step S310, the product list management unit 357 associated with the moving object Mo keeps managing the list of products associated with the ID of the moving object Mo. This management continues till a predetermined timing, for example, until the moving object Mo moves to the checkout area 35.

In step S311, if all the products of the moving object Mo are added up in the checkout area 35 and checked out or paid for by the checkout device 37, the product list associated with the moving object Mo is updated to the checked-out status, and the automatic checkout process ends. Further, when the moving object Mo is associated with the information (error information) of product unspecifying, the automatic checkout process does not end, and the error information is transmitted to the server 1. The error information is displayed on the error display unit 151 or the information terminal 38. In other words, the clerk can come to the shopper and check and release the error.

When the moving object Mo which is not checked out passes through the exit 32, the error information is sent to the server 1. This error information is displayed on the error display unit 151, the information terminal 38a, or the information terminal 38b. If an alarm device (not illustrated) is installed near the exit 32, the alarm device issues a warning by a sound, a light, or the like. In the automatic checkout process of the third embodiment, since the product is specified on the basis of the image captured by the shelf camera, it is not necessary to specify the product for the object put in the basket. Here, in order to verify whether or not the product is incorrectly specified, it is preferable to specify the product for the object put in the basket.

Figure 30:
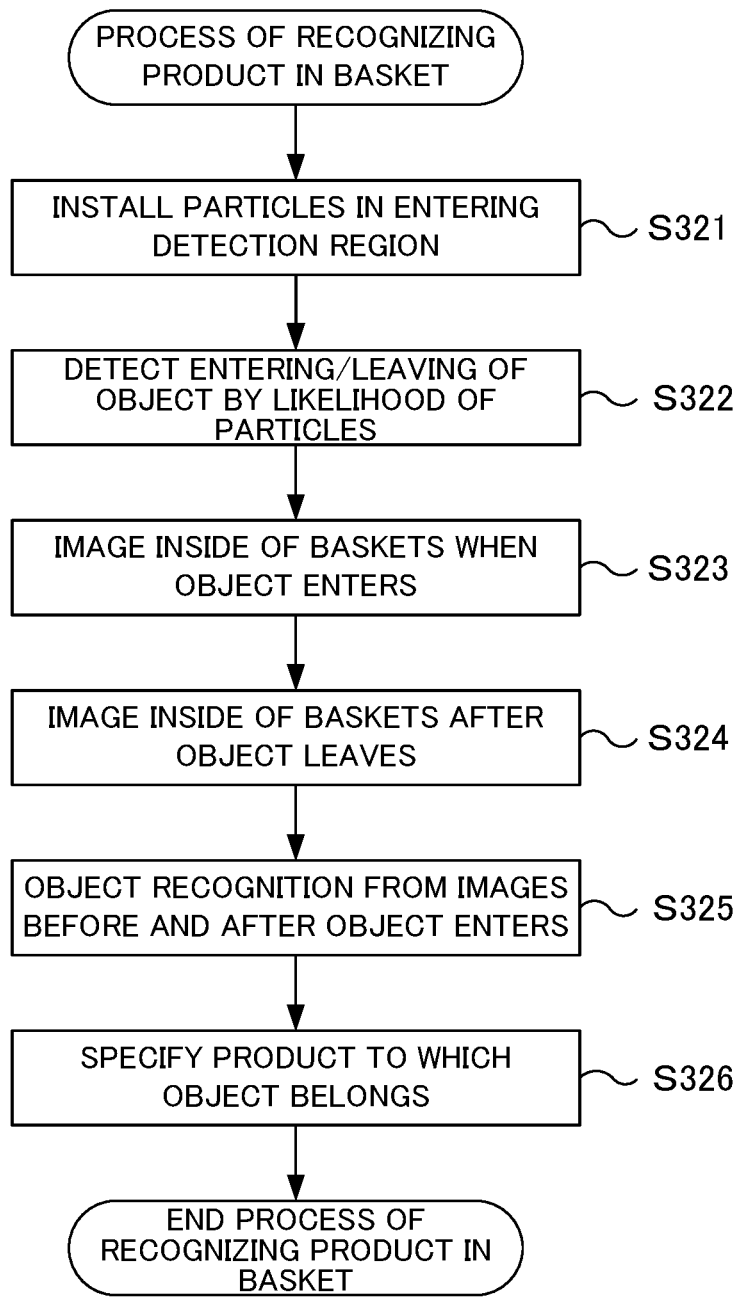
FIG. 30 is a flowchart for describing a process of recognizing a product in a basket in an automatic checkout process executed by the server sales room device and the checkout device of FIG. 25.

FIG. 30 is a flowchart for describing a process of recognizing the product in the basket in the automatic checkout process executed by the server sales room device, and the checkout device of FIG. 25.

In step S321, the basket camera-based basket entering/leaving detecting unit 372 installs the particles in the entering detection region set in a predetermined position in the captured image in advance so that the likelihood other than the basket region is lowed. In step S322, the basket camera-based basket entering/leaving detecting unit 372 detects that the object (the hand of the shopper or the like) enters the entering detection region in the basket in accordance with the likelihood of the particles. In order to prepare for a case in which a plurality of objects enter, after the object enters the entering detection region in the basket, the basket camera-based basket entering/leaving detecting unit 372 sets new particles. In step S323, the basket camera 312 images the state in the basket at a time point at which the object (the hand of the shopper or the like) enters the entering detection region. The basket camera 312 also images a region other than the entering detection region. For example, it is assumed that three products have been imaged in a captured image (a previous image). The product imaged in the previous image has already been specified from the object and is thus regarded as the product.

In step S324, the basket camera 312 images the state in the basket at a time point at which the object leaves the entering detection region. For example, it is assumed that one object has been imaged in an image (a subsequent image) captured at this time in addition to the three products.

In step S325, the basket camera-based object recognizing unit 373 compares the previous image with the subsequent image and defines an image region for one added object. In step S326, the basket camera-based product specifying unit 374 specifies the product to which the increased object belongs. The specifying of the product can be performed by employing the same technique as a specific technique employed by the shelf product recognizing unit 360.

As a result, the information processing system specifies the product to which the object included in the basket belongs. Then, the information processing system can verify whether or not the product specified in step S308 coincides with the product specified in step S326. When the product is unspecified, information indicating the error state is displayed on the error display unit 151, the information terminal 38a, or the information terminal 38b. Accordingly, it is possible to prevent an erroneous checkout. Further, if the information indicating that the product is unspecified is displayed on the information terminal 38a or the information terminal 38b, the clerk may come to the sales room in which the basket is located and verify the product, or the clerk or the like inside or outside the shop may release the error state through the remote control.

Fourth Embodiment

Figure 31:
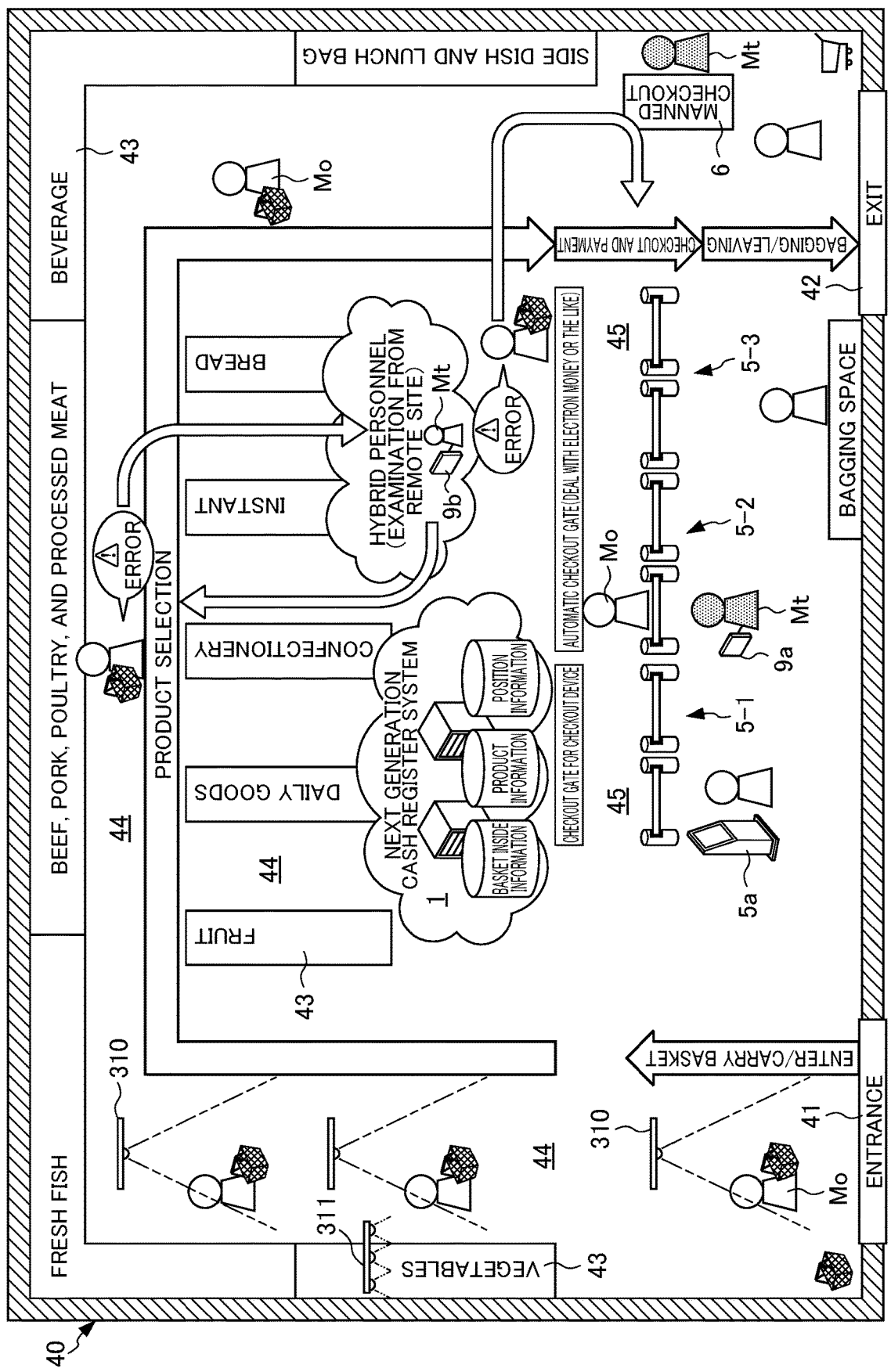
FIG. 31 is a diagram illustrating a layout example of a supermarket employing a product recognition system in the fourth embodiment.

FIG. 31 is a diagram illustrating a layout example of a supermarket employing the product recognition system in the fourth embodiment. The information processing system of the fourth embodiment is a product recognition system applied to a shop 40 such as a supermarket as illustrated in FIG. 31. The information processing system of the fourth embodiment is configured to be able to perform the automatic checkout even when the product passes through checkout gates 5-1 to 5-3 without being placed on the cash register counter.

In the shop 40, shopping baskets, shopping carts, and the like (not numbered) are placed at an entrance 41. The checkout gates 5-1 to 5-3 and a checkout cash register 6 manipulated by the clerk Mt are installed in front of exit 42. Further, a plurality of shelf racks 43 on which the products are displayed are installed between the entrance 41 and the exit 42. In the shelf rack 43, a plurality of shelves are arranged with predetermined intervals in the vertical direction, and various kinds of product are displayed on each of a plurality of shelves. Hereinafter, "between shelves" is also described by "in shelf". A space between the shelf racks 43 facing each other in the horizontal direction is defined as a passage 44.

The shopper enters the shop from the entrance 41, and goes along the passage 44 by picking up the shopping basket, pushing the shopping cart or carrying my bag. The shopper picks up the product in the shelf, puts the product in the baskets, and goes along the passage 44. If all the products desired to be purchased are picked up, the shopper goes to a checkout area 45 and checks out the products. The clerk Mt is looking around in the passage 44, the checkout area 45, or the like. The clerk Mt carries an information terminal 9a. The information terminal 9a is a portable information processing terminal such as a smartphone and has a function of displaying the state in the shop, a function of displaying the error state occurring in the shop, a remote control function, and the like.

In FIG. 31, a form of the outside of the shop 40 or the backyard of the shop 40 other than the inside of the shop 40 is illustrated in a line drawing drawn in a cloud shape. The server 1 (FIG. 5) is installed outside the shop 40 or in the backyard of the shop. Outside the shop or in the backyard, the clerk Mt can monitor the inside of the shop 40 through a screen of a large monitor (not illustrated) or a screen of the information terminal 9b. The shopping basket, the shopping cart, and my bag are referred to collectively as "baskets". The passage 44 including the checkout gates 5-1 to 5-3 is set as the checkout area 45. Further, the baskets, the shopper, and the like are referred to collectively as a "moving object Mo".

A plurality of ceiling cameras 310 are installed on the ceiling of the passage 44 between the entrance 41 and the exit 42. A plurality of shelf cameras 311 are installed at a plurality of positions of each shelf in each shelf rack 43. In FIG. 31, a form of the outside of the shop 40 or the backyard of the shop 40 other than the inside of the shop 40 is illustrated in a line drawing drawn in a cloud shape. The server 1 (FIG. 5) is installed outside the shop 40. In the backyard, the clerk Mt monitors the inside of the shop 30 through a screen of a large monitor (not illustrated) or a screen of the information terminal 9b.

Figure 32:
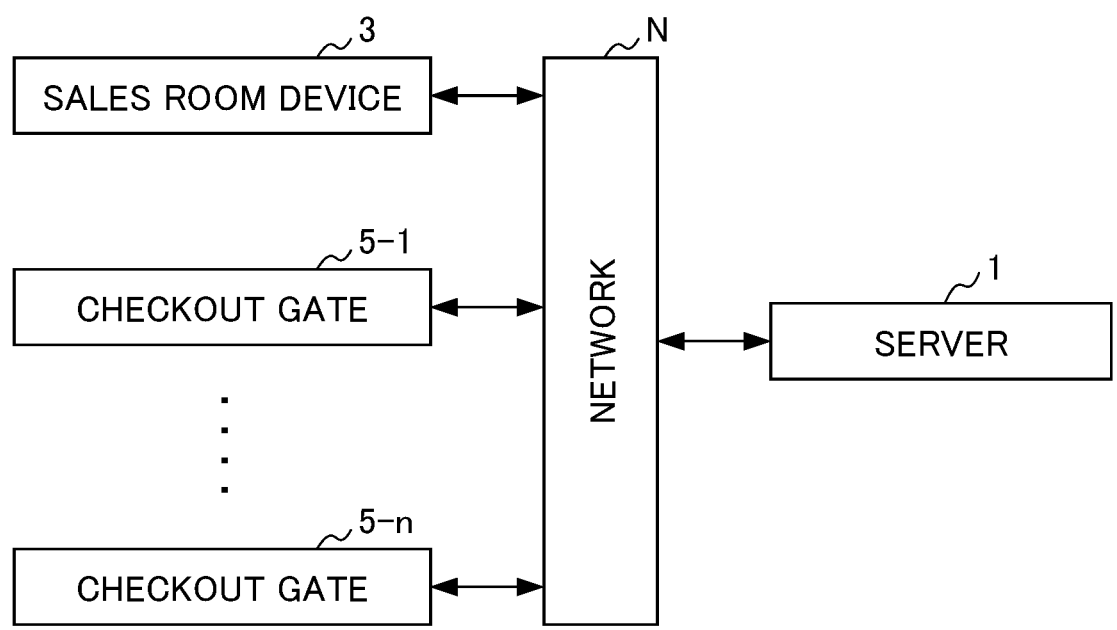
FIG. 32 is a configuration diagram illustrating a configuration of a product recognition system as the fourth embodiment of the information processing system of the present invention.

FIG. 32 is a configuration diagram illustrating a configuration of a product recognition system which is the fourth embodiment of this information processing system. The product recognition system of the fourth embodiment has a configuration illustrated in FIG. 33. The product recognition system includes the server 1, the sales room device 3, and n (n is an arbitrary integer) checkout gate 5-1 to 5-n. The cash register terminals 2 employed in the first and second embodiments are not employed in the fourth embodiment. The server 1, the sales room device 3, and the checkout gate 5-1 to 5-n are connected to one another via a network N such as an Internet (Internet) line or the like. For convenience of description, only one server 1 is illustrated in FIG. 32, but in practice, there may be a plurality of servers 1. Hereinafter, when there is not necessary to distinguish the checkout gate 5-1 to 5-n individually, they are referred to collectively as a "checkout gate 5".

The server 1 executes each process to manage each operation of the sales room device 3 and the checkout gate 5. The server 1 is configured similarly to the hardware configuration of the server 1 of the first embodiment illustrated in FIG. 5.

Therefore, the server 1 includes a CPU 101, a ROM 102, a RAM 103, a bus 104, an input/output interface 105, an output unit 106, an input unit 107, a storage unit 108, a communication unit 109, and a drive 110.

The sales room device 3 is configured similarly to the hardware configuration of the third embodiment illustrated in FIG. 24 but does not include the illustrated basket camera 312.

Therefore, the sales room device 3 includes a CPU 301, a ROM 302, a RAM 303, a bus 304, an input/output interface 305, a ceiling camera 310, a shelf camera 311, an information terminal 9, and a communication unit 315.

Here, the error state in the fourth embodiment occurs in various situation, for example, when an abnormality occurs in system processing, when the product is unable to be specified in shelf product recognition, when the moving object Mo associated with the unspecified object or the selling-restricted product tries to pass through the gate 5, or when the shopper (the moving object Mo) which has not checked out tries to leave the shop.

The checkout gate 5 is connected to the sales room device 3 via the network N. The checkout gates 5 are divided into the checkout gate 5-1 using a checkout device 5a, the checkout gate 5-2 using electronic money and the like, and the checkout gate 5-3 that can perform the checkout through only passing. The checkout gates 5-1 to 5-3 other than the manned checkout cash register 6 may include a normally closed opening/closing member (not numbered).

The checkout gate 5-1 using the checkout device 5a has a checkout button (not illustrated), calculates a sum of amounts of purchased products, and performs the checkout through the checkout device 5a installed on the exit 42 side. The checkout device 5a is installed on the exit 42 side rather than the checkout gate 5-1. This checkout device 5a includes a payment means in which payment can be made using cash, a credit card, electronic money, point payment, a gift card, virtual currency, a prepaid card, or the like. If a person who makes a payment pushes the checkout button, using the pushing as a trigger, the checkout gate 5-1 using the checkout device 5a reads the product information associated with the moving object region to be described later, and determines the checkout amount, and then the person can pass through the checkout gate 5-1. In a case in which the opening/closing member is installed, the opening/closing member is opened. Then, if the person who makes a payment makes a payment through the checkout device 5a, the person can leave the shop.

The checkout gate 5-2 using the electronic money and the like perform the checkout by passing the electronic money or the like over the gate main body. In other words, the checkout gate using the electronic money and the like includes a card reading unit (not illustrated) but does not include the checkout button as in the checkout gate 5-1 using the checkout device 5a and does not use the checkout device 5a. The electron money and the like include not only narrowly defined cards such as credit cards, so-called point cards, and prepaid cards but also portable information terminals in addition to payable IC cards. These cards are hereinafter described as "various kinds of cards". If the person who makes a payment enters the checkout area 45 of the checkout gate 5-2, and various kinds of cards are read by the card reading unit, the product information associated with the moving object region to be described later is read out, the checkout and the payment are completed, and the person can pass through the checkout gate 5-2.

The checkout gate 5-3 causes the checkout and the payment to be completed only when the shopper whose personal information is acquired in the entrance 41, the passage 44, or the like passes through the checkout gate 5-3. In other words, the checkout and the payment are completed, for example, without paying cash or causing a card to be read.

Figure 33:
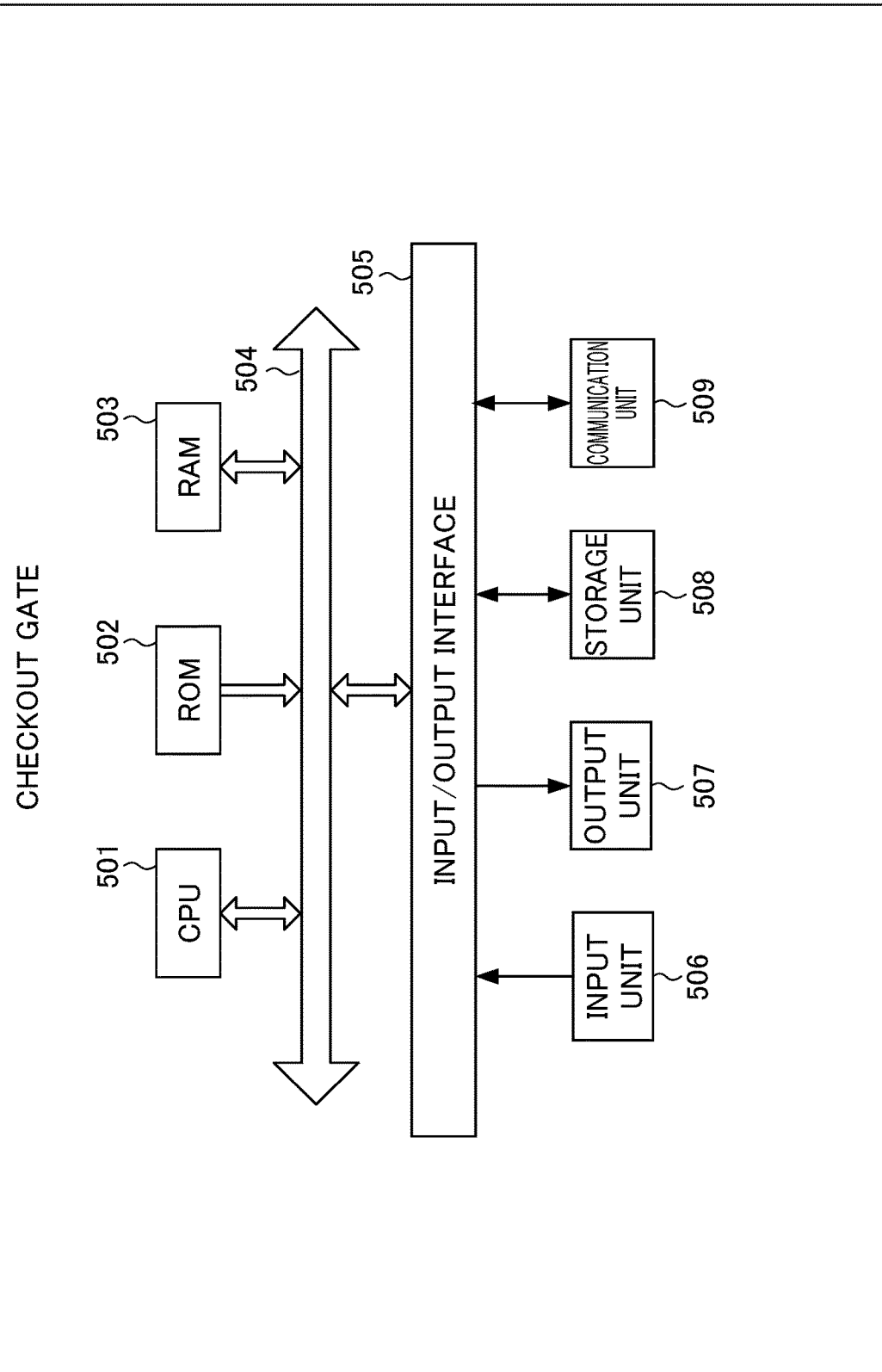
FIG. 33 is a diagram illustrating a hardware configuration of a checkout gate in the product recognition system of FIG. 32.

In the manned checkout cash register 6, the clerk Mt individually inputs the prices of products and checks outs the products. FIG. 33 is a block diagram illustrating a hardware configuration of checkout gate 5 in the product recognition system of FIG. 32. The checkout gate 5 includes a CPU 501, a ROM 502, a RAM 503, a bus 504, an input/output interface 505, an input unit 506, an output unit 507, a storage unit 508, and a communication unit 409.

The CPU 501, the ROM 502, the RAM 503, the bus 504, the input/output interface 505, the storage unit 508, and the communication unit 509 of the checkout gate 5 are configured similarly to those of the server 1.

The input unit 506 is a checkout button installed in the gate body in the checkout gate 5-1 using the checkout device 5a and is an information reading unit that detects information of various kinds of cards or the like in the checkout gate 5-3 that can perform the checkout while passing the checkout gate 5-2 using the electronic money.

The output unit 507 outputs a signal for opening/closing the opening/closing member (not numbered) installed in each of the checkout gates 5-1 to 5-3. Further, the checkout gate 5-1 using the checkout device 5a outputs a checkout amount, a product name, and the like to the checkout device 5a.

Figure 34:
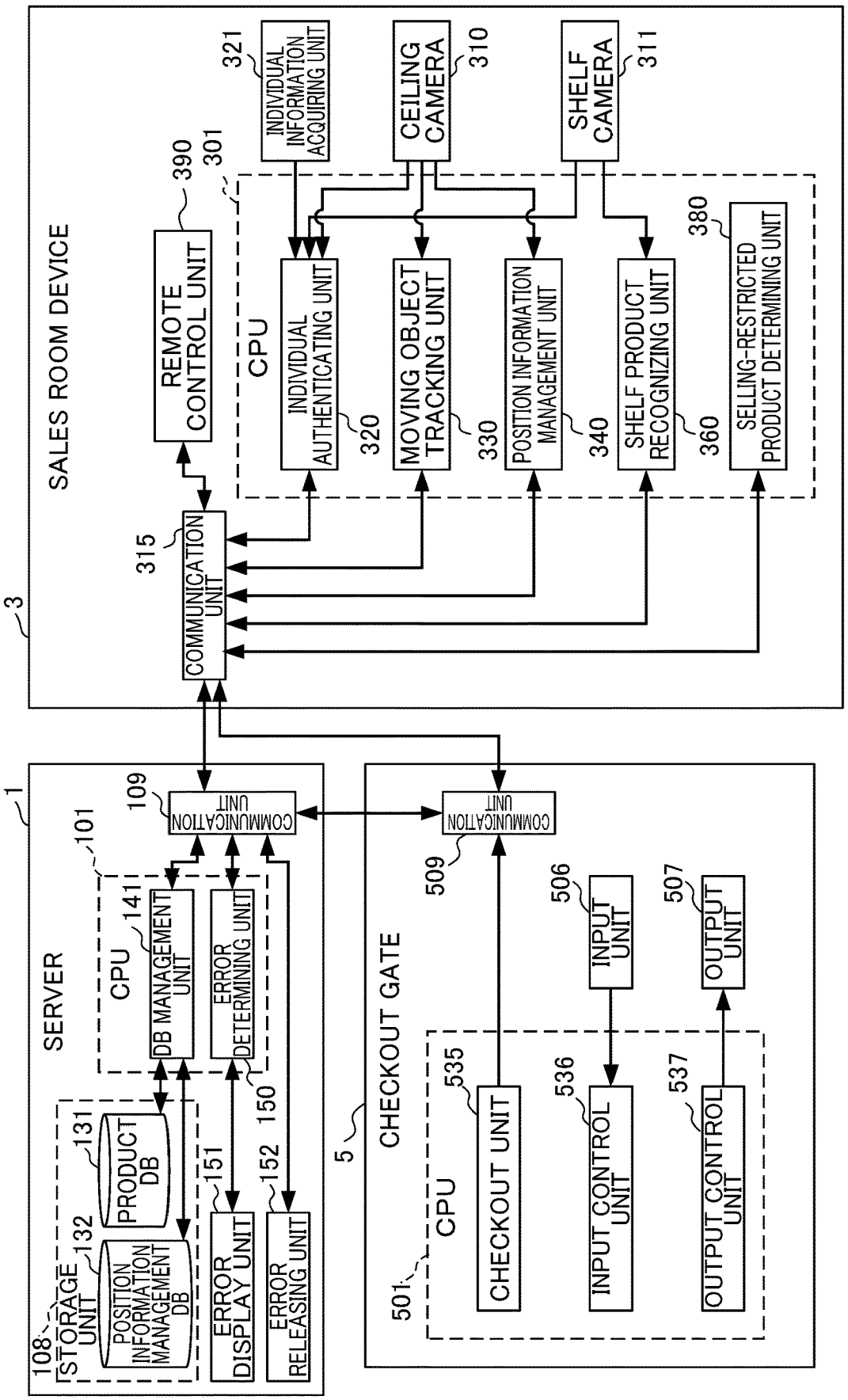
FIG. 34 is a functional block diagram illustrating an example of functional configurations of the server of FIG. 5, the sales room device of FIG. 24, and the checkout gate of FIG. 33.

FIG. 34 is a functional block diagram illustrating an example of functional configurations of the server 1 of FIG. 5, the sales room device 3 of FIG. 24, and the checkout gate 5 of FIG. 33.

The server 1 includes a CPU 101, a storage unit 108, an error display unit 151, and an error releasing unit 152, similar to those of the third embodiment. The server 1 is configured similarly to the server 1 of the third embodiment.

Figure 35:
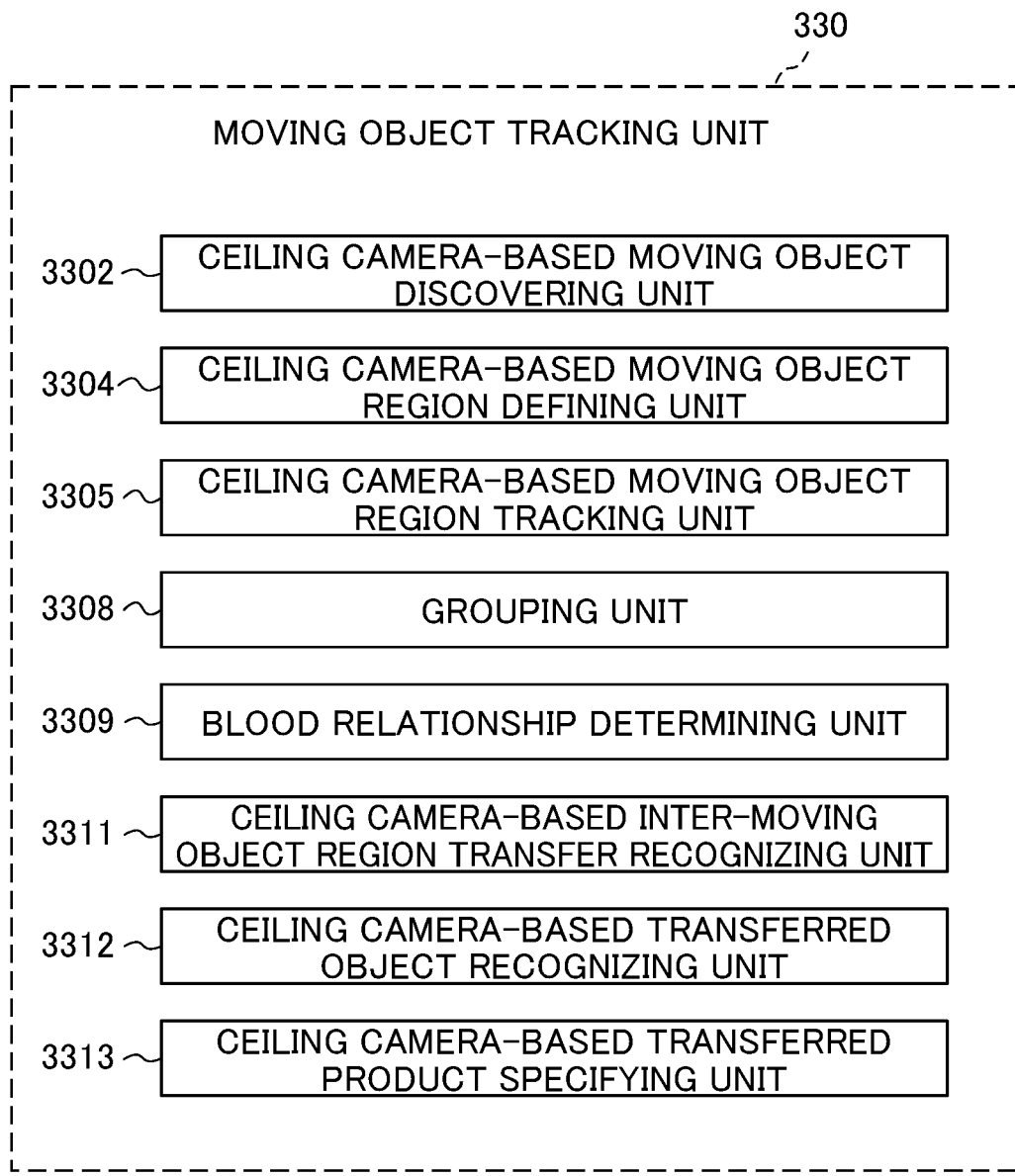
FIG. 35 is a functional block diagram illustrating a detailed functional configuration example of a moving object tracking unit installed in the sales room device in the fourth embodiment.

FIG. 35 is a functional block diagram illustrating a detailed functional configuration example of the moving object tracking unit 330 installed in the sales room device 3 in the third embodiment. The CPU 301 of the sales room device 3 includes an individual authenticating unit 320, a moving object tracking unit 330, a position information management unit 340, a shelf product recognizing unit 360, a basket product recognizing unit 370, and a selling-restricted product determining unit 380 as illustrated in FIG. 35. The individual authenticating unit 320, the moving object tracking unit 330, the position information management unit 340, the basket product recognizing unit 370, and the selling-restricted product determining unit 380 are configured similarly to the third embodiment.

The individual authenticating unit 320 includes a personal information acquiring unit 321, similar to that of the third embodiment. The individual authenticating unit 320 acquires the personal information from the personal information acquiring unit 321 or the DB management unit 141 of the server 1.

As illustrated in FIG. 35, the moving object tracking unit 330 includes a ceiling camera-based moving object discovering unit 3302, a ceiling camera-based moving object region defining unit 3304, a ceiling camera-based moving object region tracking unit 3305, a grouping unit 3308, a blood relationship determining unit 3309, a ceiling camera-based inter-moving object region transfer recognizing unit 3311, a ceiling camera-based transferred object recognizing unit 3312, and a ceiling camera-based transferred product specifying unit 3313. On the basis of the captured image captured by the ceiling camera 310, the ceiling camera-based moving object discovering unit 3302 discovers the moving object Mo (the shopper, the basket, the cart, or the like) using the state space model (the Bayesian filter or the like). The ceiling camera-based moving object region defining unit 3304 defines the region of the moving object Mo discovered by the ceiling camera-based moving object discovering unit 3302 as the moving object region. The ceiling camera-based moving object region defining unit 3304 continuously finds a changed region centering on the moving object Mo and defines the moving object region. In other words, the ceiling camera-based moving object region defining unit 3304 defines the moving object region within a certain range of the discovered moving object Mo, the moving object Mo, and the region around the moving object Mo as the moving object region.

Then, the moving object Mo may be clearly defined by estimating an approximate pose by applying a skeleton model when the shopper is viewed from the upper side and comparing it with the moving object region in an actually obtained video. Here, if a region centered on a person is referred to as a human region, the human region becomes a subordinate concept of the moving object region. Further, if a region centered on the baskets is referred to as a basket region, the basket region becomes a subordinate concept of the moving object region. Further, if a region centered on the cart is referred to as a cart region, the cart region becomes a subordinate concept of the moving object region.

The ceiling camera-based moving object region tracking unit 3305 tracks the movement of the moving object Mo. For example, the ceiling camera-based moving object region tracking unit 3305 tracks the movement of the moving object Mo by collecting the feature data (the color, the shape, or the like) of the moving object Mo. Alternatively, the ceiling camera-based moving object region tracking unit 3305 tracks the movement of the moving object Mo using a technique of tracking an object in an image such as the Bayesian filter, the fast Fourier transform, or the Tracking-Learning-Detection (TLD).

The grouping unit 3308 groups a plurality of persons when a plurality of persons such as family members or friends come. Further, the grouping unit 3308 may group a plurality of persons using information such as a sense of distance (overlapping, sticking, or the like) between the moving objects Mo, a moving direction (vector), and the like. The grouping unit 3308 may associate the person region with the basket region or the cart region. As the grouping unit 3308 functions as described above, the checkout can be performed by one person at the checkout gate 5.

The blood relationship determining unit 3309 recognizes a parent-child relationship, a sibling relationship, or the like by using a face authentication technique. The blood relationship determining unit assists the function of the grouping unit. The blood relationship determining unit may estimate a degree of similarity of faces using the face recognition technique of deep learning and estimate the blood relationship.

In a case in which the product is transferred from the shopper (the moving object Mo) to the shopper (the moving object Mo), the ceiling camera-based inter-moving object region transfer recognizing unit 3311 recognizes that the object is transferred from the moving object Mo to the moving object Mo, specifies the giving/receiving moving objects Mo, and reads the product list associated with each of the moving objects Mo.

The ceiling camera-based inter-moving object region transfer recognizing unit 3311 recognizes that the product transfer from the shopper (the moving object Mo) to the shopper (the moving object Mo) occurs, specifies the giving moving objects Mo and the receiving moving objects Mo, and reads the product list associated with each of the moving objects Mo. The ceiling camera-based transferred object recognizing unit 3312 then defines the region of the object from the captured image at a time point at which the transfer is recognized. Further, the ceiling camera-based transferred product specifying unit specifies the product in the read product list associated with the moving object Mo which has performed the transfer to which the transferred object belongs, associates each moving object Mo specified by the ceiling camera-based inter-moving object region transfer recognizing unit 3311 with the product specified by the transfer, and updates the list of products. The ceiling camera-based inter-moving object region transfer recognizing unit 3111 may analyze the motion of the shopper (the moving object Mo) by using an object recognition technique such as deep learning or the like and recognize the transfer, may recognize the hand in the human region at the time of transfer, and may recognize the transfer through overlapping of the human regions (which may include the hands). The ceiling camera-based inter-moving object region transfer recognizing unit 3311 may be realized by a shelf camera or the like capable of performing imaging with a wide range instead of a ceiling camera.

Then, the ceiling camera-based transferred object recognizing unit 3312 defines the region of the object from the captured image at a time point at which the transfer is recognized.

Further, the ceiling camera-based transferred product specifying unit 3313 specifies the product in the product list associated with the read moving object Mo (the person who has performed the transfer) to which the object recognized by the ceiling camera-based transferred object recognizing unit 3312, associates each moving object Mo specified by the ceiling camera-based inter-moving object region transfer recognizing unit 3311 with the product specified by the ceiling camera-based transferred product specifying unit 3313, and updates the list of products of each moving object Mo.

A zoomable camera may be used as the ceiling camera, and the ceiling camera-based transferred object recognizing unit 3312 may zoom up a position at which the transfer is estimated to be performed and define the region of the object. Each of the ceiling camera-based inter-moving object region transfer recognizing unit 3311, the ceiling camera-based transferred object recognizing unit 3312, and the ceiling camera-based transferred product specifying unit 3313 may be implemented by a shelf camera capable of performing imaging with a wide range instead of a ceiling camera.

Similarly to the second embodiment, the position information management unit 340 includes an inter-camera information transfer unit 341, an individual camera position defining unit 342, and a moving object display unit 343 as illustrated in FIG. 18.

Figure 36:
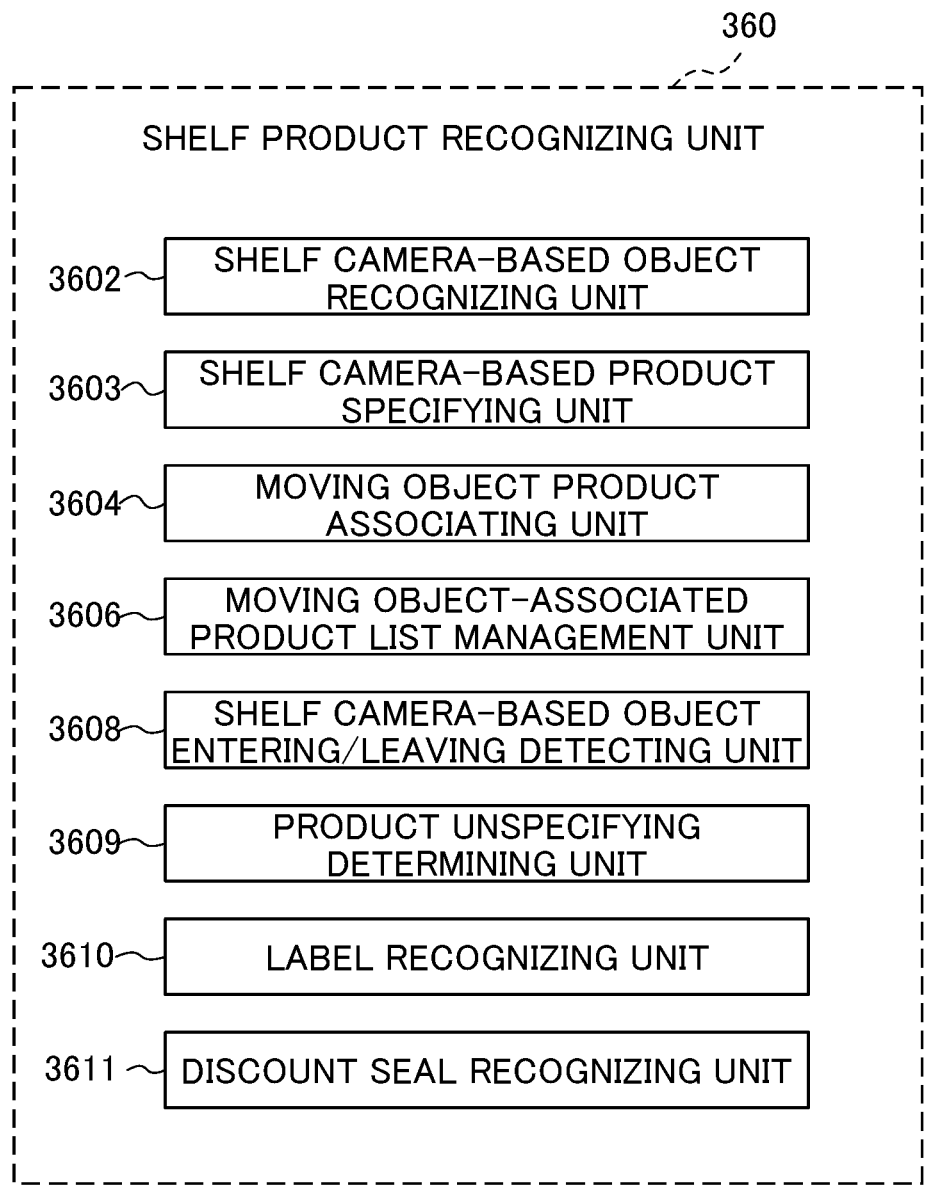
FIG. 36 is a functional block diagram illustrating a detailed functional configuration example of a shelf product recognizing unit installed in the sales room device in the fourth embodiment.

FIG. 36 is a functional block diagram illustrating a detailed functional configuration example of the shelf product recognizing unit 360 installed in the sales room device 3 in the fourth embodiment. The shelf product recognizing unit 360 includes a shelf camera-based object recognizing unit 3602, a shelf camera-based product specifying unit 3603, a moving object product associating unit 3604, a moving object-associated product list management unit 3606, a shelf camera-based object entering/leaving detecting unit 3608, a product unspecifying determining unit 3609, a label recognizing unit 3610, and a discount seal recognizing unit 3611 illustrated in FIG. 36.

In the CPU 501 of the checkout gate 5, as illustrated in FIG. 33, a checkout unit 535, an input control unit 536, and an output control unit 537 function.

When the moving object region being continuously tracked enters the checkout area 45, the checkout unit 535 receives the product information (a list of products) associated with one or more moving object regions from the server 1 via the communication unit 509, and determines a checkout amount and checkout target products. The input control unit 536 receives a signal from the input unit 506 such as the checkout button or the information reading unit installed in the gate main body. The output control unit 537 causes the checkout amount to be displayed on the output unit 507, outputs information to the checkout device 5*a*, and causes the opening/closing member to be opened or closed.

Further, when the moving object Mo being continuously tracked, that is, a person who makes a payment enters the checkout area 45, the checkout unit 535 determines the checkout amount and the checkout target products on the basis of the product information (a list of products) associated with one or more moving objects Mo. Further, for example, when a father makes a payment with a wallet, the father may make a payment even for the product information (a list of products) associated with a mother and a child which are accompanying persons using grouping.

The checkout gate 5-1 using the checkout device 5*a* is a device that calculates a total of product amounts and performs the checkout, and includes a checkout button (not illustrated). The checkout device 5*a* is installed on the exit 42 side rather than the checkout gate 5. The checkout device 5*a* includes a payment means in which payment can be made using cash, point payment, a gift card, a voucher, or the like.

If a person who makes a payment pushes the checkout button, using the pushing as a trigger, the checkout gate 5-1 reads the product information associated with the moving object Mo, and determines the checkout amount, and the person can pass through the checkout gate 5-1. Then, if the person who makes a payment makes a payment through the checkout device, the person can leave the shop.

Here, for example, when the checkout target product is the age limit product, and the age is not verified, the error state is presented to the information terminal 9*a*, the information terminal 9*b*, or the error display unit 151. At this time, the checkout gate 5-1 maintains the opening/closing member in a non-passable state, and, for example, keeps the opening/closing member closed. The checkout gate 5-1 may present information indicating the error state by means of a sound or a light. If it becomes a state in which restriction can be released, for example, if the clerk Mt verifies the age, the restriction is released by manipulating the error releasing unit 152 by a manipulation of the clerk Mt, and the checkout gate 5-1 enters a passable state. The release of the restriction can also be realized by remote control. Further, even when the object (unspecified object) in which any product is unable to be specified is associated with the moving object Mo, the flow similar to that of the age limit product is performed. The clerk Mt may take a countermeasure on the unspecified object in the manned checkout cash register 6 and specify the product.

The checkout gate 5-2 using the electronic money includes a card reading unit (not illustrated) but does not include a checkout button as in the checkout gate 5-1, and the checkout device 5a is not used. The card reading unit is configured to deal with any card such as a credit card, a debit card, electronic money, or a prepaid card.

Then, if a person who makes a payment enters the checkout area 45 of the checkout gate 5-2, and the card is read by the card reading unit, the product information associated with the moving object Mo is read, the checkout and the payment are completed, and the checkout gate 5-2 enters the passable state. If the checkout target product is the selling restricted product or the unspecified object is associated with the moving object Mo, the operation is the same as in the checkout gate 5-1 described above is performed.

Further, in the checkout gate 5-3, it is necessary to complete the individual authentication on the moving object Mo being continuously tracked and specify the payment information. If a person who makes a payment enters the checkout area 45 of the checkout gate 5-3, the checkout gate 5-3 performs the automatic checkout as long as there is no error, and the checkout gate 5-3 enters the passable state. If the checkout target product is the selling restricted product or the unspecified object is associated with the moving object Mo, the same operation as in the checkout gate 5-1 described above is performed.

In addition to the functions described above, the product recognition system of the fourth embodiment may include a remote control unit 390 (not illustrated).

The selling-restricted product determining unit 380 determines whether or not the specified product corresponds to the selling-restricted product. In other words, the selling-restricted product determining unit 380 determines that the specified product is the selling-restricted product having the age limit such as alcohols or tobaccos from the DB information. Further, the selling-restricted product determining unit 380 determines that the product is the selling-restricted product having the expired date/out-of-date using the character recognition or the like. Further, the selling-restricted product determining unit 380 determines that the product is the selling-restricted product such as allergic or non-halal food for the shopper in association with the personal information obtained by individual authentication. In a case in which the selling-restricted product determining unit 380 determines that the product is the selling-restricted product, information indicating that it is a selling-restricted product is presented. Further, the selling-restricted product determining unit 380 may perform the selling restriction on the basis of the personal information obtained from the individual authentication. Further, the selling-restricted product determining unit 380 may estimate the age and the sex from face or hand recognition and perform the selling restriction.

When a notification indicating the error state such as the system processing abnormality, the product unspecifying, or the selling restriction is received, the remote control unit 390 solves the error state by remote control. The ceiling camera 310, the shelf camera 311, and the checkout gate 5 which have detected the error state give a notification indicating the error state and the captured image in that state to the information terminals 9a and 9b for remote control inside the shop or outside the shop or the server 1 via the network N. The error state can be eliminated by manipulating these devices. Of course, the error state may be released by the manned cash register inside the shop, and the clerk Mt or the like may go to a place in which the error state occurs and release the error state.

Figure 37:
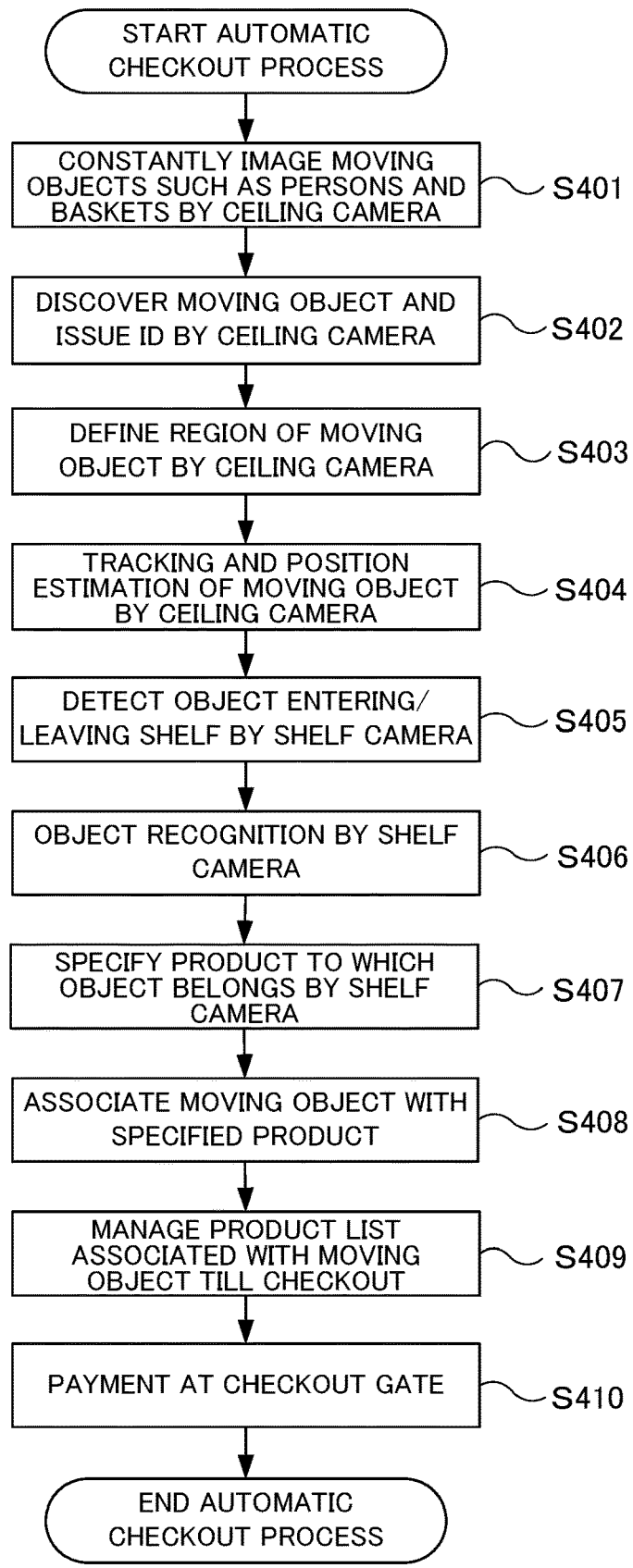
FIG. 37 is a flowchart for describing an automatic checkout process executed by a server 1, a sales room device, and a checkout gate of FIG. 34.

Next, a product checkout method in the product recognition system of the present the fourth embodiment will be described with reference to FIG. 37. FIG. 37 is a flowchart for describing an automatic checkout process executed by the server 1, the sales room device 3, and the checkout gate 5 of FIG. 34.

In step S401, the shopper (the moving object) enters the shop from the entrance 41 of the shop 40 (FIG. 31), and the ceiling camera 310 set near the entrance 41 starts imaging the shopper. If the shopper enters the passage 44 with the basket or the card, the inner ceiling camera 310 starts imaging the shopper. Thus, similarly to the third embodiment, a plurality of ceiling cameras 310 constantly images the entire the shop 30 including the shoppers, the baskets, and the carts. Before step S401, the individual authenticating unit 320 may perform the individual authentication on the shopper and acquire the personal information of the shopper.

In step S402, the ceiling camera-based moving object discovering unit 3302 discovers the moving object Mo and assigns an individual ID. The ID continues to be used till a predetermined timing, for example, until the shopper leaves the shop or the checkout is completed. At this timing, the individual authenticating unit 320 may perform the individual authentication on the shopper and acquire the personal information of the shopper. Further, the grouping unit 3308 may group a plurality of the moving objects Mo into one, and the blood relationship determining unit 3309 may determine the blood relationship of a plurality of shopper (moving objects Mo) and complement the grouping unit 3308.

In step S403, the ceiling camera-based moving object region defining unit 3304 defines a predetermined region including the moving object Mo discovered by the ceiling camera-based moving object discovering unit 3302. Further, when the moving object Mo moves within the range imaged by the ceiling camera 310, the position of the region of the moving object Mo after the movement is defined again. The position information is managed by the position information management DB 132, the memory, or the like in association with the ID of the moving object Mo and updated each time the region is defined. This defined position is also recognized at a position being imaged by another ceiling camera 310.

In step S404, the ceiling camera-based moving object region tracking unit 3305 estimates a position to which the moving object Mo moves within the captured image being captured by the certain ceiling camera 310. Further, the moving object region defining unit 334 defines the region of the moving object Mo for the position to which the moving object Mo is estimated to have moved, and updates the position information of the moving object Mo stored in the position information management DB 132 or the memory.

In step S405, similarly to the third embodiment, the shelf camera-based object entering/leaving detecting unit 3608 detects the object entering/leaving the shelf.

In step S406, similarly to the third embodiment, using the activation of the shelf camera-based object entering/leaving detecting unit 3608 as a trigger, the shelf camera-based object recognizing unit 352 compares the images before and after the image in which the object is picked up or the image in which the object is placed, and defines the image region serving as the production specifying target. Further, in step S406, the ceiling camera-based object acquisition recognizing unit may recognize that the moving object Mo acquires the object from the shelf or the like.

In step S407, the shelf camera-based product specifying unit 3603 specifies the product to which the object belongs, similarly to the third embodiment. If the specified product is the selling-restricted product, the selling-restricted product is associated with the moving object Mo. Further, even when the product to which the object belongs is unable to be specified, the object of product unspecifying is associated with the moving object Mo. Information indicating that the error state caused by the product unspecifying is presented to the information terminal 9a, the information terminal 9b, and the server 1, and the clerk Mt who has recognized the error state may resolve the error state by remote control (naturally, the clerk Mt may directly release the error state). Further, in step S407, the label recognizing unit may recognize the associated label depending on the specified product. Further, in step S407, the discount seal recognizing unit may recognize the attached discount seal depending on the specified product. In step S407, the ceiling camera-based product specifying unit may specify the product for the object region acquired by the ceiling camera-based object acquisition recognizing unit.

In step S408, the moving object Mo product associating unit 354 associates the moving object Mo with the specified product.

In step S409, the moving object-associated product list management unit 355 keeps managing the product list associated with the person till the checkout. In step S410, the checkout gate 5 performs the checkout and the payment on the basis of the product information associated with the moving object Mo. During the process up to step S410 or in step S410, the error display unit 151, the information terminal 9a, the information terminal 9b, or the output unit 507 of the checkout gate 5 may inform the clerk, or the like of some error state. In step S410, when the selling-restricted product is associated with the moving object Mo, the error state may be displayed without opening the gate and keeping the gate closed.

Other Embodiments

The present invention is not limited to the above-described embodiments, and variations, improvements, or the like within the scope of achieving the purpose of the present invention are included in the present invention. For example, the information processing system may include a shelf inventory management function. The shelf inventory management function includes a clerk identifying means and an inventory information update means. The clerk identifying means identifies the clerk from the shopper. For example, as the clerk identifying unit, a physical marker identifying the clerk is attached to what the clerk is wearing such as hats or clothes. The clerk is identified by imaging the physical marker through the ceiling camera and the shelf camera. The clerk identifying means can be effectively used particularly in the third and fourth embodiments.

Further, the clerk identifying means may have a button installed in predetermined areas such as the backyard of the shop. The clerk identifying means assigns an ID to the clerk when the button is pushed toward the clerk staying in a predetermined area.
The clerk identifying means can be effectively utilized particularly in the fourth embodiment. The clerk identifying unit causes the region of the person recognized as the clerk to be continuously tracked by the ceiling camera.

Then, the inventory information update means updates the inventory information of the shelf in the product DB of the server using the object recognizing unit and the product specifying unit when the clerk supplements the product to the shelf (addition) or when the clerk takes out or discards the product from the shelf (subtraction). When the product is purchased, the inventory information update means updates the inventory of the shelf having the products and the inventory information of the entire shop. The inventory information update means manages the inventory of the shelf and the inventory information of the entire shop, give a notification to the remote control unit if the inventory quantity falls below a threshold value or automatically places an order.

Further, the present invention may include a shopper attribute estimation function. For example, the shopper attribute estimation function estimates attributes such as a rough age, an age, a sex, or the like of the shopper from face recognition. The shopper attribute estimation function is installed in the cash register terminal in the first embodiment and installed in the sales room device in the two to fourth embodiments. In the second embodiment, the shopper attribute estimation function may be installed in the cash register terminal. Further, in the present invention, purchase information and shopper attribute information are shared with the POS system. As the purchase information, information such as a product name, an amount of money, and the like is converted into data, and the information is shared with the POS system after the payment is completed. As the attribute information of the shopper, information obtained by the shopper attribute estimation function is shared with the POS system.

The shopper attribute estimation function may be associated with, for example, the selling-restricted product determining unit. The shopper attribute estimation function may be controlled such that the selling-restricted product determining unit does not perform the age verification if the shopper apparently is over 30s who do not require the age verification as a result of estimating the attribute.

Further, in the present invention, instead of image processing by the CPU, processing by a graphic processing unit (GPU) may be performed. Further, the hardware configurations and the block diagrams illustrated in the drawings are merely examples for achieving the purpose of the present invention, and the present invention is not limited to the illustrated examples. Further, the locations of the functional blocks are not limited to those illustrated in the drawing and may be arbitrary. For example, one functional block may be constituted by a single piece of hardware, a single piece of software, or a combination thereof. In a case in which the process of each functional block is executed by software, a program constituting the software is installed in a computer or the like from a network or a recording medium.

The computer may be a computer incorporated in dedicated hardware or may be a smartphone or a personal computer. Further, the selling-restricted product process described in the first embodiment can also be applied in the two to fourth embodiments. Here, the selling-restricted product in the second embodiment is applied to the age limit product.

In this specification, steps describe a program recorded in a recording medium include not only processes which are chronologically performed in the order but also processes which are performed in parallel or individually although not necessarily performed chronologically. Further, in this specification, a term "system" indicates the entire apparatus constituted by a plurality of apparatuses, a plurality of means, or the like.

EXPLANATION OF REFERENCE NUMERALS

1 SERVER
2, 2-1, 2-n CASH REGISTER TERMINAL
3 SALES ROOM DEVICE
4 CHECKOUT DEVICE
5, 5-1, 5-2, 5-3 CHECKOUT GATE
10 SHOP
11 GATEWAY
14, 23 SHELF RACK
15, 24 PASSAGE
22 GATEWAY
101, 201, 301 CPU
108 STORAGE UNIT
109, 213, 315 COMMUNICATION UNIT
131 PRODUCT DB
141 DB MANAGEMENT UNIT
151 ERROR DISPLAY UNIT
208 LIGHTING UNIT
210 PRESENTING UNIT
211 CASH REGISTER CAMERA
235 PRODUCT SPECIFYING UNIT
236 SELLING-RESTRICTED PRODUCT DETERMINING UNIT
241 DB INFORMATION HOLDING UNIT
270 SURROUNDING SECTION
276 PLATE
310 CEILING CAMERA
311 SHELF CAMERA
312 BASKET CAMERA
320 INDIVIDUAL AUTHENTICATING UNIT
330 MOVING OBJECT TRACKING UNIT
3302 CEILING CAMERA-BASED MOVING OBJECT DISCOVERING UNIT
3303 CEILING CAMERA-BASED BASKET DISCOVERING UNIT
3304 CEILING CAMERA-BASED MOVING OBJECT REGION TRACKING UNIT
3305 CEILING CAMERA-BASED MOVING OBJECT REGION DEFINING UNIT
3306 CEILING CAMERA-BASED BASKET REGION DEFINING UNIT
3307 CEILING CAMERA-BASED BASKET REGION TRACKING UNIT
3308 GROUPING UNIT
3309 BLOOD RELATIONSHIP DETERMINING UNIT
340 POSITION INFORMATION MANAGEMENT UNIT
341 INTER-CAMERA INFORMATION TRANSFER UNIT
342 INDIVIDUAL CAMERA POSITION DEFINING UNIT
350 NUMBER OF BOOKS COUNTING UNIT
351 NUMBER OF BOOKS RECOGNIZING UNIT
352 PERSON-NUMBER OF BOOKS ASSOCIATING UNIT
354 NUMBER OF BOOKS UNSPECIFYING DETERMINING UNIT
355 INTER-PERSON TRANSFER RECOGNIZING UNIT
360 SHELF PRODUCT RECOGNIZING UNIT
3602 SHELF CAMERA-BASED OBJECT RECOGNIZING UNIT
3603 SHELF CAMERA-BASED PRODUCT SPECIFYING UNIT
3609 PRODUCT UNSPECIFYING DETERMINING UNIT
3610 LABEL RECOGNIZING UNIT
3612 SHELF CAMERA OR CEILING CAMERA-BASED BASKET ENTERING/LEAVING DETECTING UNIT
370 BASKET PRODUCT RECOGNIZING UNIT
372 BASKET ENTERING/LEAVING DETECTING UNIT
373 BASKET CAMERA-BASED OBJECT RECOGNIZING UNIT
374 BASKET CAMERA-BASED PRODUCT SPECIFYING UNIT
375 BASKET PRODUCT UNSPECIFYING DETERMINING UNIT
376 BASKET PRODUCT LABEL RECOGNIZING UNIT
377 BASKET PRODUCT DISCOUNT SEAL RECOGNIZING UNIT
380 SELLING-RESTRICTED PRODUCT DETERMINING UNIT
390 REMOTE CONTROL UNIT
Mo MOVING OBJECT

The invention claimed is:

1. An information processing system used when a person moves and purchases a first object as a product, the information processing system comprising:
a processor coupled to a memory, is capable of control a communication function, the processor is configured to:
execute control tracking a moving object when the person is discovered as the moving object;
execute control an object entering/leaving detecting that detects entry/leaving of the first object into/from a predetermined area by using a weight data of the first object; and
execute an association control that associates the moving object with the first object whose entry/leaving is detected.

2. The information processing system according to claim 1, wherein one or more of each of the first objects is arranged in a predetermined place including shelves as a product for sale in a shop, the predetermined area is an area indicating the place.

3. The information processing system according to claim 1, wherein the processor is further configured to execute control specifying a product that attempts to specify the first object as a product that is a candidate for purchase through a predetermined method.

4. The information processing system according to claim 1, wherein the processor is further configured to execute a presentation control for presenting information on the product that is specified when a predetermined condition relating to the first object is satisfied.

5. The information processing system according to claim 1, wherein the processor is further configured to execute control for communicating information for performing a checkout process for the product associated with the moving object as a checkout for the person via the communication function.

6. The information processing system according to claim 1, wherein the processor is further configured to execute control for communicating information for performing a process related to checkout for the product associated with each of one or more of the moving objects satisfying a predetermined condition among the plurality of moving objects via the communication function.

7. The information processing system according to claim 1, wherein in the control tracking the moving object, the processor is configured to assign an identifier to each of one or more moving objects and execute control for grouping the one or more moving objects using the identifier.

8. The information processing system according to claim 1, wherein the processor is further configured to execute control to acquire information about the moving object.

9. The information processing system according to claim 1, wherein in the control tracking the moving object, when the first object associated with the moving object to be tracked is transferred to a person different from the moving object, the processor recognizes that fact, the processor is configured to specify the person different from the moving object as a new moving object and is configured to execute control to track the new moving object; and
wherein in the association control, the processor is configured to execute control to associate the first object that transferred with the new moving object.

10. The information processing system according to claim 1, wherein the processor is further configured to execute control to present a first error indicating that there is in a predetermined error state, if the first object is a selling-restricted product and the processor recognizes that the person has a possibility of subject to selling restriction.

11. The information processing system according to claim 1, wherein in the association control, the processor is further configured to associate the first object, which has failed in the attempt to specify the product by the control specifying a product, with the moving object; and the processor is further configured to execute control to present a second error indicating that there is in a predetermined error state, when the attempt to specify the product by the control specifying a product fails.

12. The information processing system according to claim 1, wherein in the control tracking the moving object, the processor is configured to recognize a person moving as the moving object in a shop where a clerk is present, and tracks the moving object, and
wherein the processor is configured to execute control to identify the clerk for identifying between the clerk and the moving object.

13. The information processing system according to claim 1, wherein one or more of each of the first objects is arranged in a predetermined place including shelves as a product for sale in a shop, wherein
the processor is further configured to execute control to manage an inventory of each product on the place and the throughout the shop via the communication function,
wherein the control to manage an inventory, if the predetermined product is purchased, updating the inventory of each product on the place and the throughout the shop where a predetermined product is located; and controlling the execution of at least one of a notification to a remote control unit and an automatic ordering when the inventory quantity of each product on the place and the throughout the shop meets a predetermined requirement.

14. The information processing system according to claim 1, wherein the processor is further configured to execute control for attribute estimation that estimates an attribute of the person.

15. The information processing system according to claim 1, wherein in the control tracking the moving object, the processor is configured to control to register historical information indicating the path of movement of the moving object during tracking.

16. The information processing system according to claim 3, wherein in the control specifying a product, the processor is further configured to:
execute a first specifying control for acquiring a result of an attempt to specify the first object as the product by using a first method of the predetermined method, the first method is a method in which a person who visually inspect visually confirms an image containing the first object as a subject;
execute a second specifying control that attempts to specify the first object as the product by using a second method other than the first method among the predetermined methods; and
execute a control for specifying the product based on at least one of the first specifying control and the second specifying control.

17. The information processing system according to claim 1, wherein in the control tracking the moving object, the processor is further configured to execute control to track a second object as the moving object when the second object moving with the person is discovered as the moving object.

18. An information processing system used when a person moves and purchases a first object as a product, the information processing system comprising:
a processor coupled to a memory, is capable of control a communication function, the processor is configured to:
execute control tracking a moving object when the person is discovered as the moving object;
execute control an object entering/leaving detecting that detects entity/leaving of the first object into/from a predetermined area based on a weight data of the first object and result of image recognition for an image containing the first object as a subject; and
execute an association control that associates the moving object with the first object whose entry/leaving is detected.

* * * * *